US012344028B2

(12) United States Patent
Suzuki et al.

(10) Patent No.: US 12,344,028 B2
(45) Date of Patent: Jul. 1, 2025

(54) ENVELOPE PROCESSING APPARATUS, ENCLOSING-SEALING APPARATUS, AND IMAGE FORMING SYSTEM

(71) Applicants: Nobuyoshi Suzuki, Tokyo (JP); Michitaka Suzuki, Kanagawa (JP); Yuusuke Shibasaki, Tokyo (JP); Makoto Hidaka, Tokyo (JP); Akira Kunieda, Tokyo (JP); Takahiro Watanabe, Kanagawa (JP); Takuya Morinaga, Tokyo (JP); Takahiro Matsuda, Kanagawa (JP); Shingo Yoshizawa, Kanagawa (JP); Shinji Asami, Tokyo (JP); Kazuyoshi Matsuo, Miyagi (JP)

(72) Inventors: Nobuyoshi Suzuki, Tokyo (JP); Michitaka Suzuki, Kanagawa (JP); Yuusuke Shibasaki, Tokyo (JP); Makoto Hidaka, Tokyo (JP); Akira Kunieda, Tokyo (JP); Takahiro Watanabe, Kanagawa (JP); Takuya Morinaga, Tokyo (JP); Takahiro Matsuda, Kanagawa (JP); Shingo Yoshizawa, Kanagawa (JP); Shinji Asami, Tokyo (JP); Kazuyoshi Matsuo, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/548,295

(22) PCT Filed: May 6, 2022

(86) PCT No.: PCT/IB2022/054191

§ 371 (c)(1),
(2) Date: Aug. 29, 2023

(87) PCT Pub. No.: WO2022/238829

PCT Pub. Date: Nov. 17, 2022

(65) Prior Publication Data

US 2024/0140132 A1 May 2, 2024

(30) Foreign Application Priority Data

May 11, 2021 (JP) ................................. 2021-080478
Jun. 11, 2021 (JP) ................................. 2021-098141
Feb. 28, 2022 (JP) ................................. 2022-030084

(51) Int. Cl.
*B43M 5/00* (2006.01)
*B43M 5/04* (2006.01)

(52) U.S. Cl.
CPC .................................. *B43M 5/042* (2013.01)

(58) Field of Classification Search
CPC ...... B43M 3/045; B43M 5/042; B43M 5/047; B43M 3/04; B43M 5/04; B43M 5/045
(Continued)

(56) References Cited

U.S. PATENT DOCUMENTS 3,245,194 A * 4/1966 Carski .................... B65B 3/003 53/489
2009/0293424 A1 * 12/2009 Mori ...................... B65H 39/10 53/167
(Continued)

FOREIGN PATENT DOCUMENTS

EP 1297969 A2 4/2003
JP 2000-246815 A 9/2000
(Continued)

OTHER PUBLICATIONS

International Search Report and Written Opinion issued on Sep. 19, 2022 in PCT/IB2022/054191 filed on May 6, 2022.

*Primary Examiner* — Jacob A Smith
(74) *Attorney, Agent, or Firm* — Harness, Dickey & Pierce, P.L.C.

(57) ABSTRACT

An envelope processing apparatus for enclosing an enclosure in an envelope includes an envelope conveyance path,
(Continued)

an enclosure supplier, an envelope supplier, a flap opener, and an envelope stacker. The envelope conveyance path extends in a substantially vertical direction to convey the envelope. The enclosure supplier supplies the enclosure to the envelope via the envelope conveyance path. The envelope supplier supplies the envelope to the envelope conveyance path, The flap opener opens a flap portion of the envelope between the envelope supplier and the envelope conveyance path. The envelope stacker stacks the envelope ejected from the envelope conveyance path.

20 Claims, 44 Drawing Sheets

(58) Field of Classification Search
USPC .... 53/284.3, 569, 117, 131.3, 206, 235, 118
See application file for complete search history.

(56) References Cited

U.S. PATENT DOCUMENTS

| | | | | |
|---|---|---|---|---|
| 2012/0322641 | A1* | 12/2012 | Matsushita ............ | B65H 45/18 493/405 |
| 2016/0167817 | A1* | 6/2016 | Mitsusada ............... | B65B 35/50 53/64 |
| 2019/0284012 | A1* | 9/2019 | Yoneyama ........... | B65H 29/125 |

FOREIGN PATENT DOCUMENTS

| | | | |
|---|---|---|---|
| JP | 2010-246815 | A | 11/2010 |
| JP | 2011-112972 | A | 6/2011 |
| JP | 2012-012164 | A | 1/2012 |
| JP | 2013-006277 | A | 1/2013 |
| JP | 2013-035645 | A | 2/2013 |

* cited by examiner

ENVELOPE PROCESSING APPARATUS, ENCLOSING-SEALING APPARATUS, AND IMAGE FORMING SYSTEM

CROSS-REFERENCE TO RELATED APPLICATIONS

This application is a national phase under 35 U.S.C. § 371 of PCT International Application No. PCT/IB2022/054191 which has an International filing date of May 6, 2022, which claims priority to Japanese Application Nos. 2021-080478, filed on May 11, 2021, 2021-098141, filed on Jun. 11, 2021, and 2022-030084, filed on Feb. 28, 2022 the entire contents of each of which are hereby incorporated by reference.

TECHNICAL FIELD

Embodiments of the present invention relate to an envelope processing apparatus, an enclosing-sealing apparatus, and an image forming system.

BACKGROUND ART

An envelope processing apparatus is known that enclose an enclosure in an envelope. An image forming system is also known that encloses a folded sheet, on which an image has been formed, in an envelope in conjunction with a folding apparatus that performs folding processing on a sheet medium and an image forming apparatus that forms an image on a medium.

As an enclosing system that enclosed an enclosure in an envelope, an enclosing system is known that includes an envelope feeding unit, an enclosure feeding unit, an enclosing device, and an envelope stacking tray that are connected by multiple conveyance paths (see patent literature (PTL) 1).

There are also known an envelope processing apparatus (also referred to as an enclosing processing apparatus) that encloses an enclosure in an envelope and an enclosing-sealing apparatus that encloses an enclosure in an envelope and seals the envelope. An image forming system is also known that encloses a folded sheet, on which an image has been formed, in an envelope and seals the envelope in conjunction with an image forming apparatus that forms an image on a sheet medium and a folding apparatus that performs folding processing on the sheet medium.

There is also known an apparatus having a configuration in which an envelope used for enclosing processing and an enclosed sheet are placed on a stacking tray (see PTL 2).

CITATION LIST

Patent Literature

[PTL 1]
Japanese Unexamined Patent Application Publication No. 2013-006277
[PTL 2]
Japanese Unexamined Patent Application Publication No. 2010-246815

SUMMARY OF INVENTION

Technical Problem

According to the art disclosed in PTL 1, a conveyance path extending in a horizontal direction of an apparatus body constitutes a path for conveying an envelope fed from an envelope feeding unit to an enclosing device. As a result, it is necessary to secure a large dimension in the width direction of the apparatus. Therefore, there is a problem in reducing the size of the apparatus and saving the installation area.

In the apparatus disclosed in PTL 2, it is necessary to open a cover of an apparatus housing when an envelope placed inside the apparatus is accessed, for example, when the envelope is replenished to a stacking tray that holds the envelope or when the envelope is taken out from an envelope ejection tray that stacks the envelope after the envelope is enclosed. At this time, it is necessary to temporarily stop the operation of a mechanism inside the apparatus.

However, even in a process in which a medium is simply conveyed downstream and ejected without being enclosed in an envelope, the operation has to be temporarily stopped when the cover of the apparatus housing is opened for replenishing or taking out the envelope. That is, in the related art, the conveyance operation of the medium is necessarily affected by the operation control for securing safety at the time of the replenishment operation of the envelope, and there is a problem in that the operation rate of the apparatus decreases.

An object of the present disclosure is to provide an envelope processing apparatus that can reduce the size of the entire apparatus and reduce an installation area.

Another object of the present disclosure is to provide an envelope processing apparatus that can reduce downtime of the apparatus by performing control so that execution of processing requiring no envelope can be continued when a user operates the envelope.

Solution to Problem

According to an aspect of the present disclosure, there is provided an envelope processing apparatus for enclosing an enclosure in an envelope. The envelope processing apparatus includes an envelope conveyance path, an enclosure supplier, an envelope supplier, a flap opener, and an envelope stacker. The envelope conveyance path extends in a substantially vertical direction to convey the envelope. The enclosure supplier supplies the enclosure to the envelope via the envelope conveyance path. The envelope supplier supplies the envelope to the envelope conveyance path, The flap opener opens a flap portion of the envelope between the envelope supplier and the envelope conveyance path. The envelope stacker stacks the envelope ejected from the envelope conveyance path.

According to an aspect of the present disclosure, there is provided an envelope processing apparatus for enclosing an enclosure in an envelope. The envelope processing apparatus includes an enclosing conveyance path, a first cover, an envelope conveyance path, a second cover, and a controller. The enclosing conveyance path is to convey the enclosure. The first cover covers the enclosing conveyance path. The envelope conveyance path extends from the enclosing conveyance path in a substantially vertical direction to convey the envelope. The second cover covers at least the envelope conveyance path. The controller continues conveying the enclosure in the enclosing conveyance path when the second cover is open.

Advantageous Effects of Invention

According to the present disclosure, the size of the entire device and the ground contact area can be reduced.

According to the present disclosure, the downtime of an apparatus can be reduced by performing control so that execution of processing requiring no envelope can be continued when a user operates the envelope.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
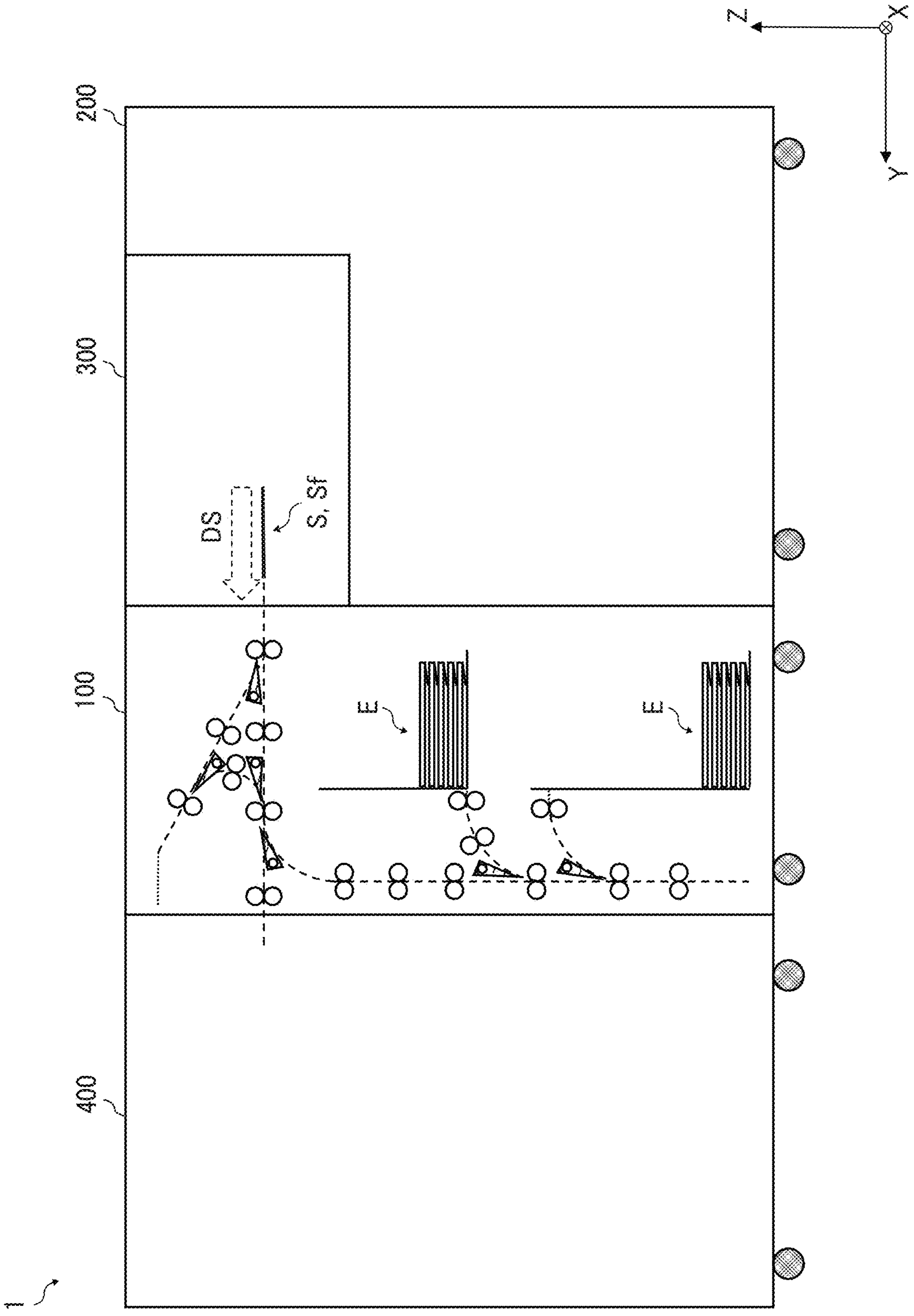
FIG. 1 is a front cross-sectional view of an image forming system according to an embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to the drawings, embodiments of the present disclosure are described below. Note that identical parts are given identical reference numerals and redundant descriptions are summarized or omitted accordingly.

A description is provided of a construction of an image forming system according to an embodiment of the present disclosure. FIG. 1 is a front cross-sectional view of a printing system 1 as an image forming system according to an embodiment of the present disclosure. The printing system 1 includes an image forming apparatus 200, a folding apparatus 300 as a sheet processing apparatus, an enclosing-sealing apparatus 100 as an envelope processing apparatus (also referred to as an enclosing processing apparatus) according to an embodiment of the present disclosure, and a post-processing apparatus 400.

The image forming apparatus 200 is an example of an apparatus that forms an image on a sheet S serving as a medium using a predetermined image forming method and ejects the sheet medium. The medium (hereinafter referred to as the sheet S) bearing the image is ejected to the folding apparatus 300. The folding apparatus 300 performs predetermined folding on the sheet S to produce a folded sheet Sf and ejects the folded sheet Sf to the enclosing-sealing apparatus 100. Alternatively, the folding apparatus 300 may operate to eject the sheet S to the enclosing-sealing apparatus 100 in the same state as at the time of entry without folding the sheet S.

The instruction to "fold" or "not fold" the sheet S is an instruction transmitted from a controller of the image forming apparatus 200 based on information input to the controller by the user of the printing system 1. Alternatively, the instruction to "fold" or "not fold" the sheet S is an instruction from a controller of the folding apparatus 300 based on information input to the controller by the user of the printing system 1.

The enclosing-sealing apparatus 100 performs enclosing-sealing processing including an enclosing operation of inserting (enclosing), into an envelope E, an "enclosure" (a sheet S or a folded sheet Sf) ejected from an apparatus (e.g., the image forming apparatus 200 or the folding apparatus 300) disposed upstream in a direction (conveyance direction) in which the sheet S is conveyed and a sealing operation of closing a lid (flap portion ef) of the envelope E after the enclosing.

The post-processing apparatus 400 performs predetermined post-processing (stapling, punching, or the like) instructed via the controller on the sheet S and the folded sheet Sf ejected from the upstream apparatuses (the image forming apparatus 200, the folding apparatus 300, and the enclosing-sealing apparatus 100).

The enclosing-sealing apparatus 100 includes an enclosure reversing conveyor that reverses the direction of an end of a folded sheet Sf, which is obtained by folding a sheet S, in a conveyance direction in order to insert the folded sheet Sf in an appropriate direction to an envelope E. That is, the enclosing-sealing apparatus 100 determines whether the formation position of the destination or the like formed on the folded sheet Sf is oriented to match the position of a transparent window ew formed in advance on the envelope E, and reverses the orientation (position of the end) of the folded sheet Sf in the conveyance direction based on the determination result. That is, the enclosing-sealing apparatus 100 includes a conveying mechanism that conveys the folded sheet Sf to the enclosing position after reversing the folded sheet Sf using a conveyance path disposed upstream from the enclosing position when the folded sheet Sf needs to be reversed.

Details of control processes for reversing and conveying the folded sheet Sf in the enclosing-sealing apparatus 100 are described below. The enclosing-sealing apparatus 100 can also perform the same enclosing operation and sealing operation on a sheet S as an enclosure that has not been folded.

Here, a description is given of "coordinate axis" used to describe the "direction" in embodiments according to the present disclosure. As illustrated in FIG. 1, an axis parallel to a placement surface (installation surface of the apparatus) of the printing system 1 and along an arrangement direction of the apparatuses constituting the printing system 1 is defined as a Y-axis. A direction indicated with an arrow of Y-axis defines a positive Y-direction. A direction opposite to the positive Y-direction defines a negative Y-direction. Therefore, the sheet S bearing the image formed by the image forming apparatus 200 is carried out in the positive Y-direction. Thereafter, the sheet S is conveyed to the folding apparatus 300, the enclosing-sealing apparatus 100, and the post-processing apparatus 400 that are disposed downstream from the image forming apparatus 200 in the positive Y-direction.

Similarly, X-axis defines an axis that is parallel to the placement surface on which the printing system 1 is placed and is extended in a front-rear direction of the printing system 1. A direction indicated with an arrow of X-axis defines a positive X-direction. A direction opposite to the positive X-direction defines a negative X-direction.

Z-axis defines an axis that is perpendicular to X-axis and Y-axis and is extended in a height direction of the printing system 1. A direction indicated with an arrow of Z-axis defines a positive Z-direction. A direction opposite to the positive Z-direction defines a negative Z-direction.

If drawings referred to in descriptions below are also attached with coordinate axes similar to the coordinate axes described above, directions of the coordinate axes are also defined as described above.

The sheet S bearing the image formed by the image forming apparatus 200 is ejected in the positive Y-direction. Thereafter, the sheet S is conveyed to the folding apparatus 300, the enclosing-sealing apparatus 100, and the post-processing apparatus 400 that are disposed downstream from the image forming apparatus 200 in the positive Y-direction. Hence, the positive Y-direction is equivalent to the sheet conveyance direction DS. However, although the sheet S or the folded sheet Sf enters the enclosing-sealing apparatus 100 in the positive Y-direction, the sheet S or the folded sheet Sf is conveyed in a Z-direction when the sheet S or the folded sheet Sf is inserted into the envelope E and the envelope E is sealed.

That is, in the enclosing-sealing apparatus 100 constituting the printing system 1, the enclosure (folded sheet Sf) conveyed in the positive Y-direction and carried into the enclosing-sealing apparatus 100 is conveyed in the positive Y-direction and then conveyed in the negative Z-direction to be enclosed in the envelope E. On the other hand, the envelope E stored in the enclosing-sealing apparatus 100 is separated from the stacking position, conveyed in the positive Z-direction to reach the enclosing position, and conveyed in the negative Z-direction after the enclosing operation. Then, the envelope E is sealed and ejected.

Figure 2:
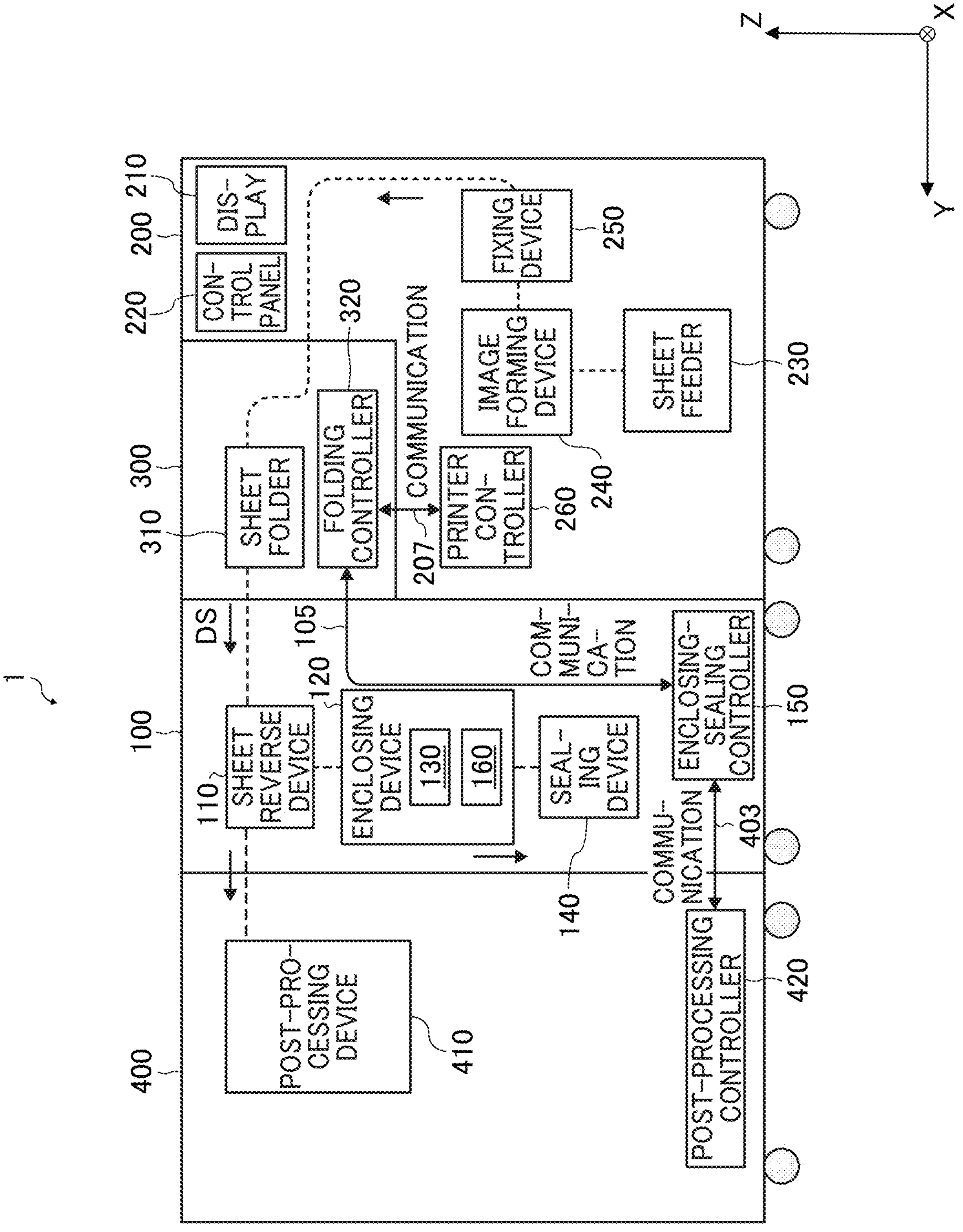
FIG. 2 is a block diagram illustrating a control configuration of the image forming system of FIG. 1.

Referring to FIG. 2, a description is provided of functional blocks of an entirety of the printing system 1. In a description below, an enclosure serving as a medium conveyed and inserted into the envelope E is the folded sheet Sf that bears the image formed by the image forming apparatus 200 and is treated with predetermined folding by the folding apparatus 300. FIG. 2 illustrates a motion path (e.g., a conveyance path) of the folded sheet Sf with a broken line. FIG. 2 illustrates a channel used for sending and receiving a signal between the functional blocks with a solid line. FIG. 2 illustrates a motion path (e.g., a conveyance path) of the sheet S with the broken line also.

For example, the image forming apparatus 200 forms the image on the sheet S by general electrophotographic processes. The image forming apparatus 200 includes a display 210, a control panel 220, a sheet feeder 230, an image forming device 240, a fixing device 250, and the printer controller 260.

The display 210 displays information to the user, such as a status of each function and an operation to be specified by the user. The control panel 220 is equivalent to an operation interface with which the user performs settings such as a setting for specifying an operating mode and a number of prints and a setting for reversing the sheet S or the folded sheet Sf when the enclosing-sealing apparatus 100 inserts the sheet S or the folded sheet Sf into the envelope E. The sheet feeder 230 includes a sheet feeding mechanism that stocks the sheets S and separates and feeds the sheets S one by one. The image forming device 240 forms a latent image on a photoconductor, develops the latent image into an image (e.g., a toner image), and transfers the image onto the sheet S. The fixing device 250 fixes the image transferred onto the sheet S thereon. The printer controller 260 controls operations of the functional blocks described above.

The folding apparatus 300 includes a sheet folder 310 and the folding controller 320. The sheet folder 310 folds the sheet S conveyed from the image forming apparatus 200 with a folding type, that is, by a folding method, specified by the printer controller 260 of the image forming apparatus 200 via a communication line 207. The folding controller 320 controls an entirety of the folding apparatus 300. The folding controller 320 also controls communication with the printer controller 260 and an enclosing-sealing controller 150 that is disposed downstream from the folding controller 320 in the sheet conveyance direction DS of the sheet S and is coupled with the folding controller 320. Alternatively, the sheet S may be conveyed to the enclosing-sealing apparatus 100 without being folded by the sheet folder 310.

The sheet folder 310 may selectively employ a plurality of types of detailed constructions. A state of the folded sheet Sf after being folded by the sheet folder 310 may vary depending on the type of the construction. Specifically, at a predetermined position in an enclosing device 120 described below, a leading end of the folded sheet Sf in an enclosing direction in which the folded sheet Sf enters the envelope E may vary depending on the type of folding. Even with an identical folding, the leading end of the folded sheet Sf in the sheet conveyance direction DS may change places with a trailing end of the folded sheet Sf in the sheet conveyance direction DS according to an interior configuration of the sheet folder 310.

As illustrated in FIG. 2, the enclosing-sealing apparatus 100 includes a sheet reverse device 110, the enclosing device 120, a sealing device 140, and the enclosing-sealing controller 150.

The sheet reverse device 110 performs predetermined processing on the folded sheet Sf conveyed from the sheet folder 310. The predetermined processing defines conveyance of the folding sheet Sf, that corresponds to a control mode (e.g., a type of folding, a position on a print face of the folded sheet Sf, and the like) instructed to the enclosing-sealing controller 150 from the folding controller 320 via a communication line 105. The conveyance processing executed by the sheet reverse device 110 is processing including conveyance processing of conveying the folded sheet Sf downstream in the conveyance direction and reversing processing of switching the ends of the folded sheet Sf in the conveyance direction. That is, the sheet reverse device 110 also serves as and is also referred to as a sheet conveying device. Conveyance and reversing of the folded sheet Sf convey the folded sheet Sf to the enclosing device 120 or the post-processing apparatus 400.

The enclosing device 120 performs envelope conveyance processing of moving the envelope E to a position where the folded sheet Sf conveyed from the sheet reverse device 110 can be enclosed, and causing the envelope E to wait at a predetermined position. The enclosing device 120 also performs enclosing processing of inserting the folded sheet Sf, which is conveyed from the sheet reverse device 110, into the envelope E on standby. Thus, the enclosing device 120 includes an enclosure pusher 160 as a mechanism that pushes the enclosure into the envelope E on standby to enclose the enclosure.

The enclosing device 120 further includes a flap opening unit 130 that opens the flap portion ef so that a mouth of the envelope E is in an open state before the enclosure reaches a predetermined position.

Figure 3:
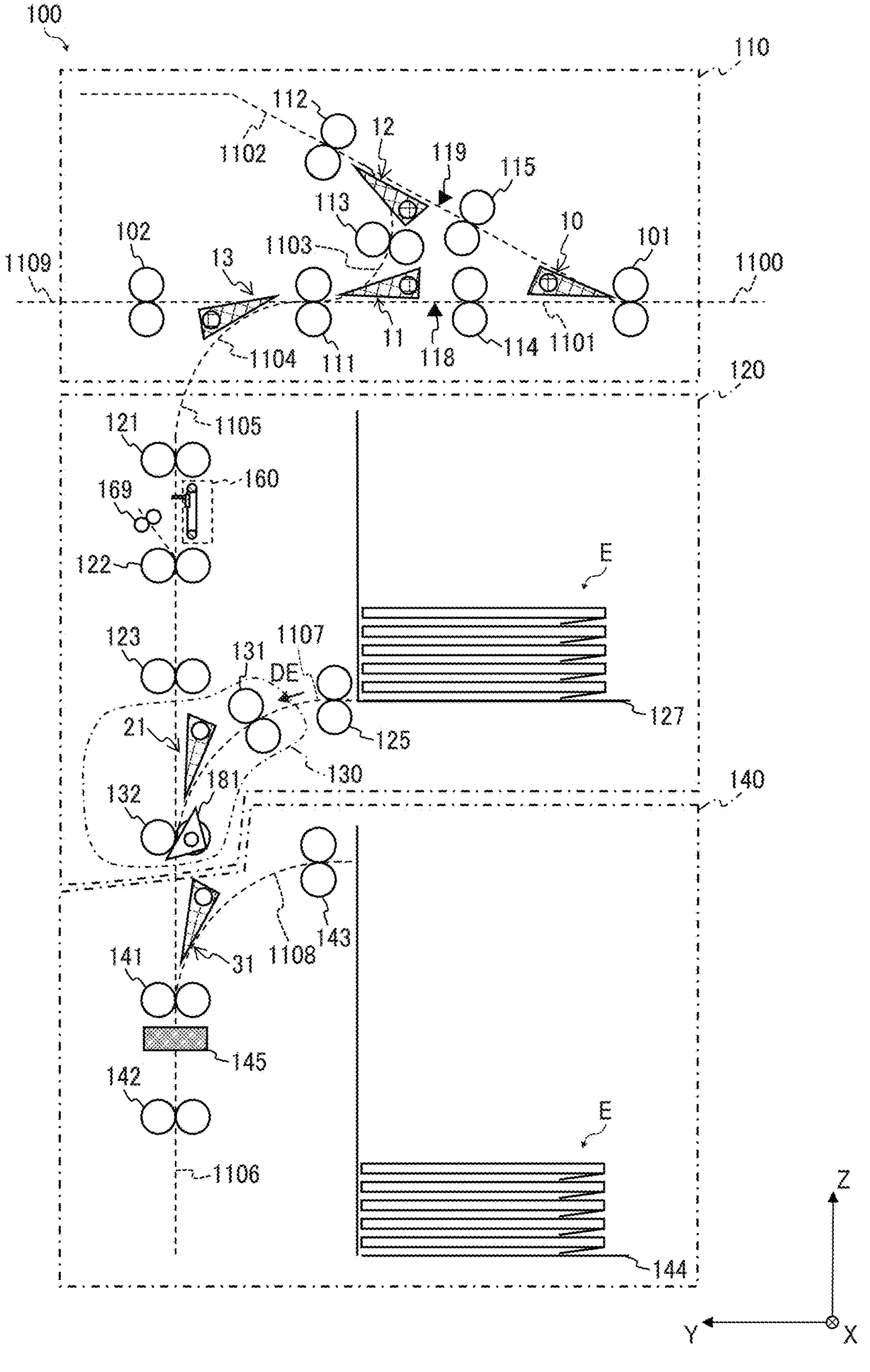
FIG. 3 is a cross-sectional view of an enclosing-sealing apparatus of the image forming system of FIG. 1.

The sealing device 140 closes the flap portion ef of the envelope E enclosed with the folded sheet Sf, and then ejects the sealed envelope E to an envelope ejection tray 144 illustrated in FIG. 3.

The enclosing-sealing controller 150 controls motion of a plurality of conveyance roller pairs that constructs the sheet reverse device 110, the enclosing device 120, and the sealing device 140 and motion of switching pawls that switch conveyance paths of the envelope E. In the following description, a driving source of the switching pawls is not particularly limited, and for example, a motor, a solenoid, or the like is appropriately used to rotate in a predetermined direction at a predetermined timing to switch the state.

The enclosing-sealing controller 150 also controls operations of the flap opening unit 130 and the enclosure pusher 160 included in the enclosing device 120. The enclosing-sealing controller 150 is a controller that controls conveyance of the folded sheet Sf including reversing and enclosing of the folded sheet Sf.

The enclosing-sealing controller 150 serving as the controller receives enclosing target data as data relating to the folded sheet Sf from the printer controller 260 and the folding controller 320. The enclosing-sealing controller 150 controls conveyance of the folded sheet Sf based on an instruction indicated by each data included in the received, enclosing target data.

The enclosing target data is data relating to the sheet S and the folded sheet Sf serving as the enclosure. Specifically, the enclosing target data includes data used to control a leading end of the sheet S or the folded sheet Sf in the sheet conveyance direction DS when the sheet S or the folded sheet Sf enters the envelope E to be a desired end of the sheet S or the folded sheet Sf. For example, the enclosing target data further includes folding type data that specifies a type of folding applied to produce the folded sheet Sf. The enclosing target data further includes reverse data that specifies whether or not to perform reversing and conveyance described below of the folded sheet Sf as an operation instruction from the image forming apparatus 200 as one of the upstream apparatuses disposed upstream from the enclosing-sealing apparatus 100 in the sheet conveyance direction DS. For example, the enclosing target data further includes print face data indicating information related to a position where an image is formed on the folded sheet Sf. For example, the enclosing target data further includes folder type data that specifies a type of the sheet folder 310 that performs folding.

The post-processing apparatus 400 includes a post-processing device 410 and a post-processing controller 420. The post-processing controller 420 controls the post-processing device 410 to perform predetermined post-processing on the sheet S conveyed from the upstream apparatus disposed upstream from the post-processing apparatus 400 in the sheet conveyance direction DS. The post-processing controller 420 controls the post-processing performed by the post-processing device 410 according to an operating mode sent from the printer controller 260, the folding controller 320, and the enclosing-sealing controller 150 via a communication line 403.

The printer controller 260, the folding controller 320, the enclosing-sealing controller 150, and the post-processing controller 420 are coupled with each other to communicate data needed for control via each of communication lines (e.g., the communication lines 207, 105, and 403). Thus, with linkage between controllers (e.g., the printer controller 260, the folding controller 320, the enclosing-sealing controller 150, and the post-processing controller 420), the controllers share data relating to a processing mode in which the user requests processing on the sheet S and the folded sheet Sf and a size of the sheet S and the folded sheet Sf. Thus, the entirety of the printing system 1 shares control data based on which each of the mechanisms described above performs predetermined processing through a predetermined process at a predetermined time.

The enclosing-sealing controller 150 that performs a central control according to this embodiment includes a central processing unit (CPU) serving as an arithmetic processing unit, a read only memory (ROM) serving as a memory, and a random access memory (RAM). The enclosing-sealing controller 150 further includes an interface that outputs a control signal to each conveyance roller and receives a signal from each conveyance roller and another interface that receives an output signal from each sensor. The enclosing-sealing controller 150 controls operations of the enclosing-sealing apparatus 100 with a control program that executes control processing by using hardware resources described above.

The printer controller 260, the folding controller 320, and the post-processing controller 420, like the enclosing-sealing controller 150, also control operations of hardware mechanisms with a control program that achieves functions by using the hardware resources constructed by the CPU, the ROM, the RAM, and the like.

FIGS. 1 and 2 illustrate a construction in which the enclosing-sealing apparatus 100 is coupled with the post-processing apparatus 400 disposed downstream from the enclosing-sealing apparatus 100 in the sheet conveyance direction DS as an example of the construction of the printing system 1. The post-processing apparatus 400 is typically a finisher that staples the sheets S, a stacker, a bookbinding machine, or the like. As an example of a system construction of the printing system 1, the enclosing-sealing apparatus 100 may be disposed most downstream in the sheet conveyance direction DS in the printing system 1.

A description is provided of a configuration of conveyance of the enclosing-sealing apparatus 100.

Referring to FIG. 3, the following describes configurations of conveyance rollers, switching pawls that switch a conveyance direction of a conveyed object, and conveyance paths provided with the conveyance rollers and the switching pawls. The conveyance rollers, the switching pawls, and the conveyance paths construct the sheet reverse device 110, the enclosing device 120, the flap opening unit 130, and the sealing device 140 of the enclosing-sealing apparatus 100.

A description is provided of a construction of the sheet reverse device 110.

As illustrated in FIG. 3, the sheet reverse device 110 includes a plurality of conveyance paths that is mainly distinguished as an entry path 1100, a first conveyance path

1101, a second conveyance path 1102, a switchback conveyance path 1103, an enclosing conveyance path 1104 serving as a fourth conveyance path, and a sheet ejecting path 1109.

The entry path 1100 is provided with an entry roller pair 101. The entry path 1100 is a path that receives the folded sheet Sf ejected from the upstream apparatus disposed upstream from the enclosing-sealing apparatus 100 in the sheet conveyance direction DS, for example, the folding apparatus 300. The enclosing-sealing controller 150 receives the enclosing target data as data relating to the folded sheet Sf from the controllers disposed upstream from the enclosing-sealing controller 150 in the sheet conveyance direction DS, that is, the printer controller 260 and the folding controller 320. Thus, the enclosing-sealing controller 150 controls the entry roller pair 101 to resume and interrupt rotation.

The first conveyance path 1101 is one of a plurality of conveyance paths disposed downstream from the entry roller pair 101 in the sheet conveyance direction DS and branches from the entry path 1100. The first conveyance path 1101 is provided with a first conveyance roller pair 111 serving as a first conveyor and a first intermediate conveyance roller pair 114. The first conveyance path 1101 is further provided with a first sheet detecting sensor 118 serving as a first medium sensor that detects an end (e.g., the trailing end) of the folded sheet Sf conveyed in the sheet conveyance direction DS. The first sheet detecting sensor 118 is interposed between the first intermediate conveyance roller pair 114 and the first conveyance roller pair 111.

The second conveyance path 1102 is one of the conveyance paths disposed downstream from the entry roller pair 101 in the sheet conveyance direction DS and branches from the entry path 1100 in a direction different from a direction in which the first conveyance path 1101 extends. The second conveyance path 1102 is provided with a second conveyance roller pair 112 serving as a second conveyor and a second intermediate conveyance roller pair 115. The second conveyance path 1102 is further provided with a second sheet detecting sensor 119 serving as a second medium sensor that detects the end (e.g., the trailing end) of the folded sheet Sf conveyed in the sheet conveyance direction DS. The second sheet detecting sensor 119 is interposed between the second intermediate conveyance roller pair 115 and the second conveyance roller pair 112.

The sheet reverse device 110 further includes the switchback conveyance path 1103. The switchback conveyance path 1103 bridges between the first conveyance path 1101 at a junction position thereon and the second conveyance path 1102 at a branch position thereon. The switchback conveyance path 1103 adjoins the first conveyance path 1101 at the junction position disposed upstream from the first conveyance roller pair 111 in the sheet conveyance direction DS. The switchback conveyance path 1103 branches from the second conveyance path 1102 at the branch position disposed downstream from the second intermediate conveyance roller pair 115 in the sheet conveyance direction DS. The switchback conveyance path 1103 switches back the folded sheet Sf conveyed through the second conveyance path 1102 downstream in the sheet conveyance direction DS and guides the folded sheet Sf to the first conveyance path 1101. The switchback conveyance path 1103 serving as a third conveyance path is provided with a switchback conveyance roller pair 113 serving as a third conveyor.

The sheet reverse device 110 further includes the sheet ejecting path 1109 that adjoins the first conveyance path 1101 and is disposed downstream from the first conveyance path 1101 in the sheet conveyance direction DS. The sheet ejecting path 1109 ejects the sheet S or the folded sheet Sf that has passed through the sheet reverse device 110 into the post-processing apparatus 400 disposed downstream from the sheet reverse device 110 in the sheet conveyance direction DS. The sheet ejecting path 1109 is provided with an exit roller pair 102.

If the folded sheet Sf conveyed from the folding apparatus 300 is not treated with enclosing described below, the folded sheet Sf passes through the entry path 1100, the first conveyance path 1101, and the sheet ejecting path 1109 and is ejected into the post-processing apparatus 400 disposed downstream from the sheet reverse device 110 in the sheet conveyance direction DS.

The sheet reverse device 110 further includes the enclosing conveyance path 1104 disposed downstream from the first conveyance roller pair 111 in the sheet conveyance direction DS and branched from the first conveyance path 1101. The enclosing conveyance path 1104 serves as the fourth conveyance path that guides the folded sheet Sf to an enclosing roller pair 121 that holds the envelope E into which the folded sheet Sf is inserted. As described below, the enclosing conveyance path 1104 is contiguous to the envelope conveyance path 1105.

The sheet reverse device 110 further includes a branching pawl 10 serving as a branching member disposed at a branch position where the first conveyance path 1101 and the second conveyance path 1102 branch from the entry path 1100. The folded sheet Sf is conveyed to the first conveyance path 1101 or the second conveyance path 1102 from the branch position. The branching pawl 10 switches a conveyance path between the first conveyance path 1101 and the second conveyance path 1102 based on the enclosing target data relating to the folded sheet Sf entering the entry path 1100 so that the branching pawl 10 guides the folded sheet Sf to the first conveyance path 1101 or the second conveyance path 1102.

The sheet reverse device 110 further includes a first switching pawl 11 serving as a first switch disposed at the junction position where the switchback conveyance path 1103 adjoins the first conveyance path 1101. The first switching pawl 11 pivots between a first position where the first switching pawl 11 guides the folded sheet Sf conveyed from the entry path 1100 to the first conveyance path 1101 toward the first conveyance roller pair 111 and a second position where the first switching pawl 11 guides the folded sheet Sf conveyed from the switchback conveyance path 1103 to the first conveyance path 1101.

The sheet reverse device 110 further includes a second switching pawl 12 serving as a second switch disposed at the branch position where the switchback conveyance path 1103 branches from the second conveyance path 1102. The second switching pawl 12 pivots between a first position where the second switching pawl 12 guides the folded sheet Sf conveyed from the entry path 1100 to the second conveyance path 1102 toward the second conveyance roller pair 112 and a second position where the second switching pawl 12 guides the folded sheet Sf conveyed from the second conveyance path 1102 to the switchback conveyance path 1103 so as to switch back the folded sheet Sf.

The sheet reverse device 110 further includes a third switching pawl 13 serving as a third switch disposed at a branch position where the enclosing conveyance path 1104 branches from the first conveyance path 1101. The third switching pawl 13 pivots between a first position where the third switching pawl 13 guides the folded sheet Sf conveyed through the first conveyance path 1101 to the enclosing conveyance path 1104 and a second position where the third switching pawl 13 guides the folded sheet Sf conveyed through the first conveyance path 1101 to the sheet ejecting path 1109.

The first intermediate conveyance roller pair 114 conveys the folded sheet Sf conveyed through the first conveyance path 1101 to the first conveyance roller pair 111. The first conveyance roller pair 111 conveys the conveyed, folded sheet Sf downstream in the sheet conveyance direction DS. When the third switching pawl 13 is at the first position depicted in FIG. 3, the third switching pawl 13 guides the folded sheet Sf to the enclosing conveyance path 1104. When the folded sheet Sf is conveyed for a predetermined distance after the first sheet detecting sensor 118 detects the trailing end of the folded sheet Sf conveyed from the first intermediate conveyance roller pair 114 to the first conveyance roller pair 111, the folded sheet Sf has already moved to the enclosing conveyance path 1104. Accordingly, the conveyance roller pairs of the sheet reverse device 110, that have rotated, interrupt rotation.

The second intermediate conveyance roller pair 115 conveys the folded sheet Sf conveyed through the second conveyance path 1102 to the second conveyance roller pair 112. When the folded sheet Sf is conveyed for a predetermined distance after the second sheet detecting sensor 119 detects the trailing end of the folded sheet Sf conveyed through the second conveyance path 1102 in the sheet conveyance direction DS, the second conveyance roller pair 112 interrupts forward rotation, and then starts backward rotation. Thus, the second conveyance roller pair 112 conveys the folded sheet Sf through the switchback conveyance path 1103 that switches back the folded sheet Sf. Before the second conveyance roller pair 112 rotates backward or at a time when the second conveyance roller pair 112 rotates backward, at a time when the trailing end of the folded sheet Sf in the sheet conveyance direction DS passes the second switching pawl 12, that is determined based on a detection result sent from the second sheet detecting sensor 119, the enclosing-sealing controller 150 pivots the second switching pawl 12. Thus, the second switching pawl 12 reaches the second position where the second switching pawl 12 guides the folded sheet Sf to the switchback conveyance path 1103.

As the second switching pawl 12 guides the folded sheet Sf from the second conveyance path 1102 to the switchback conveyance path 1103, the switchback conveyance roller pair 113 conveys the folded sheet Sf to the first conveyance path 1101.

A description is provided of a construction of the enclosing device 120.

As illustrated in FIG. 3, the enclosing device 120 includes an envelope conveyance path 1105 that is a vertical conveyance path connected to an enclosing conveyance path 1104 as a fourth conveyance path disposed in the sheet reverse device 110. The envelope conveyance path 1105 extends in a direction intersecting with a ground surface (X-Y plane) of the enclosing-sealing apparatus 100, more specifically, in an up-down direction (vertical direction) that is a direction (Z direction) orthogonal to the ground surface.

Figure 4:
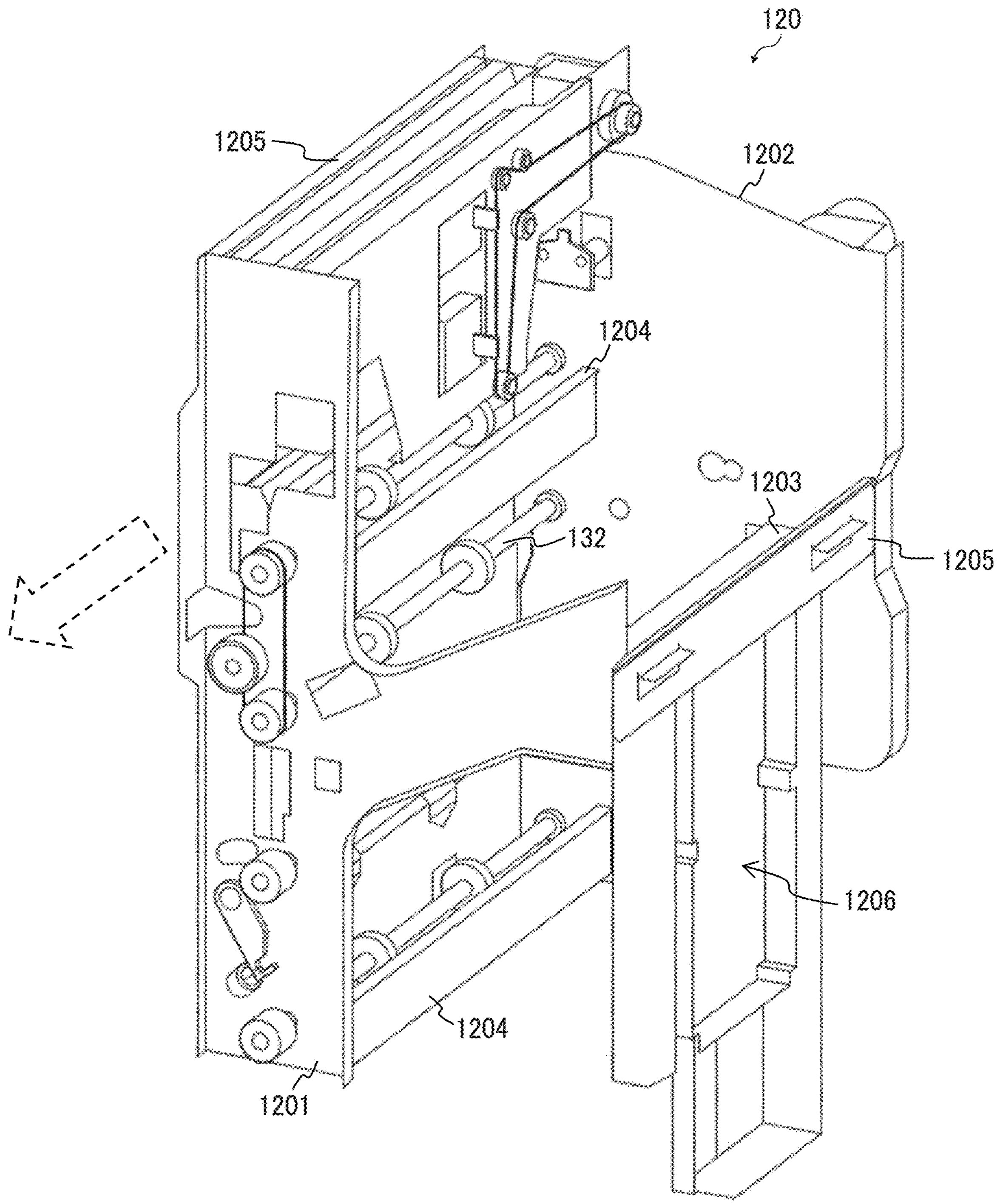
FIG. 4 is an overall perspective view of an enclosing device included in an enclosing-sealing apparatus according to an embodiment of the present disclosure.
Figure 5:
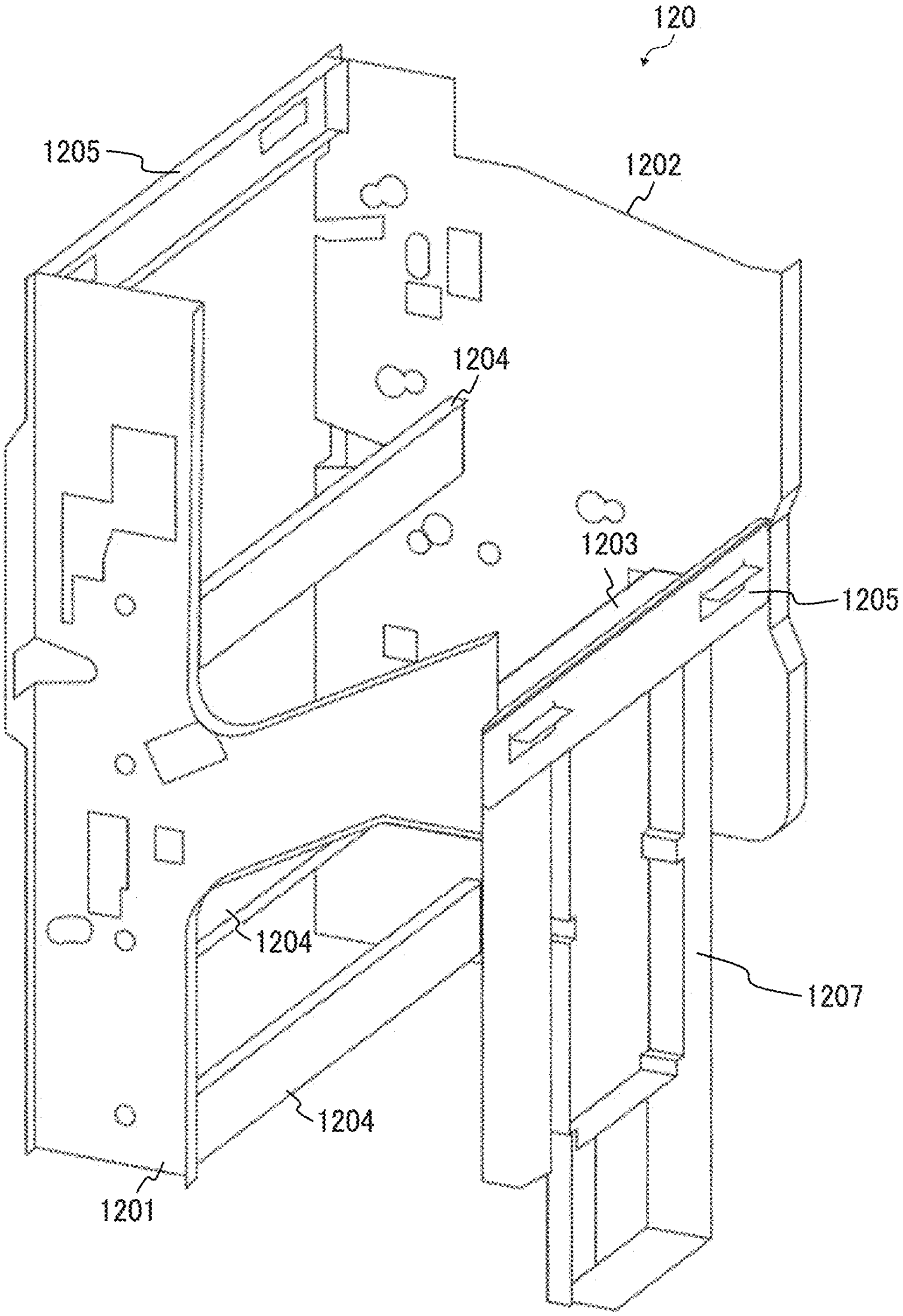
FIG. 5 is a diagram illustrating a frame structure of the enclosing device according to an embodiment of the present disclosure.

Here, the hardware configuration of the enclosing device 120 is described in detail. FIG. 4 is a perspective view of the enclosing device 120 illustrated in FIG. 3. FIG. 5 is a perspective view of a frame structure of the enclosing device 120 illustrated in FIG. 3. As illustrated in FIG. 5, the enclosing device 120 includes a board stay 1203, multiple reinforcing stays 1204, and multiple slide rail stays 1205 that connect a front plate 1201 and a rear plate 1202.

The board stay 1203 is attached with a board bracket 1207 that supports, for example, a control board 1206 of a motor that drives a conveyance roller and the like described below. The reinforcing stays 1204 maintain the strength of the enclosing device 120. The slide rail stays 1205 are fitted to and slide on slide rails disposed on the apparatus body of the enclosing-sealing apparatus 100 when the entire enclosing device 120 is pulled out from the enclosing-sealing apparatus 100 to the front side (in the direction indicated by a broken arrow in FIG. 4). As described above, the enclosing device 120 is unitized as a whole, and is configured such that, when the envelope E or the enclosure is jammed, or during maintenance of the devices constituting the enclosing device 120, the entire enclosing device 120 is pulled out to easily perform jam processing or maintenance work.

Figure 6:
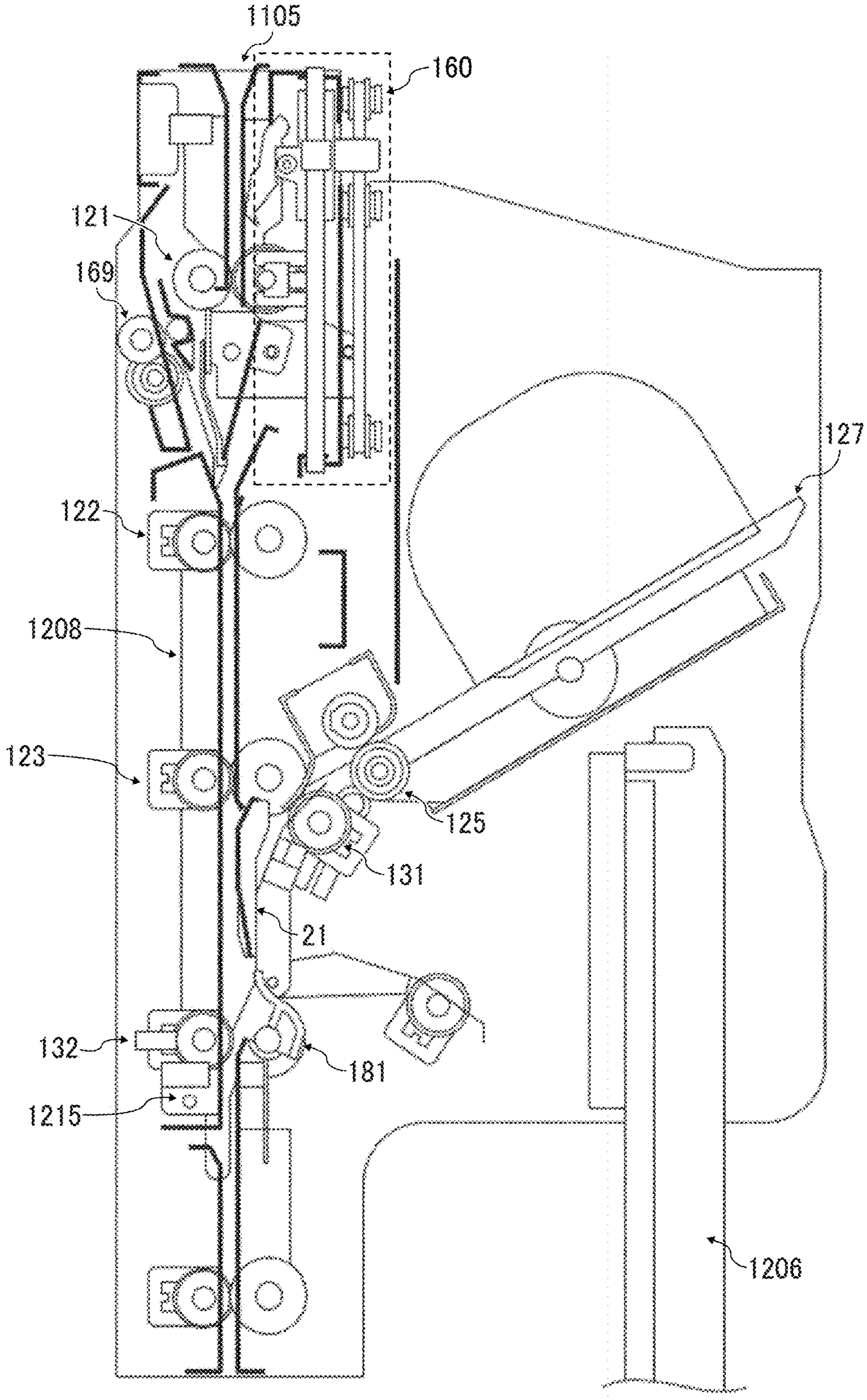
FIG. 6 is a cross-sectional view of the enclosing device according to an embodiment of the present disclosure.
Figure 7:
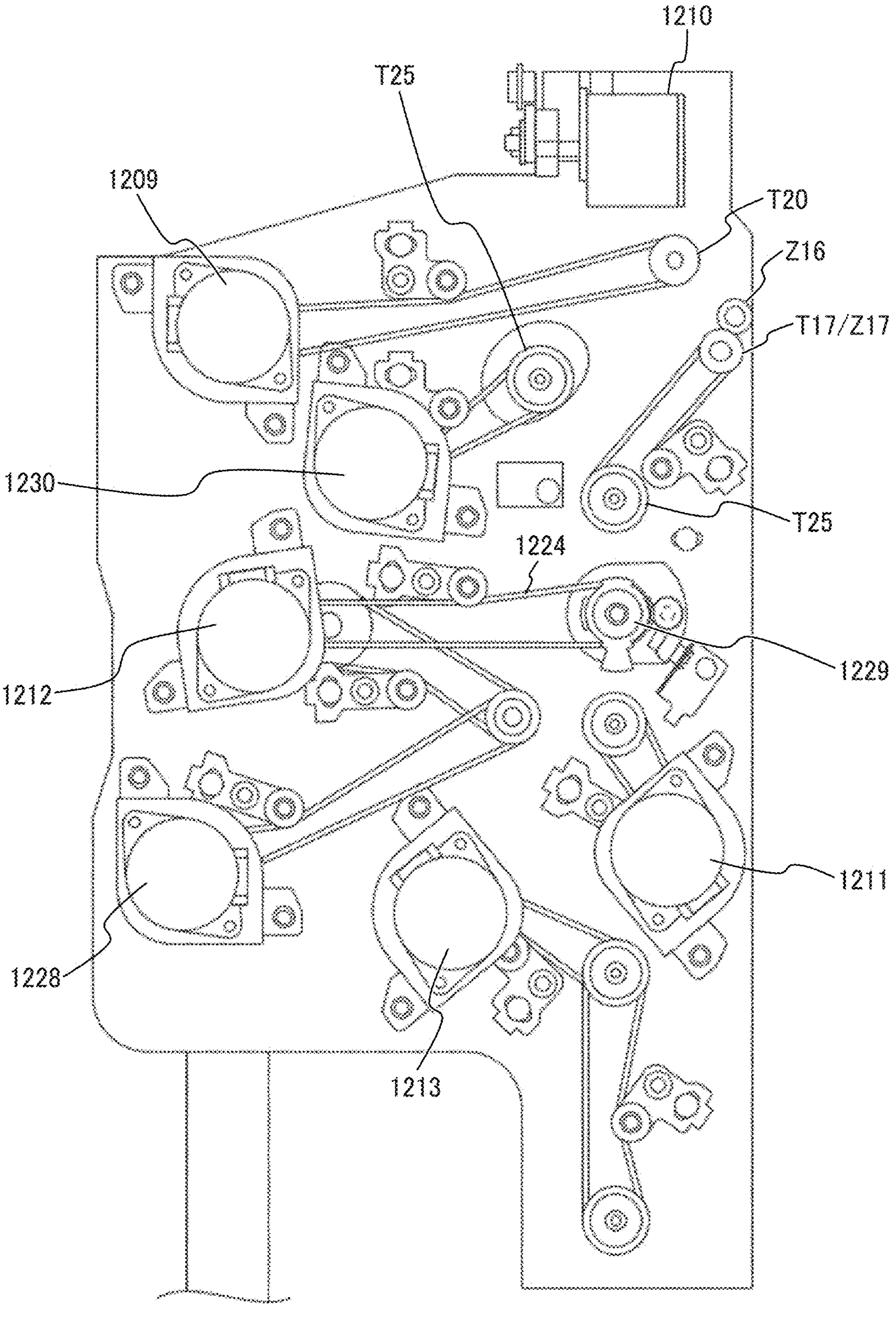
FIG. 7 is a diagram illustrating a drive configuration of the enclosing device according to an embodiment of the present disclosure.

FIG. 6 is a cross-sectional view of the enclosing device 120 illustrated in FIG. 3. FIG. 7 is a diagram illustrating a drive configuration of the enclosing device 120. FIG. 7 is a cross-sectional view of the enclosing device 120 viewed from the rear plate 1202.

As illustrated in FIG. 6, the unitized enclosing device 120 includes an envelope conveyance path 1105, an enclosing roller pair 121, an enclosure pusher 160, a flap holding roller pair 169, a first vertical conveyance roller pair 122, a second vertical conveyance roller pair 123, and an envelope switchback roller pair 132. The unitized enclosing device 120 also includes an envelope switchback roller pair 132, an envelope switchback switching pawl 21, and a flap scooping pawl 181 that constitute the flap opening unit 130. The unitized enclosing device 120 further includes an envelope load tray 127, a separating roller pair 125, and a feed roller 131 that constitute a sheet feeding unit.

Driven rollers of the first vertical conveyance roller pair 122, the second vertical conveyance roller pair 123, and the envelope switchback roller pair 132 are attached to the opening-closing guide plate 1208, and are brought into contact with and separated from driving rollers of the first vertical conveyance roller pair 122, the second vertical conveyance roller pair 123, and the envelope switchback roller pair 132 in accordance with the rotation of the opening-closing guide plate 1208.

The opening-closing guide plate 1208 is configured to open and close with an opening-closing guide-plate rotation shaft 1215 disposed in the vicinity of the envelope switchback roller pair 132 as a fulcrum. Further, as is described below, the opening-closing guide plate 1208 is constantly biased into a closed state by a biasing arm 1216.

As illustrated in FIG. 7, the rear plate 1202 of the enclosing device 120 includes an enclosure roller motor 1209, a pushing pawl motor 1210, a vertical conveyance roller motor 1211, a guide plate opening-closing motor 1212, a flap opening roller motor 1213, a feed roller motor 1228, and an enclosing pawl motor 1230. The enclosure roller motor 1209 drives the enclosing roller pair 121. The pushing pawl motor 1210 drives the pushing pawl 161 of the enclosure pusher 160. The vertical conveyance roller motor 1211 drives the flap holding roller pair 169, the first vertical conveyance roller pair 122, and the second vertical conveyance roller pair 123. The guide plate opening-closing motor 1212 rotates the opening-closing guide plate 1208. The feed roller motor 1228 drives the feed roller 131. The enclosing pawl motor 1230 rotates an enclosing pawl bracket 1233.

Figure 8:
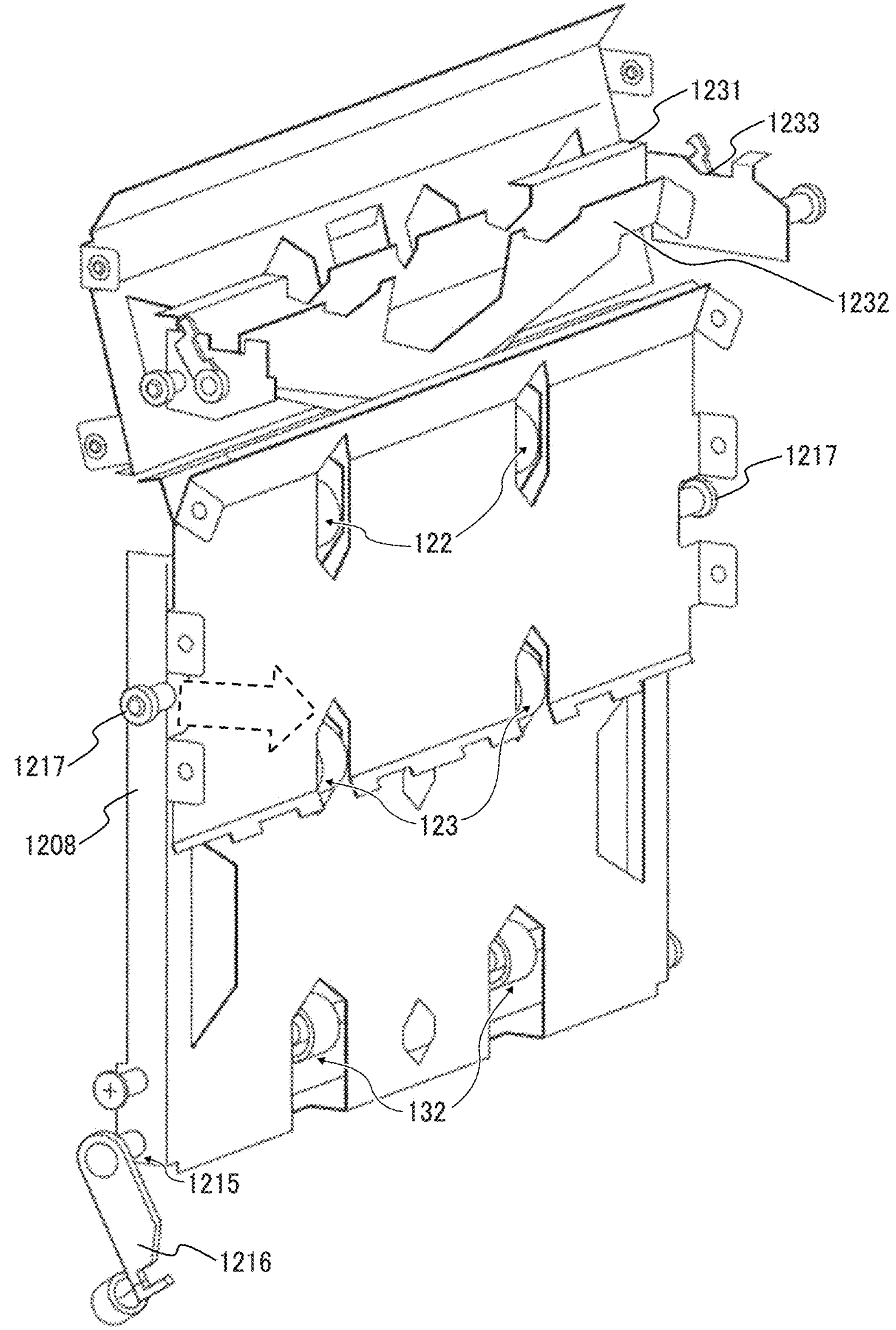
FIG. 8 is a perspective view of an opening-closing guide plate included in the enclosing device according to an embodiment of the present disclosure.
Figure 9:
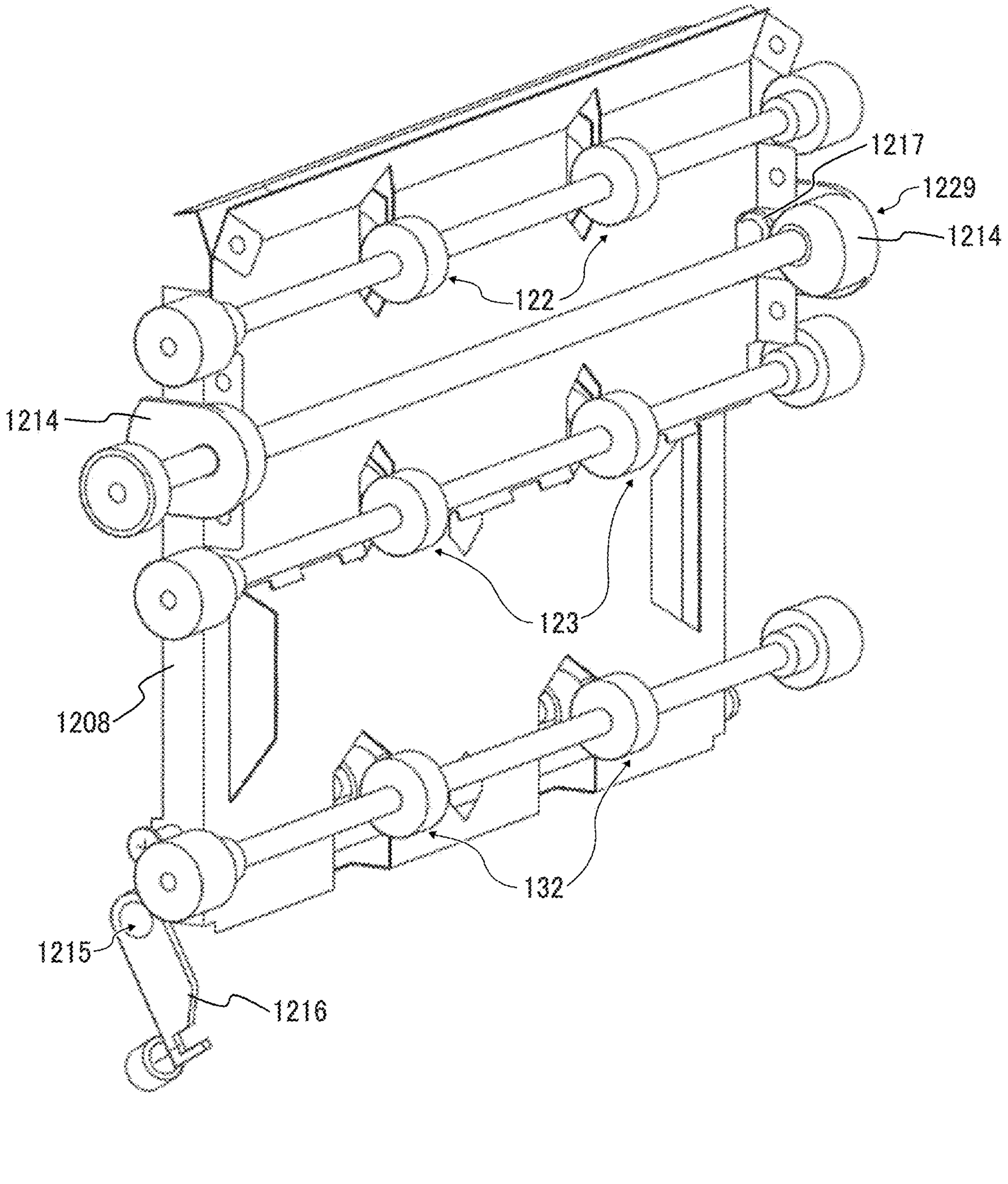
FIG. 9 is a diagram illustrating an opening-closing drive mechanism of the opening-closing guide plate included in the enclosing device.
Figure 10:
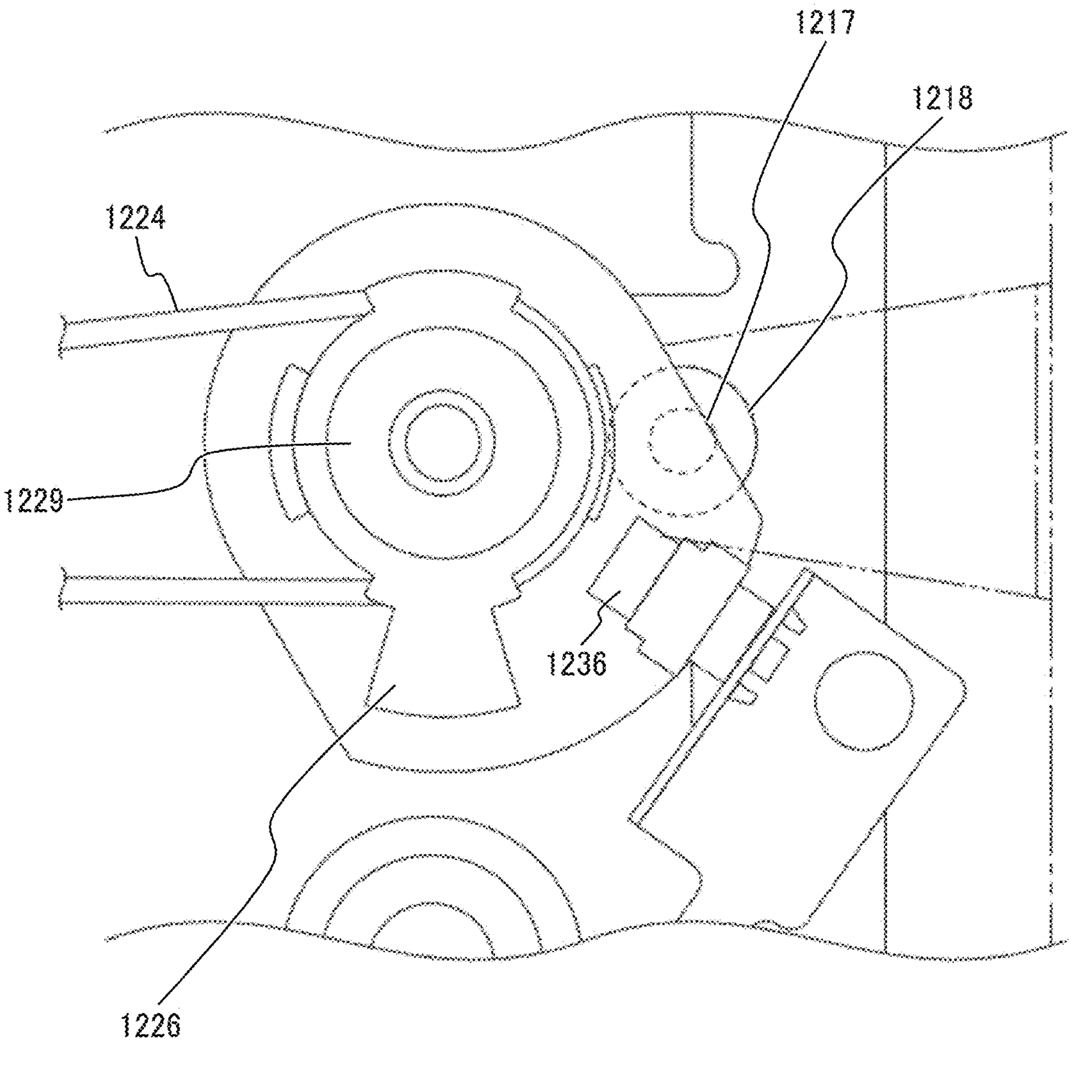
FIG. 10 is a diagram illustrating a cam mechanism of the opening-closing guide plate included in the enclosing device.
Figure 11:
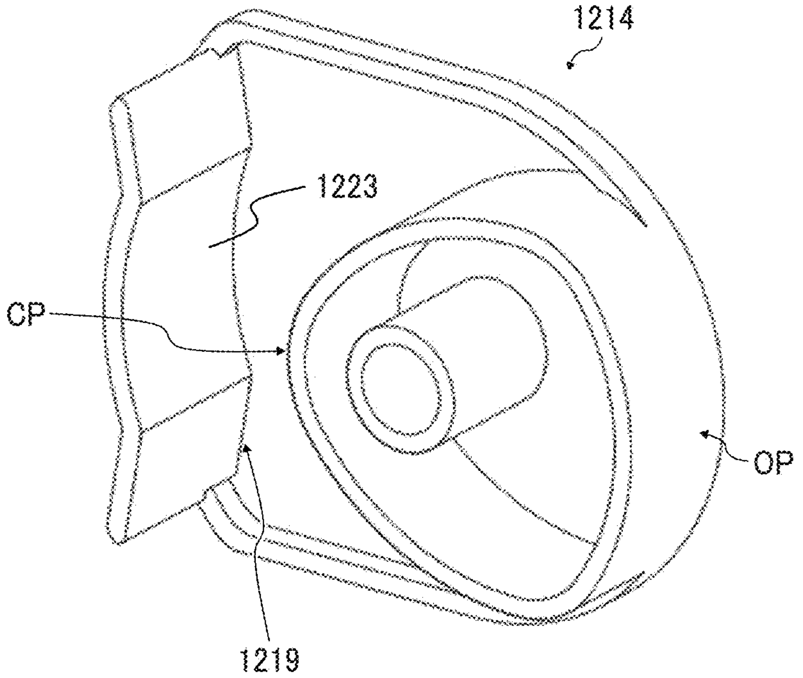
FIG. 11 is a perspective view of an opening-closing cam of the opening-closing guide plate included in the enclosing device.
Figure 12:
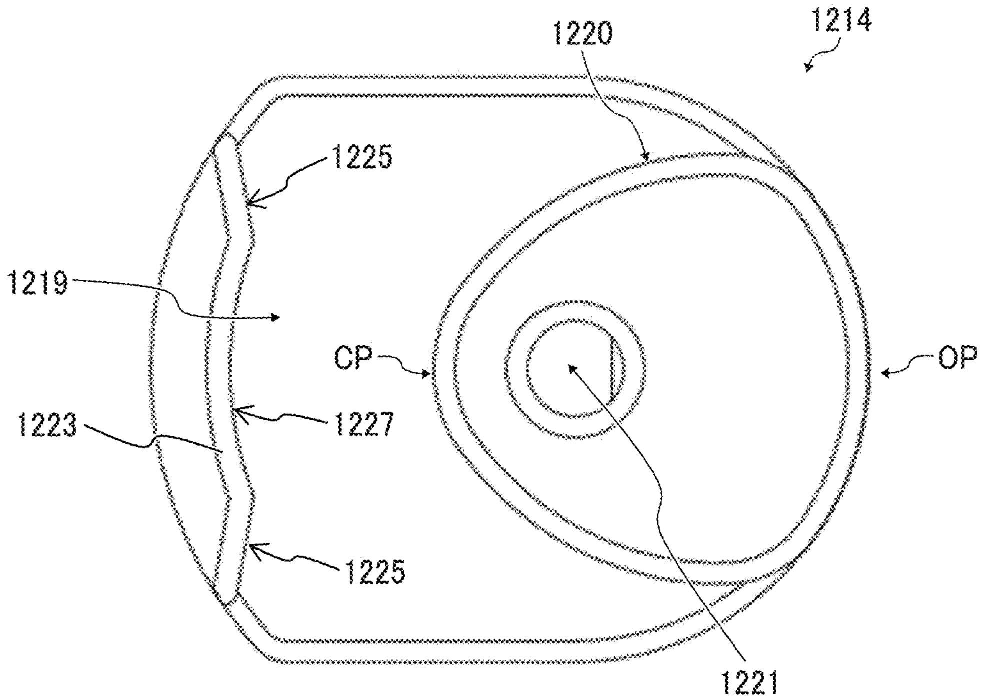
FIG. 12 is a front view of the opening-closing cam of the opening-closing guide plate included in the enclosing device.

FIG. 8 is a perspective view of the opening-closing guide plate 1208 viewed from the front side (conveyance path side). FIG. 9 is a perspective view of an opening-closing drive mechanism of the opening-closing guide plate 1208. FIG. 10 is a diagram illustrating a cam mechanism of the opening-closing guide plate 1208. FIG. 11 is a perspective view of the opening-closing cam 1214 of the opening-closing guide plate 1208. FIG. 12 is a front view of the opening-closing cam 1214 of the opening-closing guide plate 1208. The driven rollers of the first vertical conveyance roller pair 122, the second vertical conveyance roller pair 123, and the envelope switchback roller pair 132 are rotatably attached to the opening-closing guide plate 1208.

Above the opening-closing guide plate 1208, a main enclosing pawl 1231 and a sub-enclosing pawl 1232 that operate to widen the mouth of the envelope E are rotatably supported by an enclosing pawl bracket 1233 so that an enclosure can be easily inserted into the envelope E. An enclosing pawl motor 1230 rotates the enclosing pawl bracket 1233 in a direction to widen the mouth of the envelope E. Accordingly, the main enclosing pawl 1231 and the sub-enclosing pawl 1232 are inserted into the mouth of the envelope E. Thus, the enclosure passes between the main enclosing pawl 1231 and the sub-enclosing pawl 1232 to be inserted into the envelope E.

An end of the opening-closing guide plate 1208 on which the first vertical conveyance roller pair 122 is disposed rotates about the opening-closing guide-plate rotation shaft 1215 as a fulcrum. The opening-closing guide-plate rotation shaft 1215 is provided with the biasing arm 1216, and the opening-closing guide plate 1208 is biased by the biasing arm 1216 in a direction indicated by a broken arrow in FIG. 8. As a result, the driven rollers of the first vertical conveyance roller pair 122, the second vertical conveyance roller pair 123, and the envelope switchback roller pair 132 are pressed against the driving rollers of the first vertical conveyance roller pair 122, the second vertical conveyance roller pair 123, and the envelope switchback roller pair 132 to convey the envelope.

As illustrated in FIG. 9, an opening-closing cam 1214 that switches the opening and closing positions of the opening-closing guide plate 1208 is rotatably disposed on the apparatus body side of the enclosing device 120.

As illustrated in FIGS. 11 and 12, the opening-closing cam 1214 has a locking-pin fitting groove 1219 to fit with a ball bearing 1218 of a locking pin 1217 disposed on each of the front and rear surfaces of the opening-closing guide plate 1208. The opening-closing cam 1214 includes a cam surface 1220 to contact the ball bearing 1218 as the opening-closing cam 1214 rotates in order to switch the opening and closing positions of the opening-closing guide plate 1208.

As illustrated in FIG. 12, the cam surface 1220 has a shape in which the distance from a cam rotation center 1221 to a cam surface 1220 decreases from an open position OP toward a closed position CP. The opening-closing cam 1214 is provided with an opening prevention stopper 1223 for holding the opening-closing guide plate 1208 at the closed position CP. The opening prevention stopper 1223 has a pull-in surface 1225 for pulling the ball bearing 1218 of the opening-closing guide plate 1208 into the locking-pin fitting groove 1219 when the opening-closing guide plate 1208 is switched from the open position OP to the closed position CP. The opening prevention stopper 1223 also has a holding surface 1227 that abuts against the ball bearing 1218 when the opening-closing guide plate 1208 is held at the closed position CP.

The opening-closing cam 1214 is united with a drive pulley (e.g., a guide-plate opening-closing pulley 1229 in FIG. 7). As illustrated in FIG. 7, the drive pulley and a guide-plate opening-closing motor 1212 are connected by a belt 1224, and the driving force of the guide-plate opening-closing motor 1212 is transmitted to the opening-closing cam 1214. The drive pulley is provided with a detection feeler 1226 that detects the home position of the opening-closing cam 1214 (the closed position CP of the opening-closing cam 1214). A home position sensor 1236 is installed at a position where the detection feeler 1226 can be detected at the time corresponding to the closed position CP.

Figure 19:
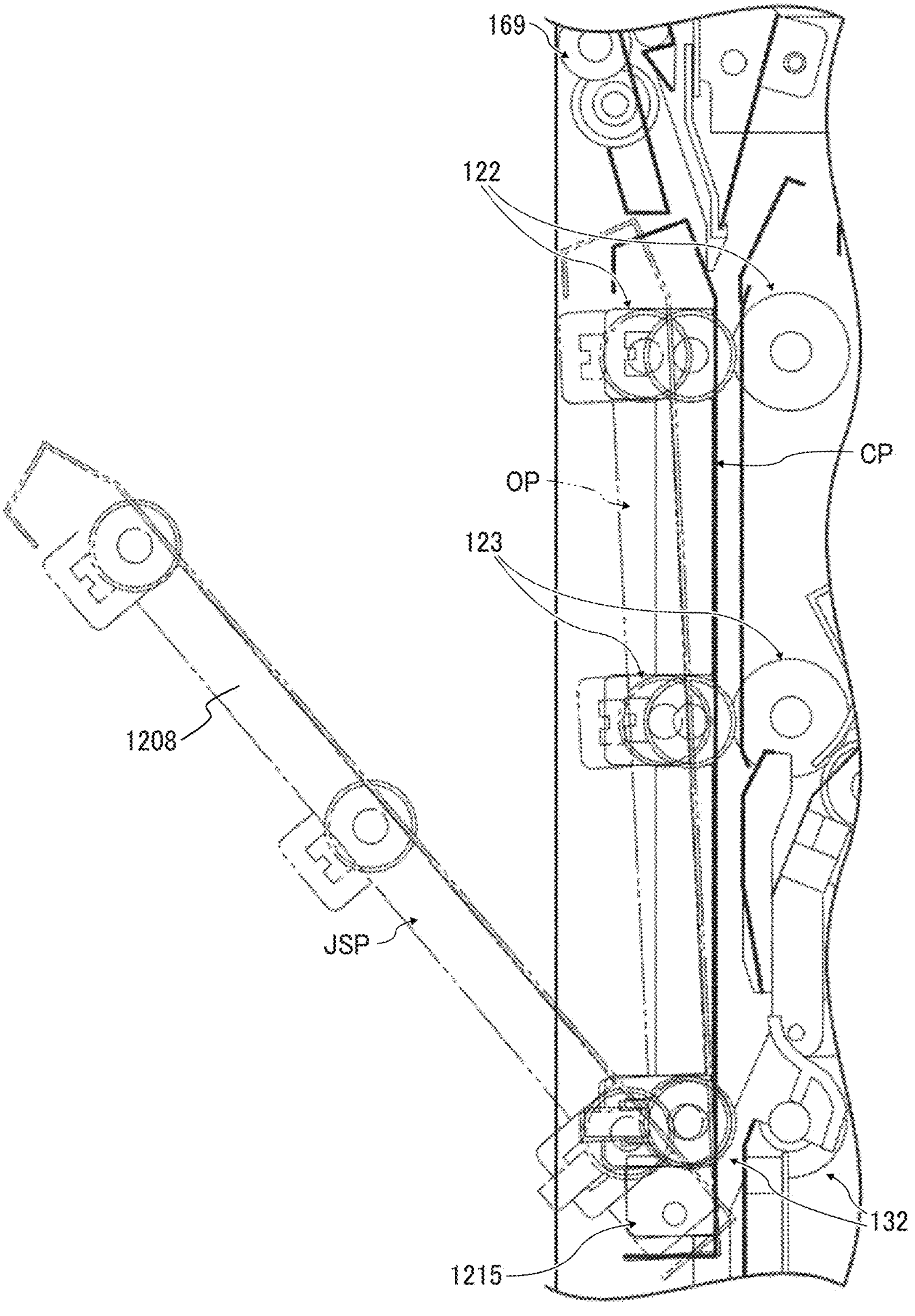
FIG. 19 is a diagram illustrating open and closed states of the opening-closing guide plate included in the enclosing device.
Figure 20:
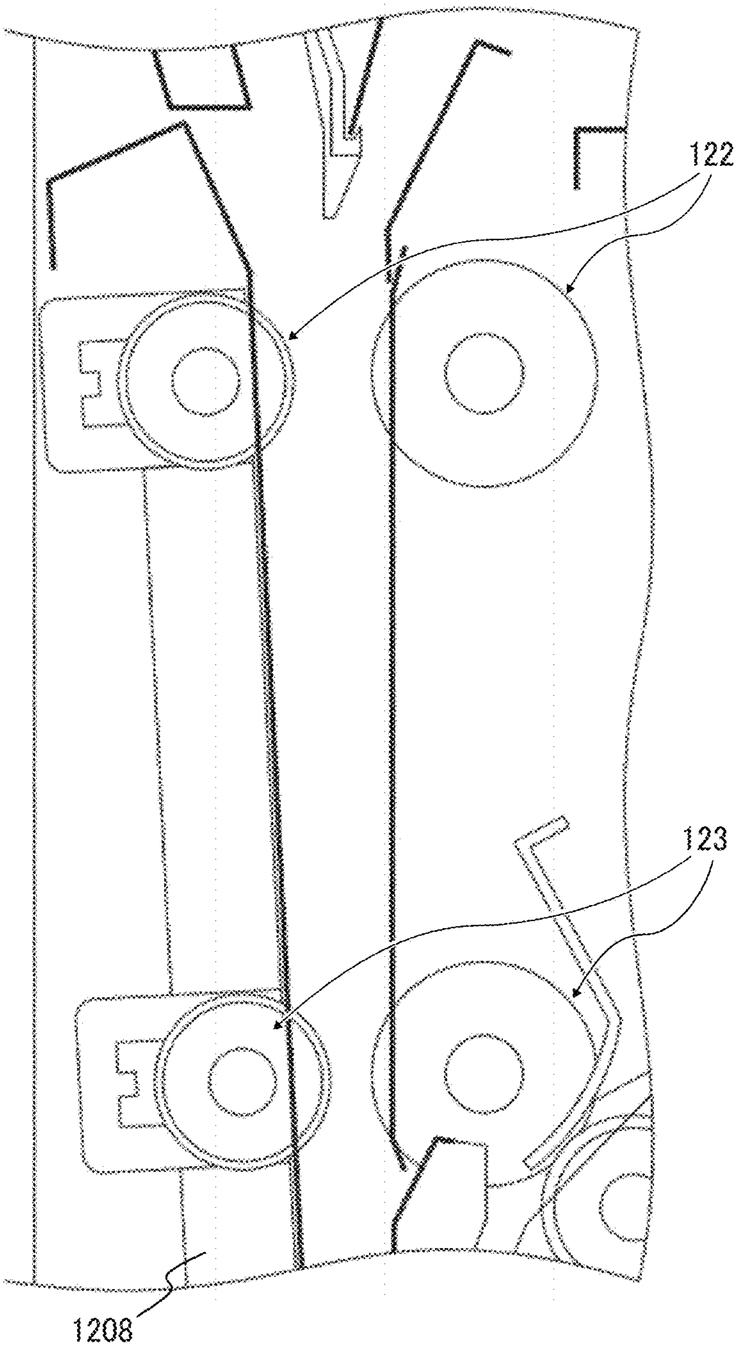
FIG. 20 is a partially enlarged view of the open and closed states of the opening-closing guide plate included in the enclosing device.

FIGS. 13 to 18 are diagrams illustrating an opening-closing operation of the opening-closing guide plate 1208 for each step. FIG. 19 is a diagram illustrating opened and closed states of the opening-closing guide plate 1208. FIG. 20 is a diagram illustrating a state of the opening-closing guide plate 1208 when an enclosure is enclosed in an envelope E by the enclosure pusher 160 (see FIG. 22). The opening-closing guide plate 1208 is constantly biased by the biasing arm 1216 in a direction indicated by a dotted arrow X in FIGS. 13 to 18, which is the same as the broken arrow in FIG. 8.

Figure 15:
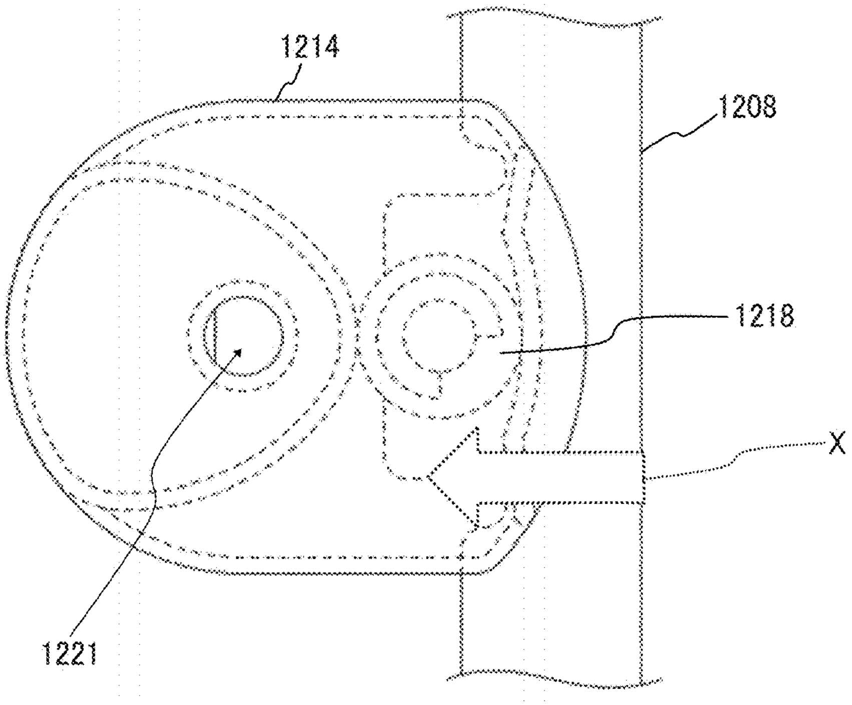
FIG. 15 is a diagram illustrating one step (a closed position) of the opening-closing operation of the opening-closing guide plate included in the enclosing device.

When the envelope E fed from the envelope load tray 127 serving as an envelope hold tray is conveyed toward the enclosure pusher 160 by the first vertical conveyance roller pair 122, the second vertical conveyance roller pair 123, and the envelope switchback roller pair 132 (see FIG. 26), the opening-closing cam 1214 is positioned in the state of FIG. 15 (closed position CP). When the envelope E in which the enclosure has been inserted is conveyed toward a sealing mechanism 145 by the enclosure pusher 160 (see FIG. 30), the opening-closing cam 1214 is also positioned in the state of FIG. 15 (closed position CP).

The opening-closing guide plate 1208 at this time is in the state at the closed position CP indicated by the solid line in FIG. 19. In this state, the driven rollers of the first vertical conveyance roller pair 122, the second vertical conveyance roller pair 123, and the envelope switchback roller pair 132 are pressed against the driving rollers by the biasing force of the biasing arm 1216, so that the envelope E can be conveyed.

When the enclosure is inserted into the envelope E by the enclosure pusher 160 (see FIGS. 29 and 30), the paired rollers of each of the first vertical conveyance roller pair 122 and the second vertical conveyance roller pair 123 are separated from each other before the enclosure reaches the enclosure pusher 160. In this case, in response to a detection that the enclosure has reached a predetermined position on the conveyance path, the opening-closing cam 1214 starts rotating counterclockwise from the state illustrated in FIG. 15.

Figure 16:
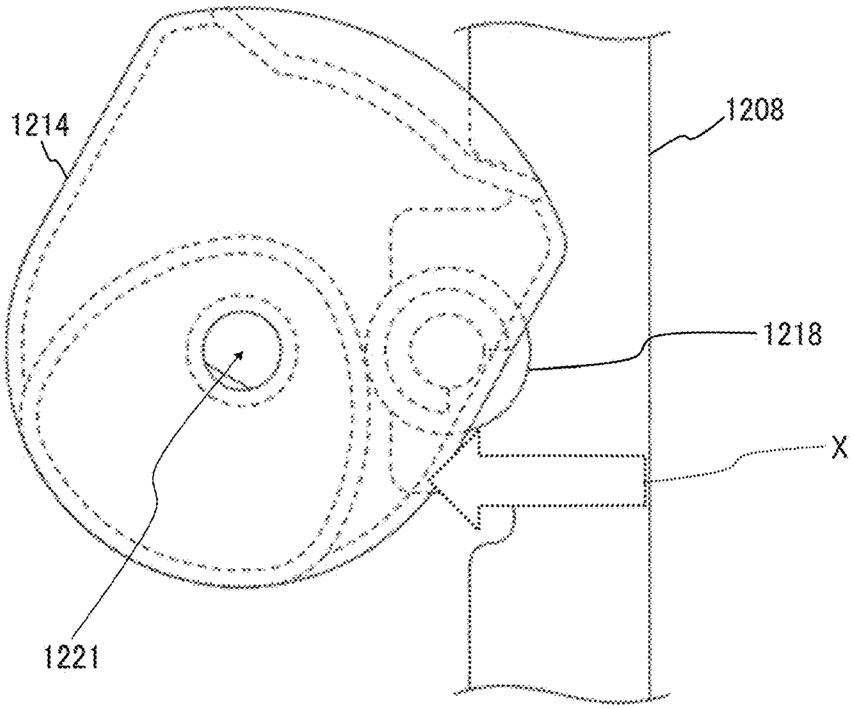
FIG. 16 is a diagram illustrating one step of an opening-closing operation of the opening-closing guide plate included in the enclosing device.
Figure 17:
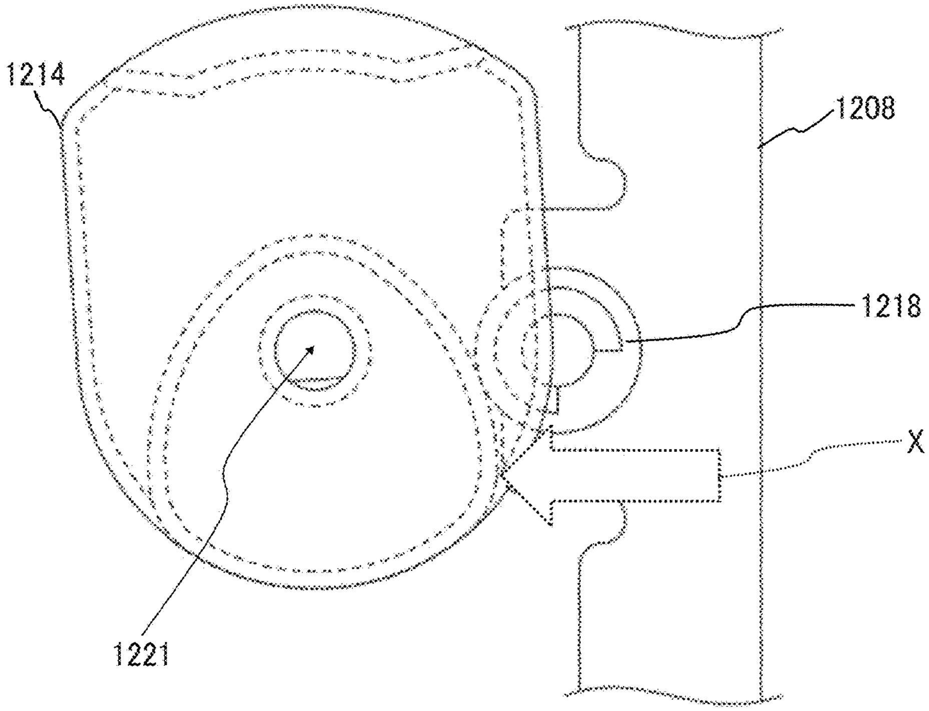
FIG. 17 is a diagram illustrating one step of an opening-closing operation of the opening-closing guide plate included in the enclosing device.

Then, the rotation is continued as illustrated in FIGS. 16 and 17. Meanwhile, the ball bearing 1218 on the opening-closing guide plate 1208 is constantly pressed against the cam surface 1220 of the opening-closing cam 1214 by the biasing force of the biasing arm 1216. The opening-closing cam 1214 further continues to rotate against the biasing force of the biasing arm 1216, thus moving the opening-closing guide plate 1208 to the state (open position OP) illustrated in FIG. 18 and stopping the rotation. In this state, the driven rollers of the first vertical conveyance roller pair 122 and the second vertical conveyance roller pair 123 are separated from the driving rollers. Thus, the enclosure can be inserted into the envelope E by the enclosure pusher 160 (when the opening-closing guide plate 1208 is in the open position OP illustrated in FIG. 19 and in the state of FIG. 20).

Figure 13:
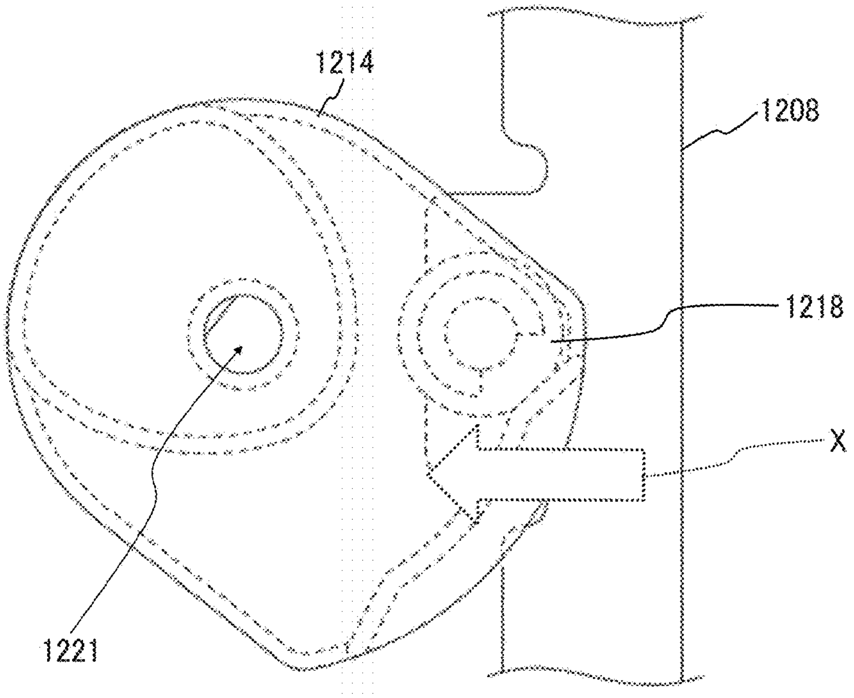
FIG. 13 is a diagram illustrating one step of an opening-closing operation of the opening-closing guide plate included in the enclosing device.
Figure 14:
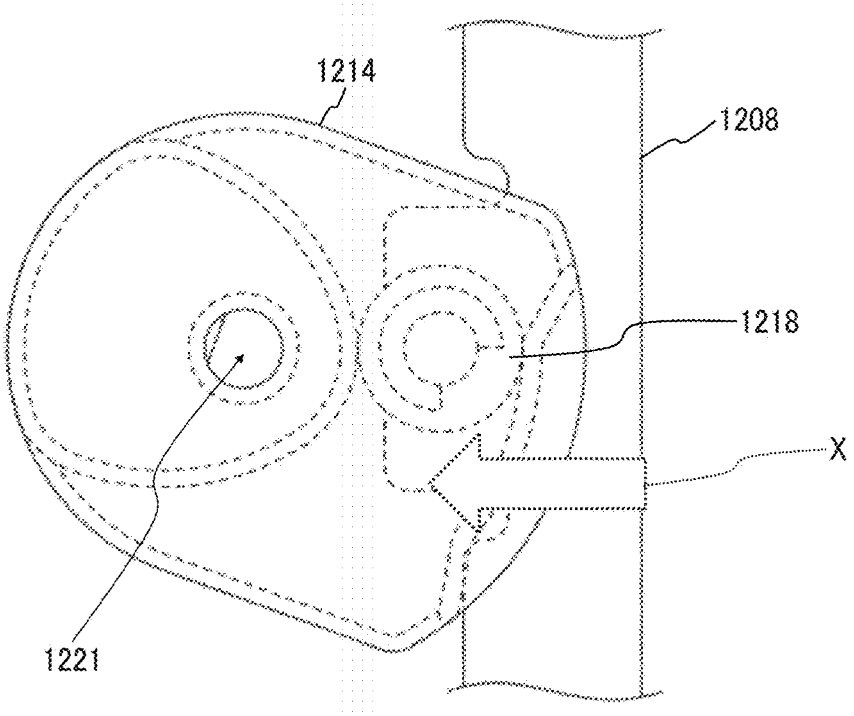
FIG. 14 is a diagram illustrating one step of an opening-closing operation of the opening-closing guide plate included in the enclosing device.
Figure 18:
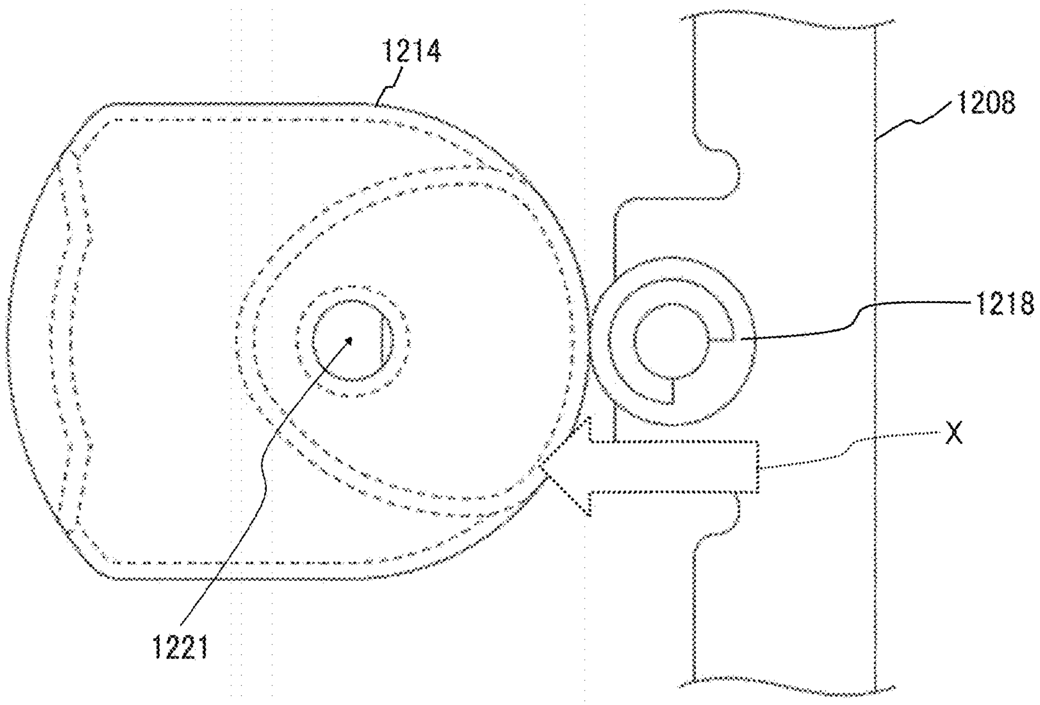
FIG. 18 is a diagram illustrating one step (an open position) of the opening-closing operation of the opening-closing guide plate included in the enclosing device.

When the insertion of the enclosure into the envelope E by the enclosure pusher 160 is completed (see FIG. 30), the opening-closing cam 1214 starts rotating again from the state illustrated in FIG. 18 and continues rotating as illustrated in FIGS. 13 and 14. At this time, the ball bearing 1218 of the opening-closing guide plate 1208 is pulled into the locking-pin fitting groove 1219 by the action of the pull-in surface 1225 disposed on the opening prevention stopper 1223 of the opening-closing cam 1214. Thereafter, the opening-closing cam 1214 continues rotating while causing the cam surface 1220 to slidingly contact the ball bearing 1218 of the opening-closing guide plate 1208, and finally stops rotating when the opening-closing cam 1214 reaches the state illustrated in FIG. 15.

When the envelope E or the enclosure is jammed or when the maintenance of the devices constituting the enclosing device 120 is performed, the entire enclosing device 120 is pulled out and then the opening-closing guide plate 1208 is rotated to the jam processing position JSP illustrated in FIG. 19, so that the jam processing or the maintenance work can be easily performed.

The enclosing device 120 having the above-described configuration conveys the envelope E via the envelope conveyance path 1105 (including switchback conveyance). As a result of this conveyance operation, the envelope E is conveyed to a predetermined enclosing position, and the enclosure inserted into the envelope E is conveyed through the enclosing conveyance path 1104 connected to the envelope conveyance path 1105.

As illustrated in FIG. 3, the envelope E in which the enclosure is enclosed is conveyed from the envelope conveyance path 1105 to an sealing path 1106 described below and is ejected to the envelope ejection tray 144. That is, the configuration in which the envelope E is ejected by performing the enclosing operation and the sealing operation is disposed in the vertical direction of the apparatus. Such a configuration can reduce the installation area of the enclosing-sealing apparatus 100 and also reduce the size of the entire apparatus.

The envelope conveyance path 1105 includes an envelope holding mechanism that conveys the envelope E to a sealing position as a predetermined position and holds the envelope E such that the enclosure is enclosed.

The envelope conveyance path 1105 adjoins a sealing path 1106 for performing sealing processing on the envelope E in which the enclosure has been enclosed.

The envelope conveyance path 1105 is provided with the first vertical conveyance roller pair 122 and the second vertical conveyance roller pair 123 as an envelope conveyor that conveys the envelope E to a reception position where the envelope E receives the folded sheet Sf. In the envelope conveyance path 1105, the enclosing roller pair 121 serving as an enclosure supplier or enclosure conveyor that supplies an enclosure to the envelope E are disposed above the first vertical conveyance roller pair 122 (in the positive Z-direction).

With respect to the envelope E conveyed and held at the sealing position by the first vertical conveyance roller pair 122 and the second vertical conveyance roller pair 123, the enclosing roller pair 121 conveys the enclosure in the enclosing direction (negative Z-direction) to perform the sealing operation.

The enclosure pusher 160 is disposed between the enclosing roller pair 121 and the first vertical conveyance roller pair 122 and on a lateral side of the envelope conveyance path 1105, and performs an operation of pushing the enclosure toward the mouth of the envelope E during the enclosing operation.

The flap opening unit 130 is disposed at a junction position of the conveyance path extending from the envelope conveyance path 1105 to the sealing path 1106. The flap opening unit 130 includes the feed roller 131 and the envelope switchback roller pair 132. The feed roller 131 conveys the envelope E taken out from the envelope load tray 127 toward a first branch position, and the envelope switchback roller pair 132 serves as a switchback conveyor.

The feed roller 131 is disposed in an envelope entry path 1107 serving as an envelope supply path. The feed roller 131 includes a flap opener 180 that opens a flap portion ef of the envelope E carried out from the envelope load tray 127.

An envelope switchback switching pawl 21 is disposed at the junction position where the envelope entry path 1107 adjoins the envelope conveyance path 1105.

The envelope switchback roller pair 132 is disposed below (in the negative Z-direction) the envelope switchback switching pawl 21 and below (in the negative Z-direction) the first branch position at which the envelope entry path 1107 adjoins the envelope conveyance path 1105.

The envelope switchback roller pair 132 disposed below the first branch position and the first vertical conveyance roller pair 122 disposed above the first branch position constitute a first conveyance roller pair.

The separating roller pair 125 is disposed in the envelope entry path 1107 adjoining the envelope conveyance path 1105. The separating roller pair 125 takes one of the stacked envelopes E out from the envelope load tray 127. The separating roller pair 125 and the feeding roller 131 as an envelope supplier supply the envelope E to the envelope conveyance path 1105. That is, the separating roller pair 125 and the feed roller 131 convey the envelope E to the first branch position.

As illustrated in FIG. 3, multiple envelopes E are placed on the envelope load tray 127. Each of the envelopes E placed on the envelope load tray 127 includes the bottom, that is, an opposite end being opposite to the flap portion ef. The bottom of the envelope E faces the separating roller pair 125. Hence, the bottom of the envelope E serves as the leading end of the envelope E in the envelope conveyance direction DE when the envelope E is ejected from the envelope load tray 127.

That is, in the present embodiment, the bottom of an envelope E separated from envelopes E stacked on the envelope load tray 127 corresponds to the "leading end in the conveyance direction". An end of the envelope E on which the flap portion ef is disposed corresponds to the "trailing end in the conveyance direction". The "trailing end in the conveyance direction" in a state where the flap portion ef is closed is a folding position of the flap portion ef in the envelope E, and the "trailing end in the conveyance direction" in a state where the flap portion ef is open is an end of the flap portion ef.

One envelope E is picked up from multiple envelopes E placed on the envelope load tray 127 by the separating roller pair 125 and is conveyed to a position beyond the envelope switchback switching pawl 21 by the feed roller 131 and the envelope switchback roller pair 132.

The envelope switchback switching pawl 21 pivots between a first position and a second position. At the first position, the envelope switchback switching pawl 21 temporarily guides the envelope E picked up from the envelope load tray 127 to the sealing path 1106. At the second position, the envelope switchback switching pawl 21 guides the envelope E to the envelope conveyance path 1105 so that the envelope E is conveyed toward the sheet reverse device 110 through the envelope conveyance path 1105. In other words, the envelope switchback switching pawl 21 is a member that switches the conveyance direction of the envelope E.

The first vertical conveyance roller pair 122 and the second vertical conveyance roller pair 123 convey the envelope E to the predetermined position in the envelope conveyance path 1105 and hold the envelope E. At the predetermined position, as described below, the mouth of the envelope E (e.g., the flap portion ef) is situated below the enclosing roller pair 121 and above the first vertical conveyance roller pair 122 in FIG. 3.

The enclosing roller pair 121 is one type of a pair of conveyance rollers, that rotates in the enclosing direction in which the folded sheet Sf conveyed from the sheet reverse device 110 is inserted into the envelope E.

A description is provided of a construction of the sealing device 140.

As illustrated in FIG. 3, the sealing device 140 includes a third vertical conveyance roller pair 141 and a fourth vertical conveyance roller pair 142 serving as a switchback conveyor that are disposed in the sealing path 1106. The sealing device 140 further includes an envelope ejection path 1108 serving as an envelope ejection path that branches from the sealing path 1106 at a second branching position. An envelope ejecting switching pawl 31 is disposed at the second branch position. An envelope ejecting roller pair 143 is disposed at an end of the envelope ejection path 1108.

The third vertical conveyance roller pair 141 and the fourth vertical conveyance roller pair 142 constitute a second conveyance roller pair, and convey the envelope E to a predetermined position in the sealing path 1106 and hold the envelope E at the predetermined position.

The envelope ejecting switching pawl 31 pivots between a first position and a second position. At the first position, the envelope ejecting switching pawl 31 guides the envelope E from the feed roller 131 to the third vertical conveyance roller pair 141 through the enclosing conveyance path 1104. At the second position, the envelope ejecting switching pawl 31 guides the envelope E from the enclosing conveyance path 1104 to the envelope ejecting path 1108. Thus, the envelope ejecting switching pawl 31 switches a conveyance direction of the envelope E.

The sealing mechanism 145 as a sealer that performs "sealing processing" for closing the flap portion ef is disposed in the sealing path 1106. If the flap portion ef of the envelope E conveyed by the third vertical conveyance roller pair 141 and the fourth vertical conveyance roller pair 142 is open, the sealing mechanism 145 closes the flap portion ef.

The envelope ejecting roller pair 143 ejects the envelope E onto the envelope ejection tray 144.

The envelope ejection tray 144 serving as an envelope stacker is a tray on which the ejected envelope E is placed.

As described above, in the enclosing-sealing apparatus 100, the conveyance paths (e.g., the envelope conveyance path 1105 and the sealing path 1106) that convey the folded sheet Sf from the sheet reverse device 110 to the enclosing device 120 and the sealing device 140 are arranged contiguously and vertically in the Z-direction. The conveyance paths that convey the folded sheet Sf and the envelope E construct a vertical conveyance path that couples the envelope conveyance path 1105 of the enclosing device 120 with the sealing path 1106 of the sealing device 140 vertically in the Z-direction.

A construction of the flap opener 180 is described below in detail.

Here, the details of the flap opener 180 as a flap opener included in the envelope switchback roller pair 132 is described with reference to FIG. 21. The flap opener 180 includes a flap scooping pawl 181 and a spring 182. The flap scooping pawl 181 is pivotally attached to a rotation shaft of one of a pair of conveyance rollers constructing the envelope switchback roller pair 132. The spring 182 biases the flap scooping pawl 181.

Figure 21:
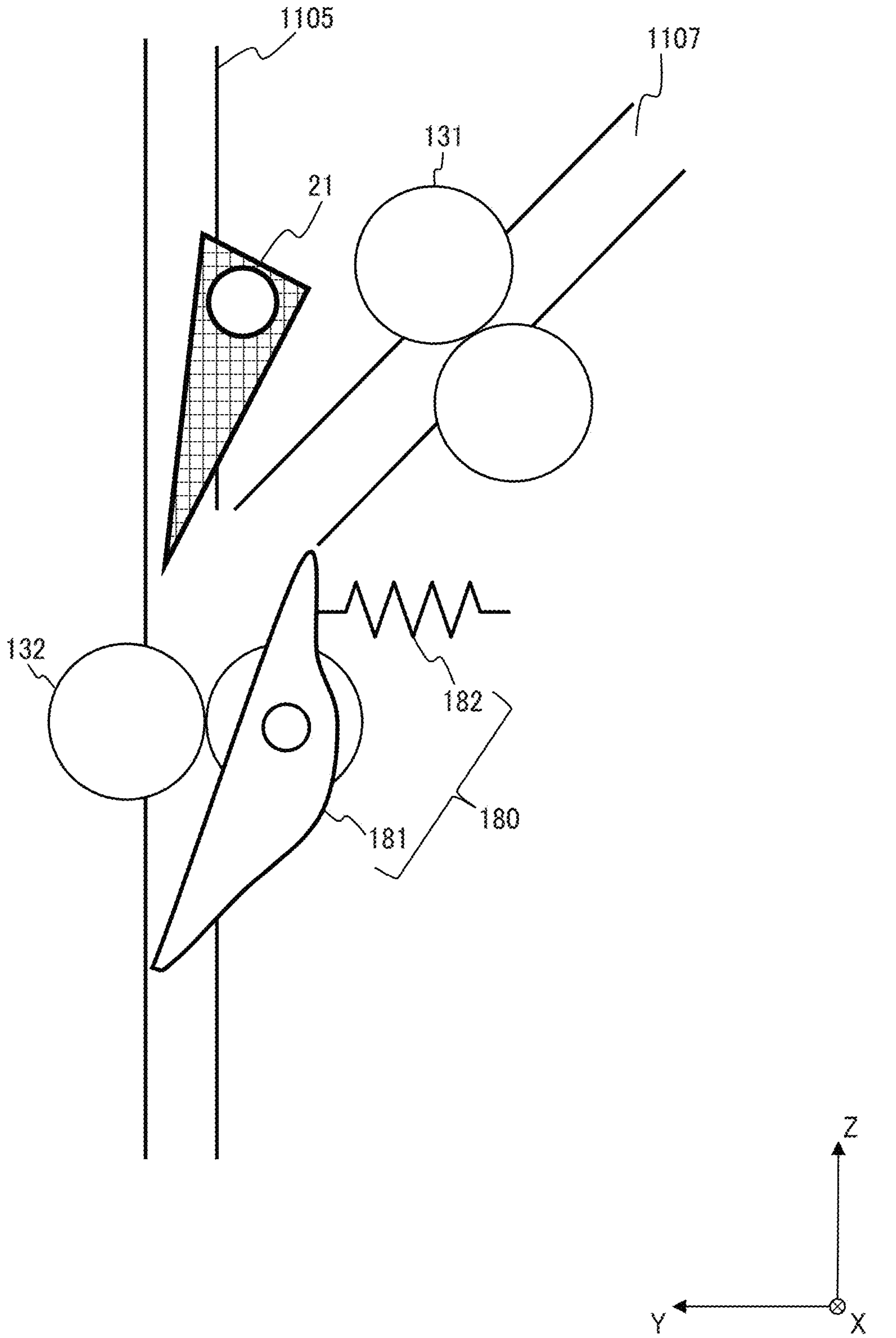
FIG. 21 is a diagram illustrating a schematic configuration of a flap opener included in the enclosing-sealing apparatus, according to an embodiment of the present disclosure.

The flap scooping pawl 181 is pressed by the bottom of the envelope E having been conveyed through the envelope entry path 1107 and rotates in the counterclockwise direction in FIG. 21. By this operation, the envelope E can pass through the envelope entry path 1107. The flap scooping pawl 181 normally remains in contact with an inner wall of the envelope entry path 1107 in the state of being rotated in the clockwise direction in FIG. 21 by the biasing force of the spring 182. In this state, the envelope entry path 1107 is closed.

When the bottom of the envelope E conveyed through the envelope entry path 1107 is conveyed toward the envelope switchback roller pair 132 while pushing the flap scooping pawl 181, the flap portion ef is caught by the top portion of the flap scooping pawl 181. When the envelope E is further conveyed in this state, the envelope E is further conveyed to the envelope conveyance path 1105 by the feed roller 131 and the envelope switchback roller pair 132 in the state where the flap portion ef is in contact with the top portion. When the flap portion ef passes through the feed roller 131, the flap portion ef is open. Accordingly, the envelope E with the flap portion ef opened is conveyed in the negative Z-direction by the envelope switchback roller pair 132. Thereafter, when the envelope E is switched back and conveyed in the positive Z-direction by the envelope switchback roller 132, the flap portion ef of the envelope E is in an open state, and thus is in a state in which the envelope E can receive the enclosure.

Figure 22:
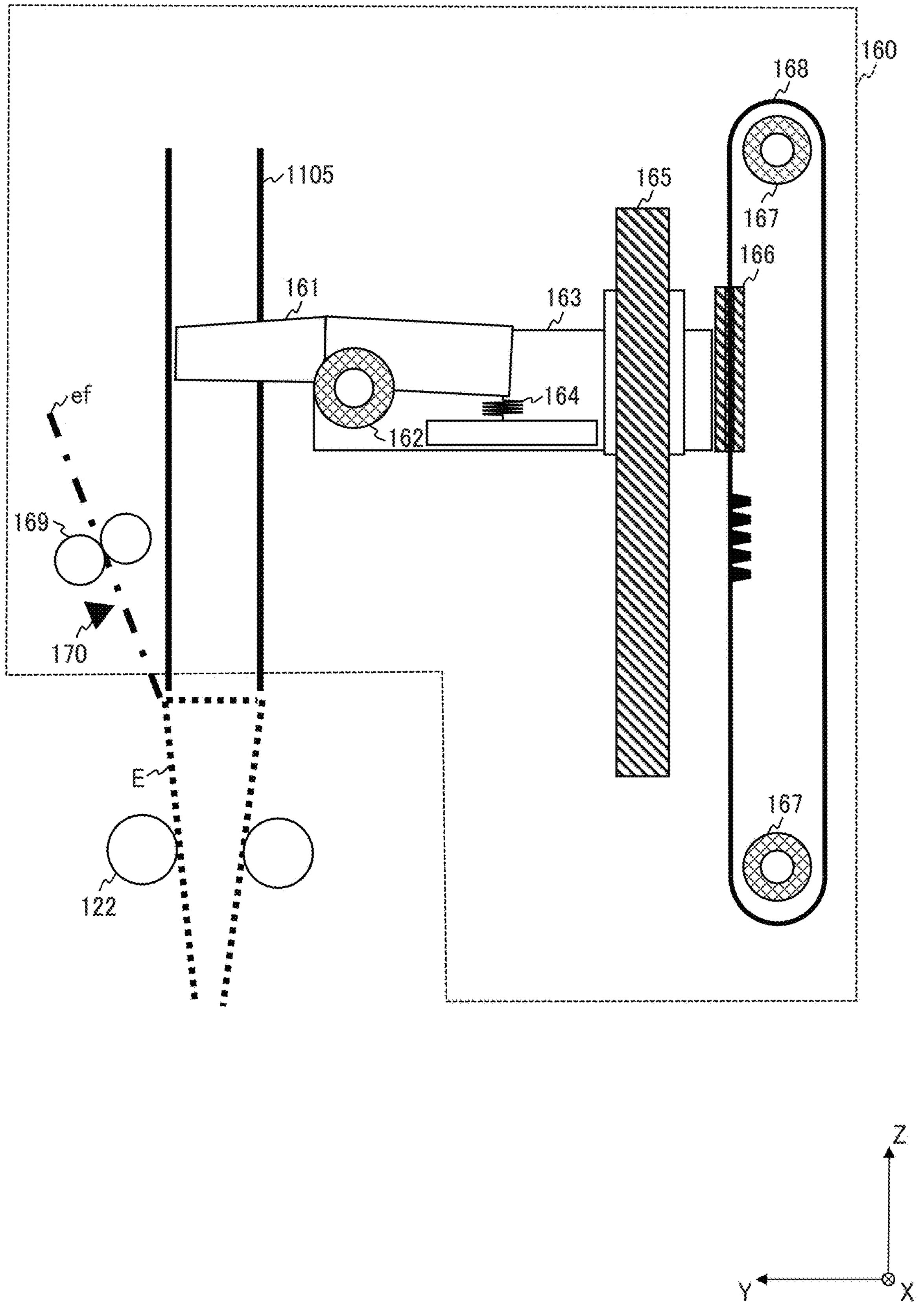
FIG. 22 is a diagram illustrating a schematic configuration of am enclosure pusher included in the enclosing-sealing apparatus, according to an embodiment of the present disclosure.

Next, a configuration of the enclosure pusher 160 included in the enclosing device 120 is described with reference to FIG. 22. FIG. 22 illustrates an outline of a main structure of the enclosure pusher 160. The enclosure pusher 160 as an enclosing unit or a medium pusher mainly includes a pushing pawl 161, a pawl rotating shaft 162, a slide portion 163, a spring 164, a sliding rod shaft 165, a belt fixing portion 166, rotating gears 167, a toothed belt 168, the flap holding roller pair 169, and a flap detection sensor 170.

The flap portion ef of the envelope E conveyed to the enclosing position is guided toward and held by the flap holding roller pair 169. The configuration for guiding the flap portion ef includes, for example, a guide plate or the like installed so that the flap portion ef us guided toward the flap holding roller pair 169.

The flap detection sensor 170 detects whether the flap portion ef is held by the flap holding roller pair 169. Based on the detection result of the flap detection sensor 170 and the flap length calculated in advance, the conveyance amount of the envelope E can be controlled so that the mouth of the envelope E reaches a predetermined position even if the size or type of the envelope E is different.

The flap holding roller pair 169 and the flap detection sensor 170 constitute a flap holder that holds and detects the flap portion ef.

The position of the mouth of the envelope E is not affected by the flap length. Accordingly, when the pushing pawl 161 pushes the conveyed enclosure, nonconformity of the enclosing operation such as protrusion of the enclosure from the envelope E or excessive push-in of the enclosure can be prevented, thus allowing appropriate enclosing operation to be performed.

When an enclosure (e.g., a folded sheet Sf) is conveyed from the sheet reverse device 110 in the envelope conveyance path 1105, the pushing pawl 161 including a movement regulating portion sets, as an initial state, a state of the pushing pawl 161 at the time when the enclosure contacts the pushing pawl 161. When the conveyed enclosure contacts the upper surface side of the pushing pawl 161, the enclosure pushes the pushing pawl 161 downward (in the direction of gravity). The pushing pawl 161 is rotated counterclockwise in FIG. 23 by the conveyance of the enclosure. As a result, the folded sheet Sf as an enclosure is in an enclosure state in which the folded sheet Sf can advance to the envelope E.

When an external force as described above is not applied, the pushing pawl 161 is biased by the spring 164 so as to return to the initial state (e.g., the state illustrated in FIG. 23) in which the pushing pawl 161 crosses the envelope conveyance path 1105 in the width direction.

The pushing pawl 161 rotates about the pawl rotation shaft 162. The pawl rotation shaft 162 is fixed to the slide portion 163.

One end of the spring 164 is fixed to the slide portion 163. The other end of the spring 164 is fixed to an end of the pushing pawl 161. Accordingly, as the pushing pawl 161 is rotated the counterclockwise by the pawl rotating shaft 162, the pushing pawl 161 is rotated in a direction against the biasing force of the spring 164. That is, the leading end of the pushing pawl 161 is pushed downward by a force greater than the biasing force of the spring 164, so that the enclosure can be enclosed in the envelope E.

When a clockwise rotating force is applied to the pushing pawl 161, the trailing end of the pushing pawl 161 comes into contact with the spring 164 and the slide portion 163 to which the spring 164 is fixed. Thus, the pushing pawl 161 is prevented from rotating counterclockwise.

The slide portion 163 is slidably held by the sliding rod shaft 165. The belt fixing portion 166 is disposed on the opposite end of the slide portion 163 opposite to the end on which the pushing pawl 161 is disposed. The belt fixing portion 166 is fixed to the toothed belt 168 that engages with the rotating gears 167. The sliding rod shaft 165 is a guide that causes the slide portion 163 to slide along the envelope conveyance path 1105. Accordingly, the slide portion 163 is held to be slidable in the direction (Z-direction) in which the envelope conveyance path 1105 extends.

The enclosing-sealing controller 150 controls the rotation amount of the rotating gears 167 based on the envelope length and the flap length. The rotation of the rotating gears 167 causes the toothed belt 168 wound around the rotating gears 167 to rotate. As the toothed belt 168 rotates, the slide portion 163 fixed by the belt fixing portion 166 moves in the rotation direction. The movement direction of the slide portion 163 is the Z direction as described above. As the rotating gears 167 rotate, the slide portion 163 is guided by the sliding rod shaft 165 and slides in the Z direction.

After the enclosure passes through the pushing pawl 161, the slide portion 163 moves in the negative Z-direction, so that the enclosure is pushed into the envelope E by the pushing pawl 161. In this manner, the enclosure pushing operation is performed.

Figure 35:
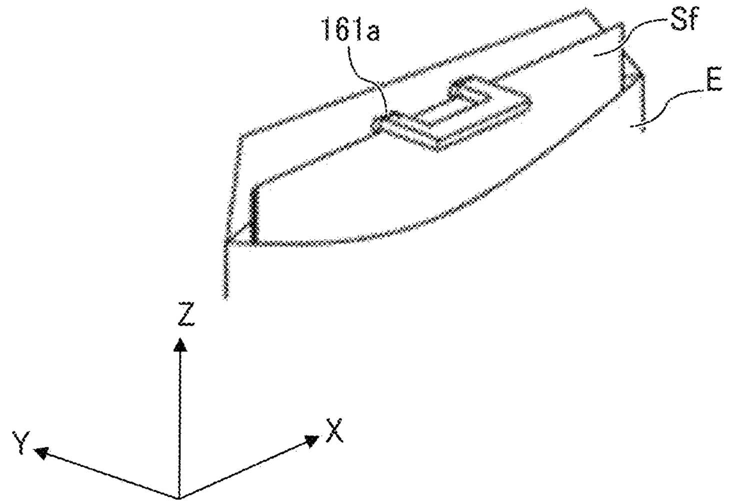
FIG. 35 is a diagram illustrating a schematic configuration of am enclosure pusher included in the enclosing-sealing apparatus, according to an embodiment of the present disclosure.

The pushing pawl 161 included in the enclosure pusher 160 may have a contact portion that comes into contact with the folded sheet Sf to be pushed at multiple positions, like a pushing pawl 161*a* illustrated in FIG. 35.

In the case of a structure in which the folded sheet Sf is brought into contact with multiple contact portions like the pushing pawl 161*a*, the angle of skew of the enclosure is small even if the enclosure is skewed when being pushed into the envelope E. Thus, the folded sheet Sf can be enclosed in a more stable state.

A description is provided of a continuation of the series of processes for enclosing and sealing.

Referring to FIGS. 23 to 34, a description is provided of an example of a series of processes for enclosing and sealing performed by the enclosing-sealing apparatus 100. In FIGS. 23 to 34, reference numerals and the like are assigned to elements used in the description of the series of processes for enclosing.

Figure 23:
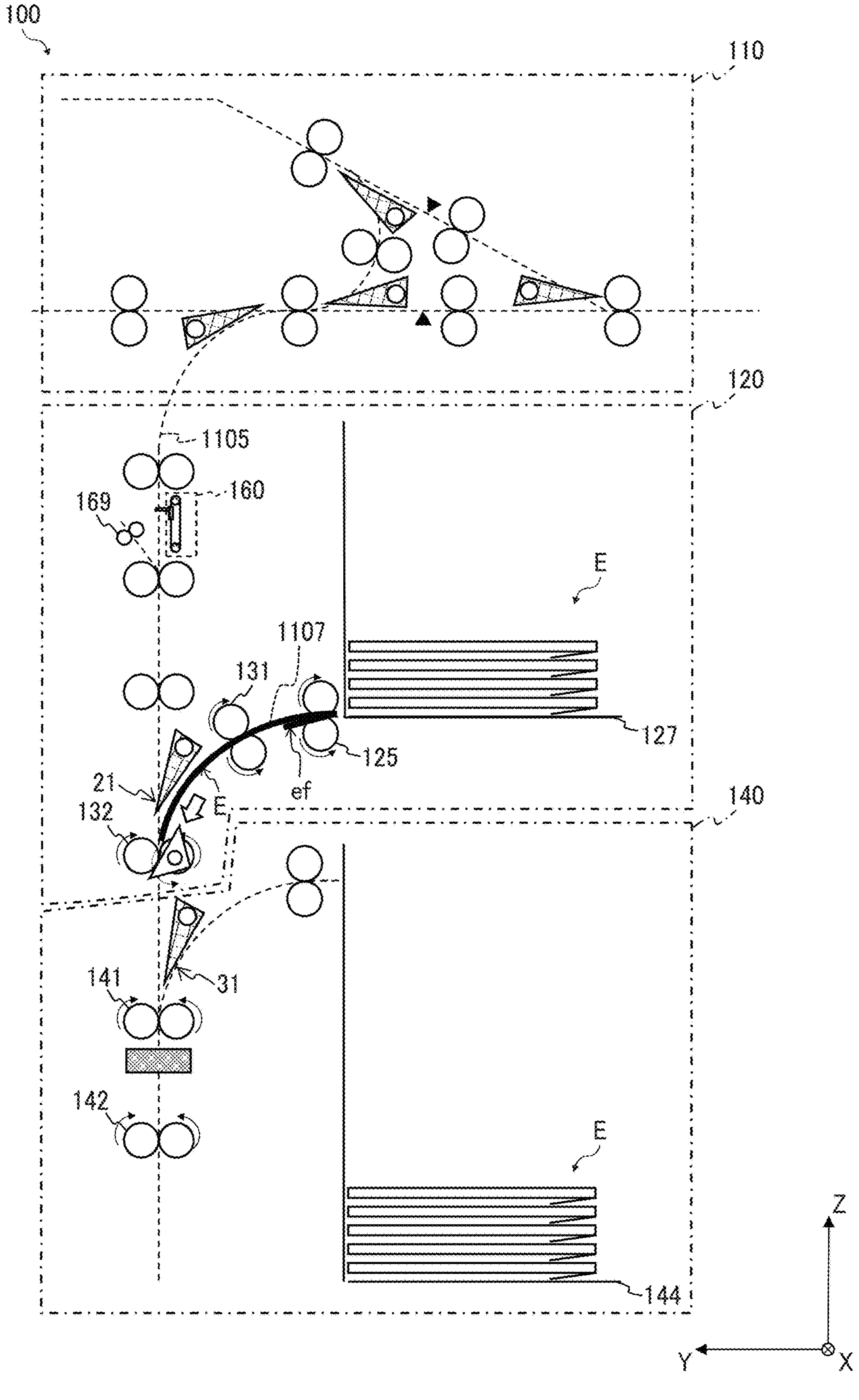
FIG. 23 is a cross-sectional view of the enclosing-sealing apparatus depicted in FIG. 3, illustrating one step of an enclosing operation performed by the enclosing-sealing apparatus, according to an embodiment of the present disclosure.

First, as illustrated in FIG. 23, after the envelopes E stacked on the envelope load tray 127 are separated one by one by the separating roller pair 125, the envelopes E are conveyed to the envelope switchback roller pair 132 by the feed roller 131. At this time, the envelope switchback switching pawl 21 and the envelope ejecting switching pawl 31 are oriented in the direction illustrated in FIG. 23. The envelope switchback roller pair 132, the third vertical conveyance roller pair 141, and the fourth vertical conveyance roller pair 142 rotate in a direction in which the envelope E is conveyed downward, and convey the envelope E to a predetermined position in the enclosing conveyance path 1104.

Figure 24:
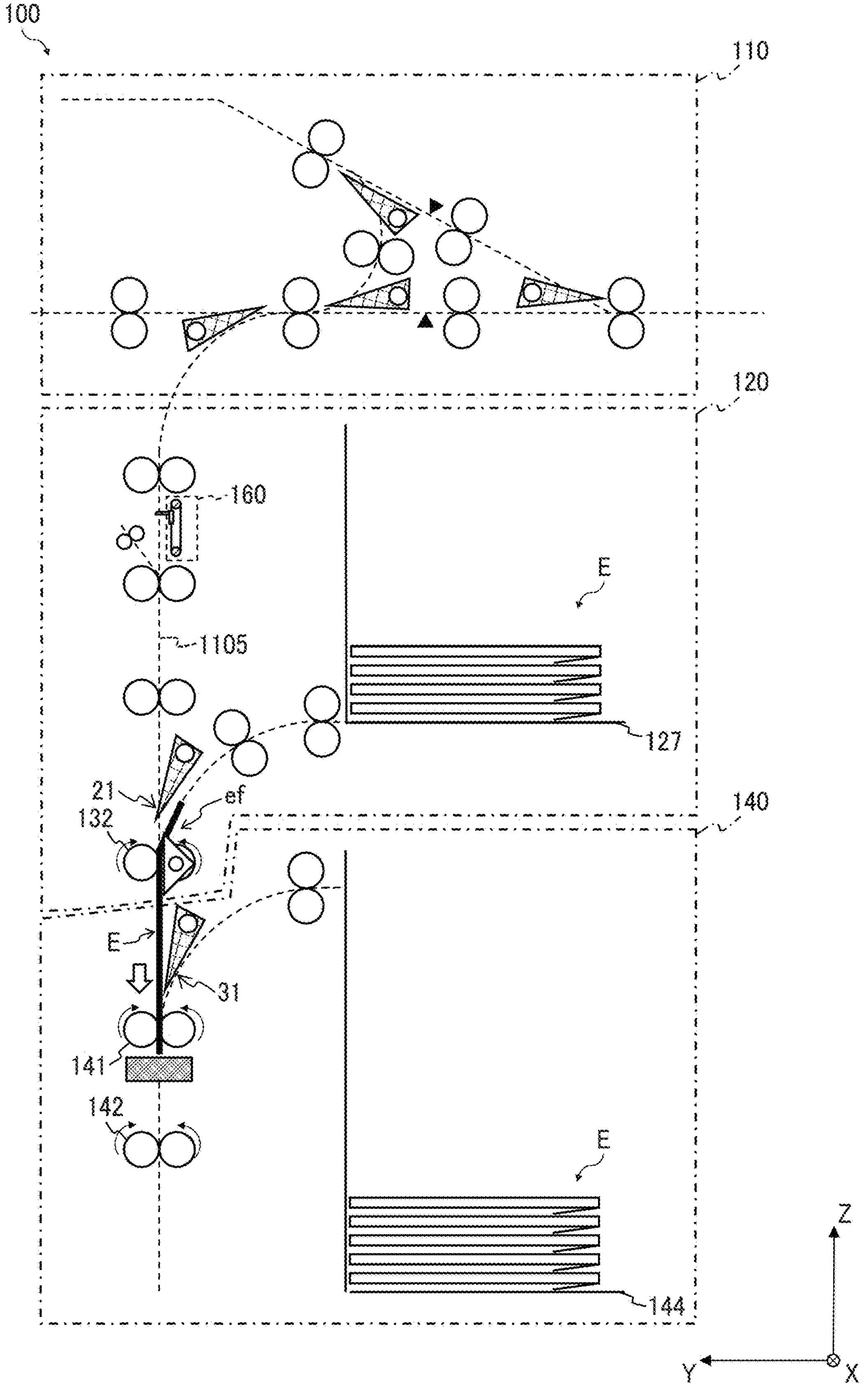
FIG. 24 is a cross-sectional view of the enclosing-sealing apparatus depicted in FIG. 3, illustrating one step of the enclosing operation performed by the enclosing-sealing apparatus.

Subsequently, as illustrated in FIG. 24, when the envelope E passes through the envelope switchback roller pair 132, the flap portion ef is opened by the flap opener 180. In this state, the envelope E reaches the state illustrated in FIG. 25 by the rotation of the envelope switchback roller pair 132, the third vertical conveyance roller pair 141, and the fourth vertical conveyance roller pair 142.

Figure 25:
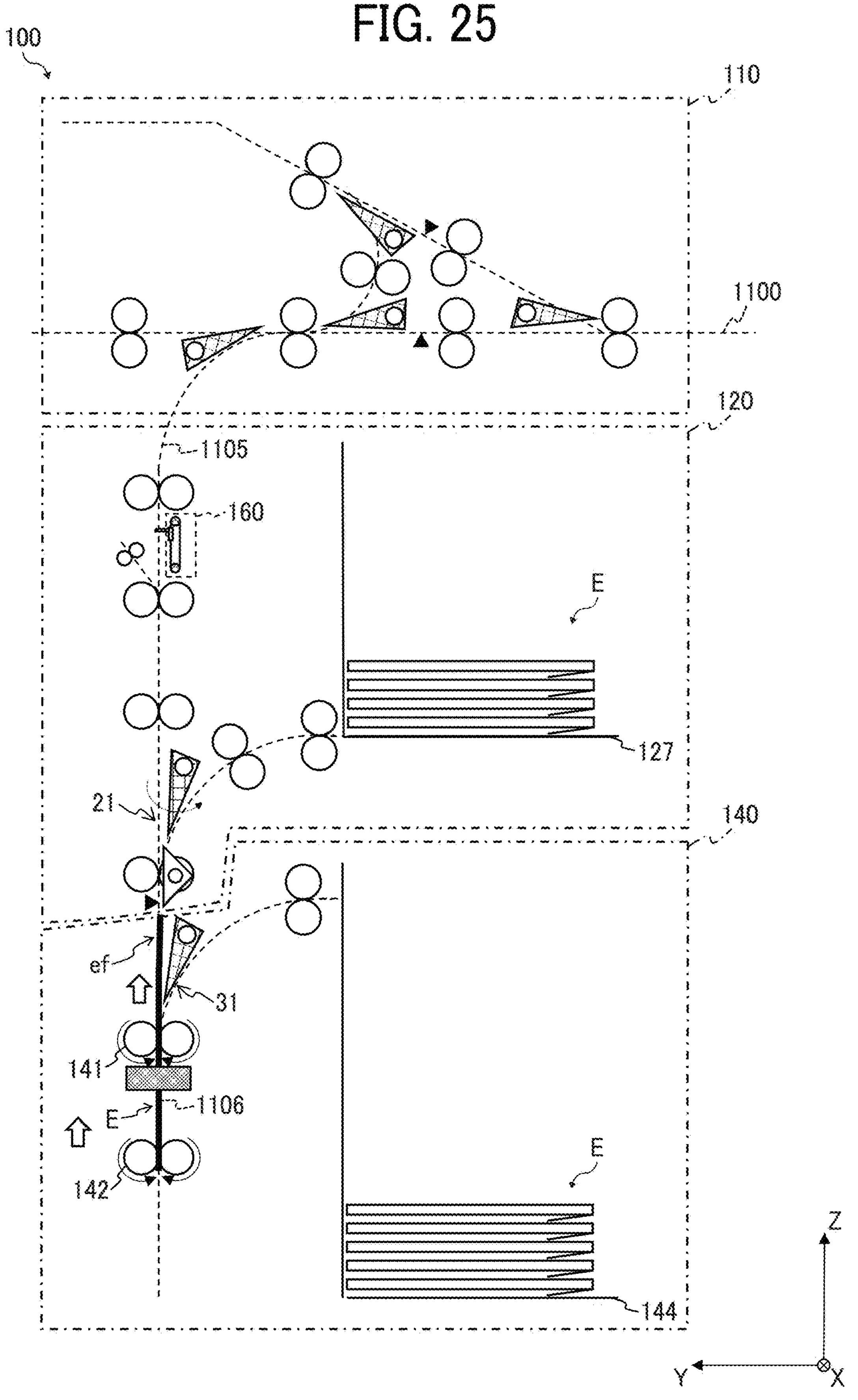
FIG. 25 is a cross-sectional view of the flap opener depicted in FIG. 4, illustrating an operation of the flap opener during enclosing performed by the enclosing-sealing apparatus.

Subsequently, as illustrated in FIG. 25, after the flap portion ef of the envelope E is opened and reaches a position where the flap portion ef passes through the envelope switchback roller pair 132, the third vertical conveyance roller pair 141 and the fourth vertical conveyance roller pair 142 are reversed to convey the envelope E toward a predetermined position of the enclosing device 120 in a switchback manner. Before switchback conveyance of the envelope E starts or simultaneously with switchback conveyance, the envelope switchback switching pawl 21 pivots in a direction illustrated with an arrow in FIG. 25. Accordingly, the envelope switchback switching pawl 21 allows the envelope E to be conveyed upward in FIG. 12 through the envelope conveyance path 1105.

Figure 26:
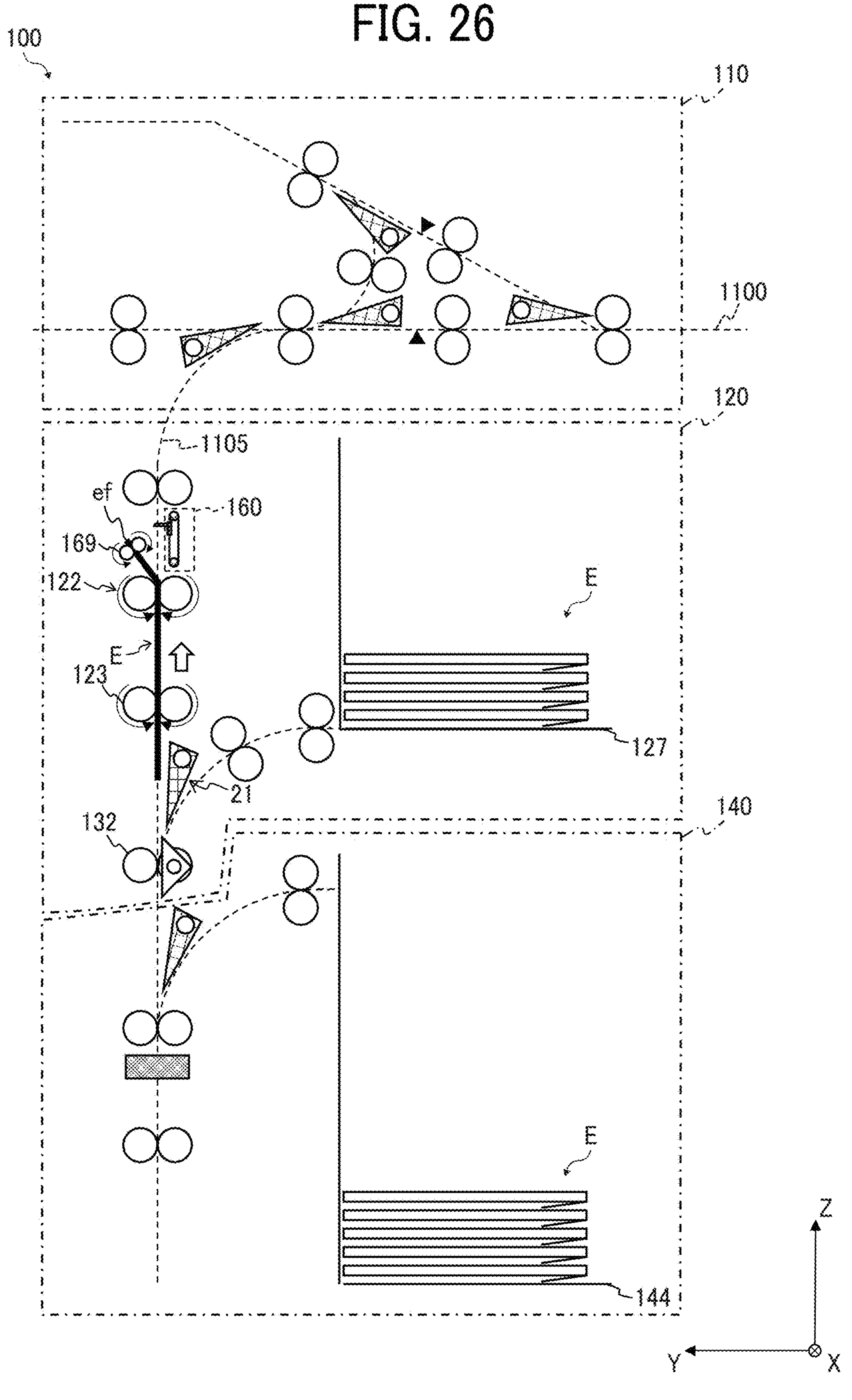
FIG. 26 is a cross-sectional view of the enclosing-sealing apparatus depicted in FIG. 3, illustrating one step of the enclosing operation performed by the enclosing-sealing apparatus.

As illustrated in FIG. 26, the second vertical conveyance roller pair 123 and the first vertical conveyance roller pair 122 constituting the switchback conveyor convey the envelope E to the enclosing position. When the flap portion ef reaches a past position where the flap portion ef passes through the first vertical conveyance roller pair 122, the second vertical conveyance roller pair 123 and the first vertical conveyance roller pair 122 interrupt rotation and enters a standby state for an enclosing operation.

In the control for conveying the envelope E to the enclosing position, the separating roller pair 125 takes out the envelope E and the conveyance amount of the envelope E is calculated from the rotation amount of each conveyance roller pair. The position of the envelope E in the enclosing conveyance path 1104 is determined based on the length of the envelope E, the length of the flap portion ef, the conveyance amount of the envelope E, and the conveyance path length of the envelope E conveyed through the envelope entry path 1107 and the envelope conveyance path 1105.

Figure 27:
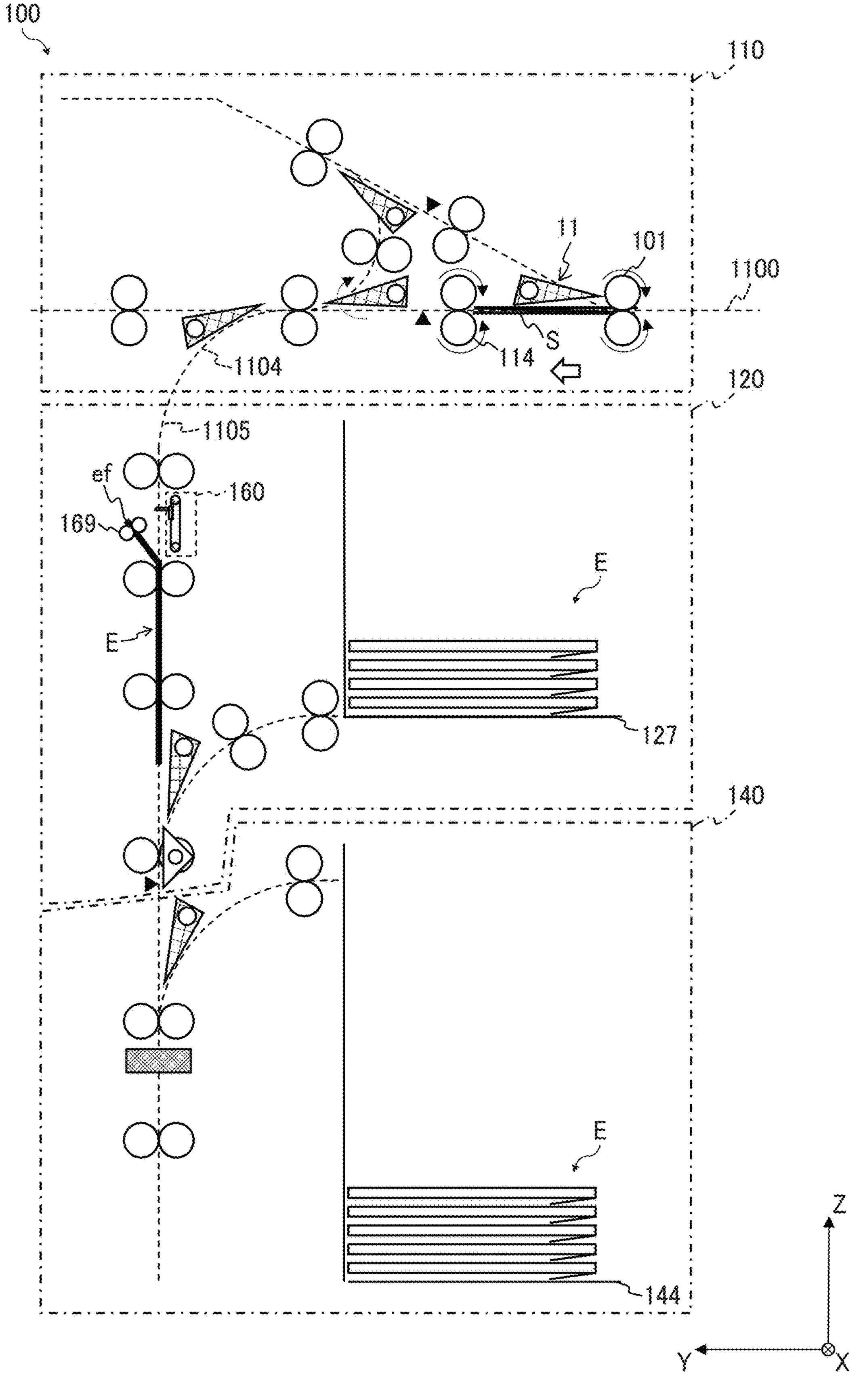
FIG. 27 is a cross-sectional view of the enclosing-sealing apparatus depicted in FIG. 3, illustrating one step of the enclosing operation performed by the enclosing-sealing apparatus.

Subsequently, as illustrated in FIG. 27, in a state where the envelope E is held at the enclosing position, the enclosing-sealing apparatus 100 receives the folded sheet Sf from the upstream apparatus (the folding apparatus 300) by an entry roller pair 101 and conveys the folded sheet Sf to the first conveyance path 1101.

Figure 28:
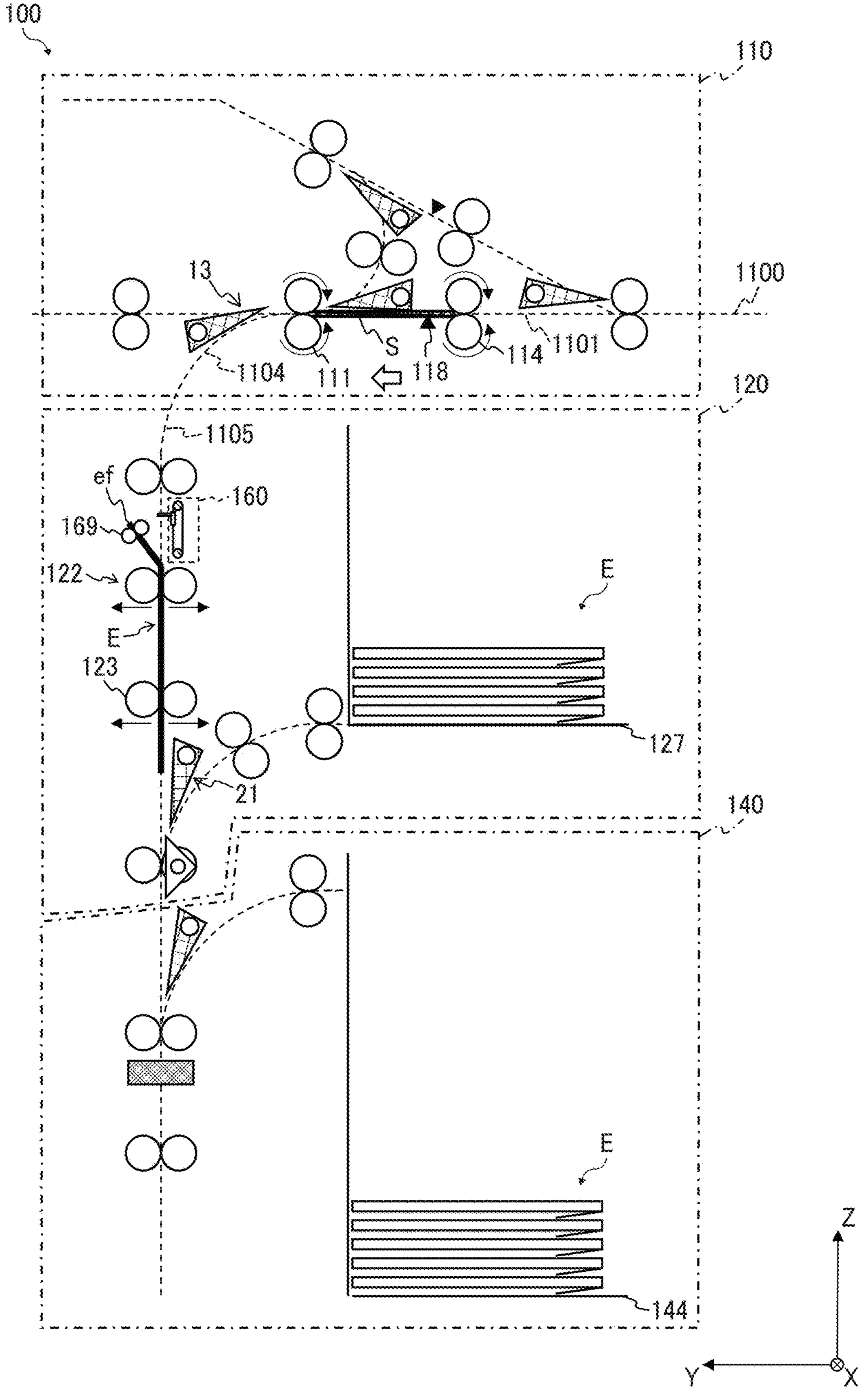
FIG. 28 is a cross-sectional view of the enclosing-sealing apparatus depicted in FIG. 3, illustrating one step of the enclosing operation performed by the enclosing-sealing apparatus.

Subsequently, as illustrated in FIG. 28, the first intermediate conveyance roller pair 114 and the first conveyance roller pair 111 convey the folded sheet Sf downstream in the sheet conveyance direction DS. The first switching pawl 11 and the third switching pawl 13 are positioned as illustrated in FIG. 28 and guide the folded sheet Sf from the first conveyance path 1101 to the enclosing conveyance path 1104.

Figure 29:
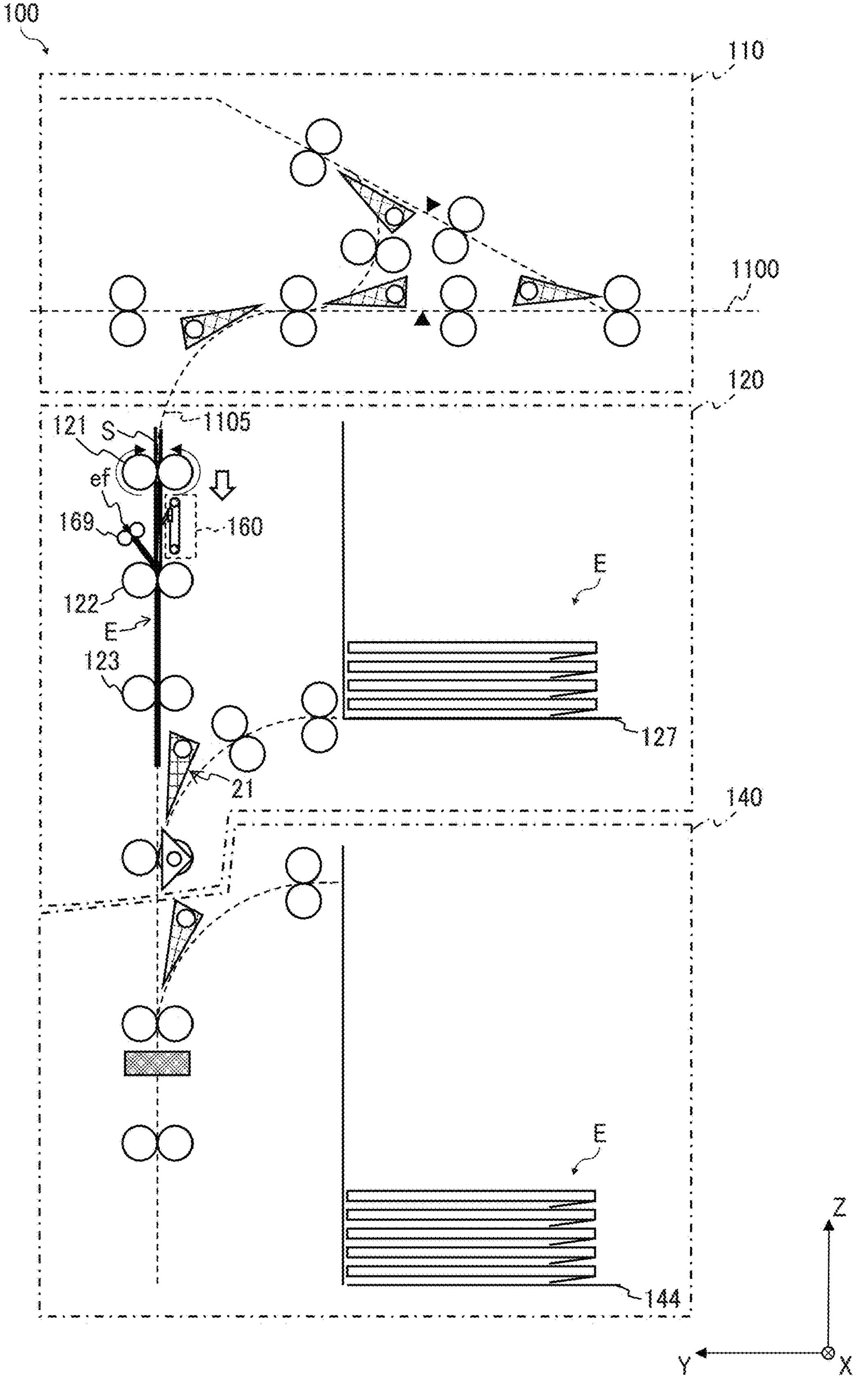
FIG. 29 is a cross-sectional view of the enclosing-sealing apparatus depicted in FIG. 3, illustrating one step of the enclosing operation performed by the enclosing-sealing apparatus.

Thereafter, as illustrated in FIG. 29, the enclosing roller pair 121 conveys the folded sheet Sf conveyed from the enclosing conveyance path 1104 to the envelope conveyance path 1105 farther in the negative Z-direction. As a result, the first vertical conveyance roller pair 122 and the like hold the folded sheet Sf at the predetermined enclosing position in the envelope conveyance path 1105. The folded sheet Sf is inserted into the opened mouth of the envelope E in the enclosing standby state. In the enclosing operation, the enclosure pusher 160 is operated, and the folded sheet Sf is pushed into the envelope E by the pushing pawl 161.

Figure 30:
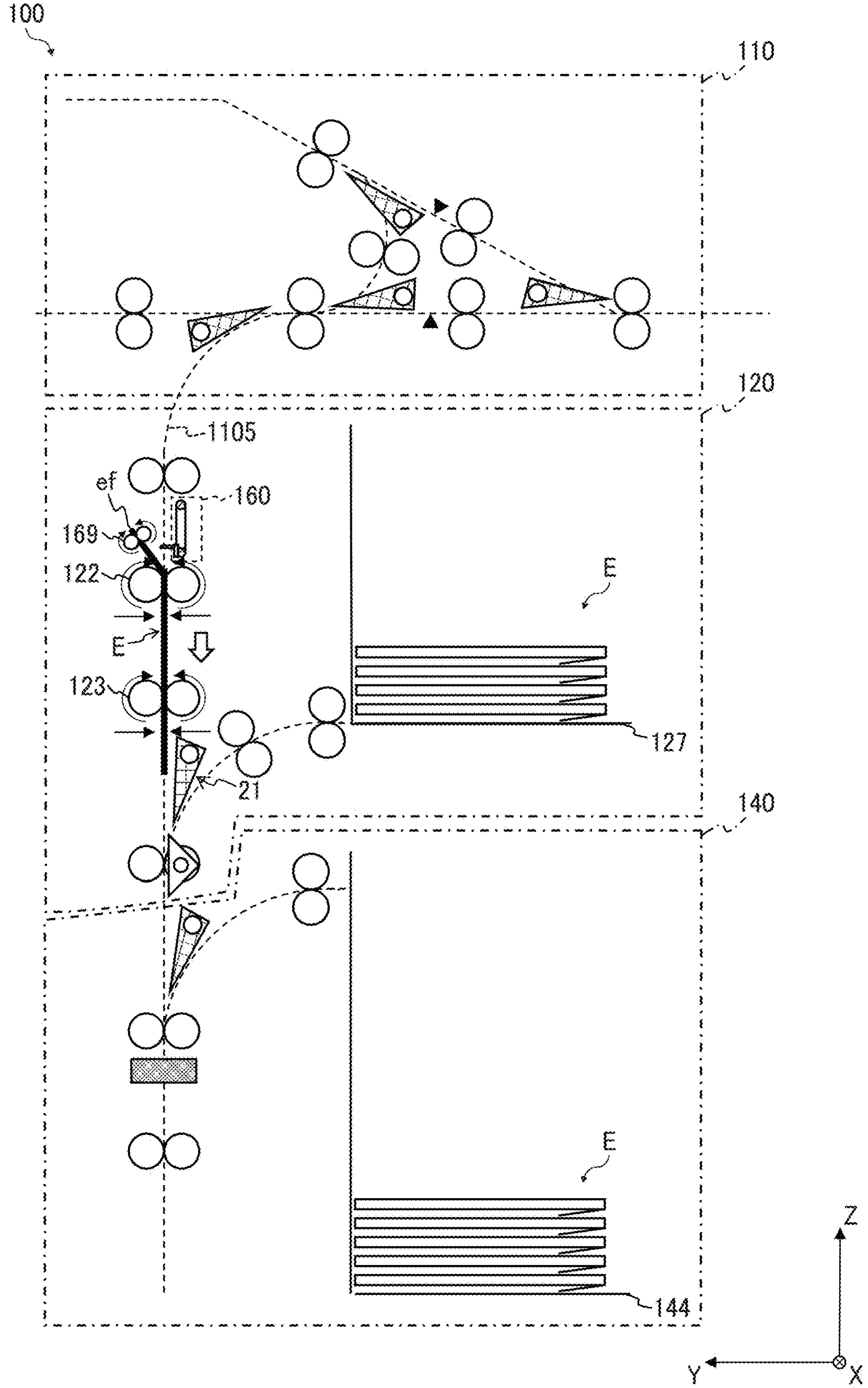
FIG. 30 is a cross-sectional view of the enclosing-sealing apparatus depicted in FIG. 3, illustrating one step of the enclosing operation performed by the enclosing-sealing apparatus.
Figure 31:
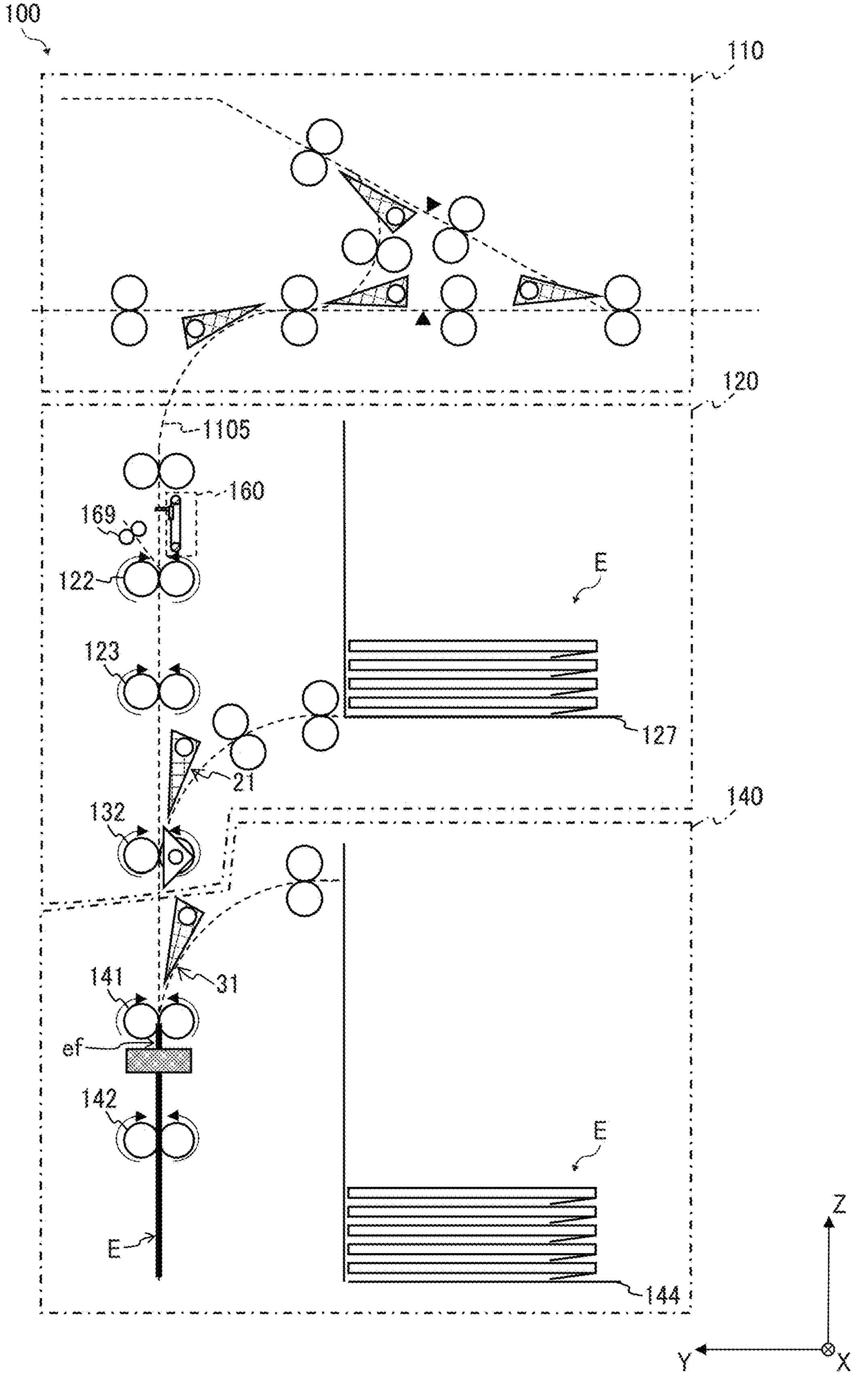
FIG. 31 is a cross-sectional view of the enclosing-sealing apparatus depicted in FIG. 3, illustrating one step of the enclosing operation performed by the enclosing-sealing apparatus.

Subsequently, as illustrated in FIG. 30, the first vertical conveyance roller pair 122 and the second vertical conveyance roller pair 123 rotate, conveying the envelope E downward to the fourth vertical conveyance roller pair 142 as illustrated in FIG. 31. The envelope E enclosed with the folded sheet Sf is conveyed to a past position where the flap portion ef is past the envelope ejecting switching pawl 31.

Figure 32:
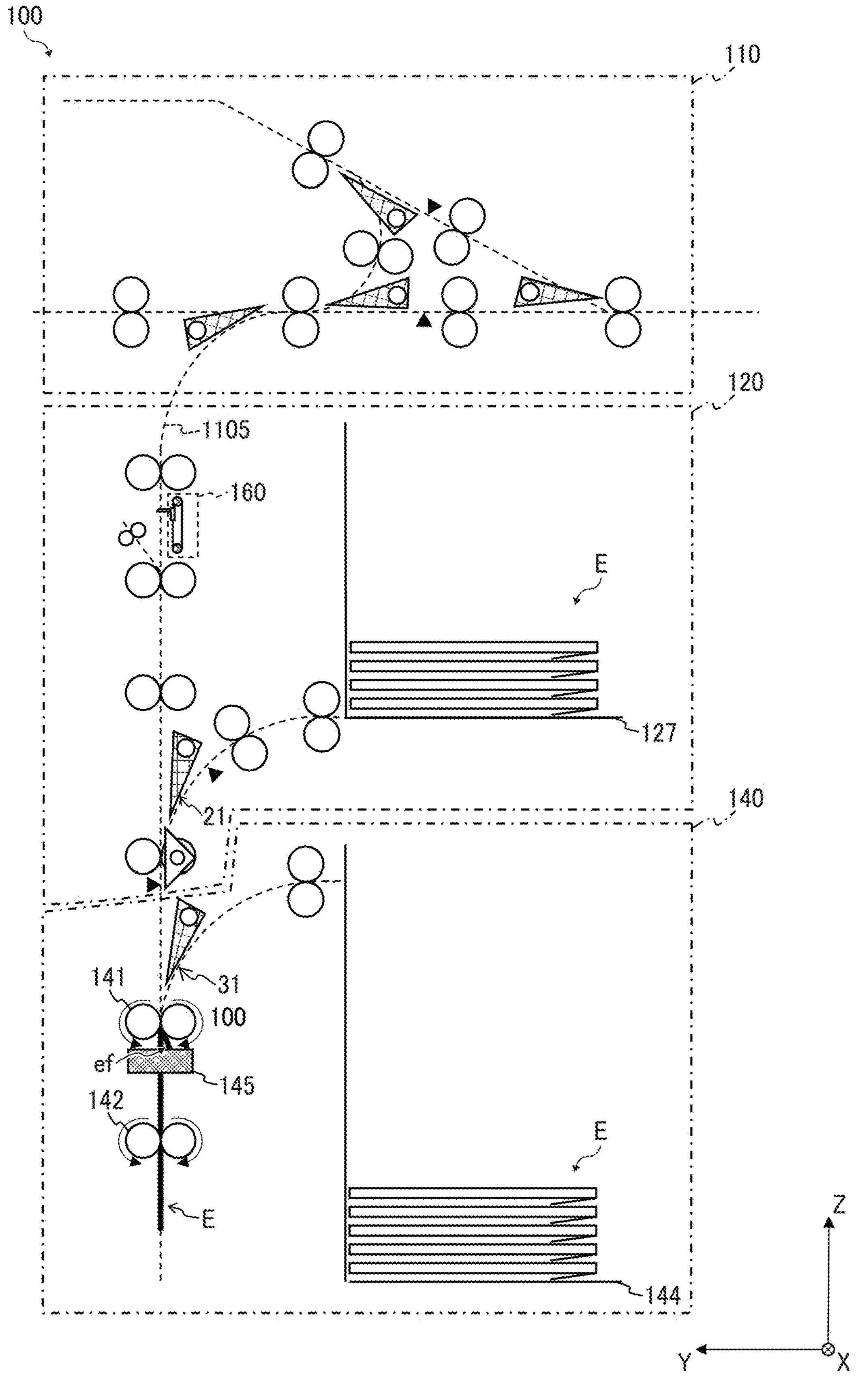
FIG. 32 is a cross-sectional view of the enclosing-sealing apparatus depicted in FIG. 3, illustrating one step of the enclosing operation performed by the enclosing-sealing apparatus.

Thereafter, as illustrated in FIG. 32, the flap portion ef is closed by the sealing mechanism 145 between the third vertical conveyance roller pair 141 and the fourth vertical conveyance roller pair 142 to seal the envelope E.

Figure 33:
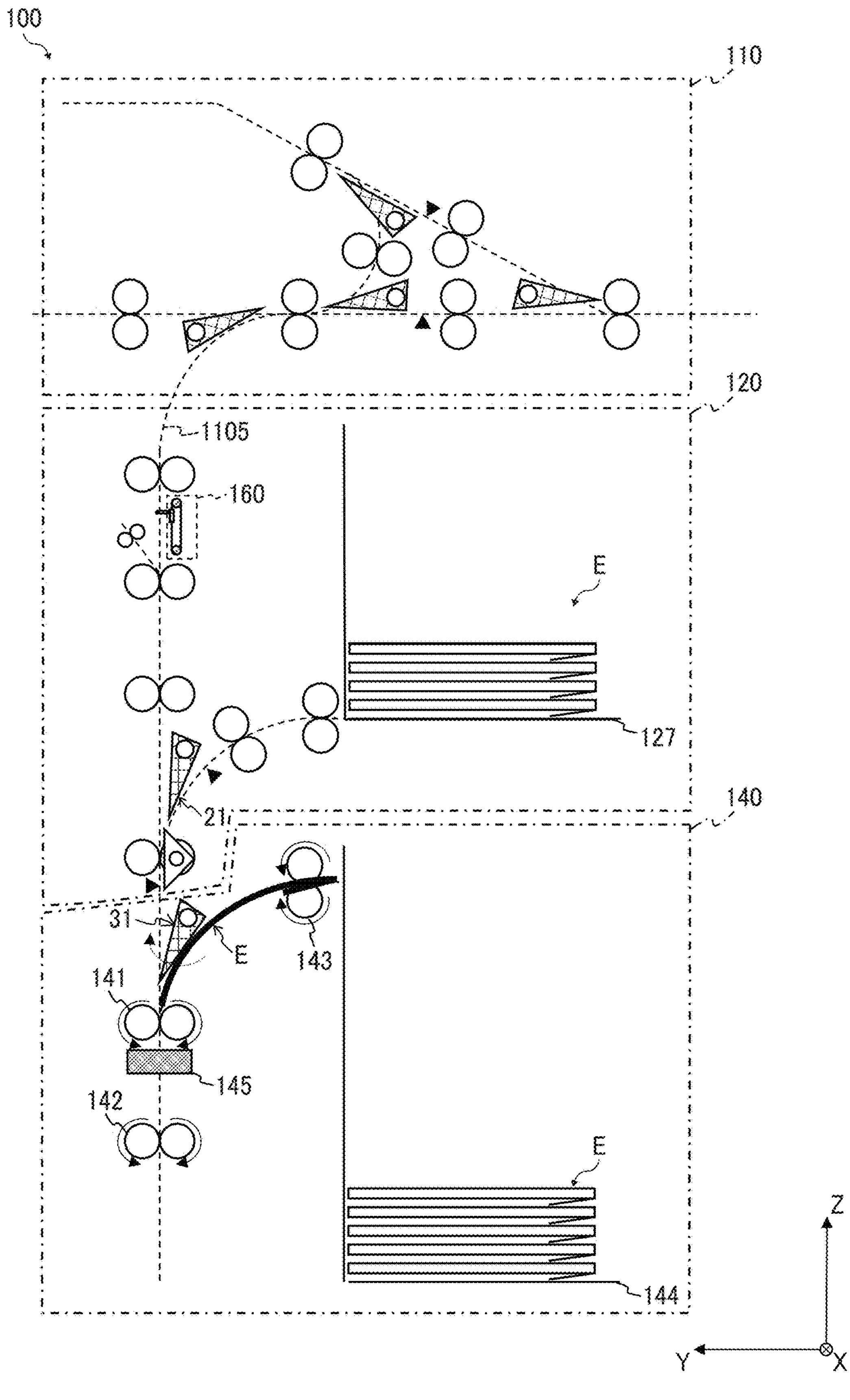
FIG. 33 is a cross-sectional view of the enclosing-sealing apparatus depicted in FIG. 3, illustrating one step of the enclosing operation performed by the enclosing-sealing apparatus.

Thereafter, as illustrated in FIG. 33, the third vertical conveyance roller pair 141 and the fourth vertical conveyance roller pair 142 rotate in reverse, switching back and conveying the sealed envelope E. Before the third vertical conveyance roller pair 141 and the fourth vertical conveyance roller pair 142 rotate backward, the envelope ejecting switching pawl 31 pivots to a position illustrated in FIG. 33. Accordingly, the third vertical conveyance roller pair 141 and the fourth vertical conveyance roller pair 142 convey the envelope E enclosed with the folded sheet Sf from the sealing path 1106 to the envelope ejecting path 1108.

Figure 34:
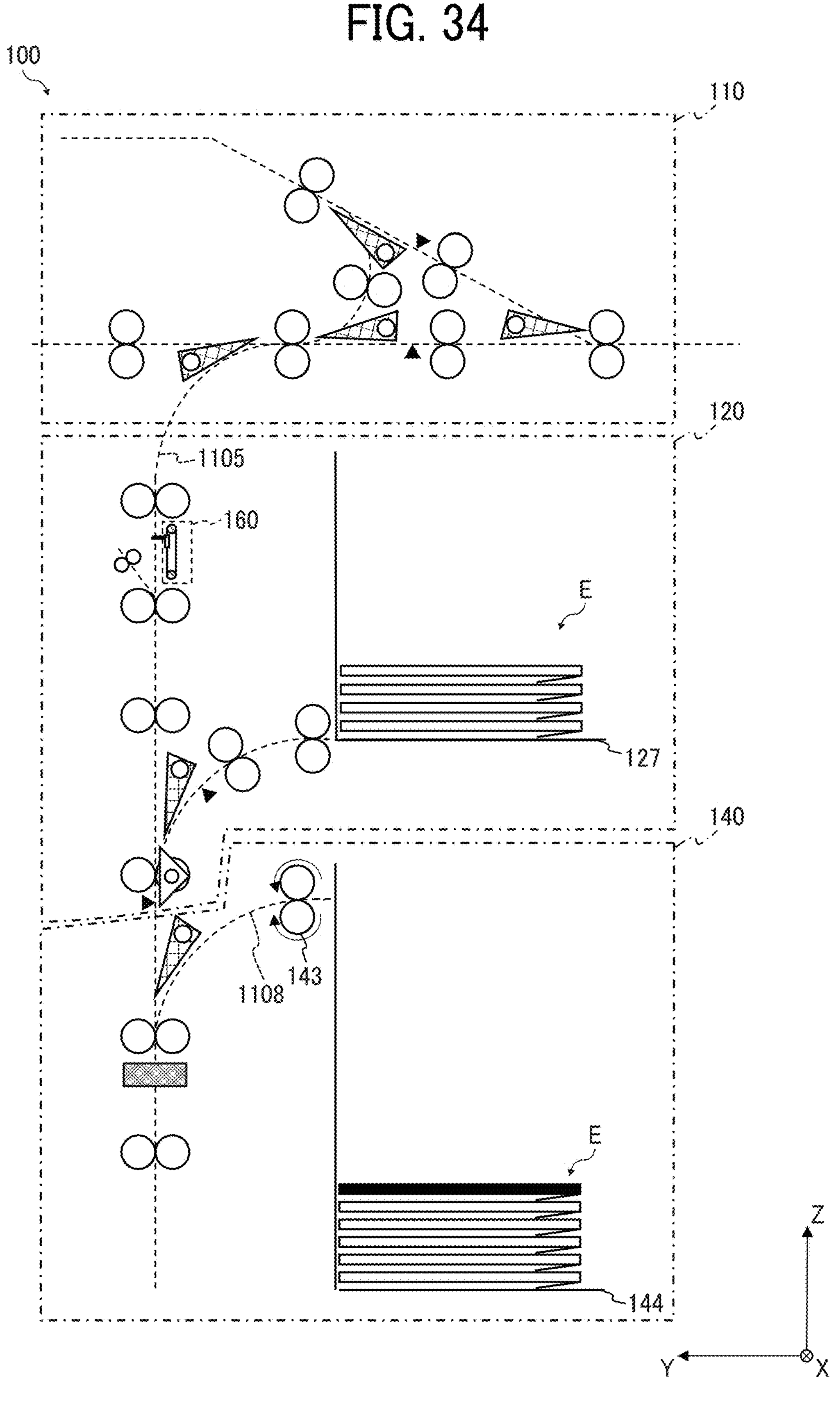
FIG. 34 is a cross-sectional view of the enclosing-sealing apparatus depicted in FIG. 3, illustrating one step of the enclosing operation performed by the enclosing-sealing apparatus.

As a result, as illustrated in FIG. 34, the envelope ejecting roller pair 143 ejects the sealed envelope E onto the envelope ejection tray 144.

A description is given below of the relation between folding type and image Forming surface Ps.

Figure 36A:
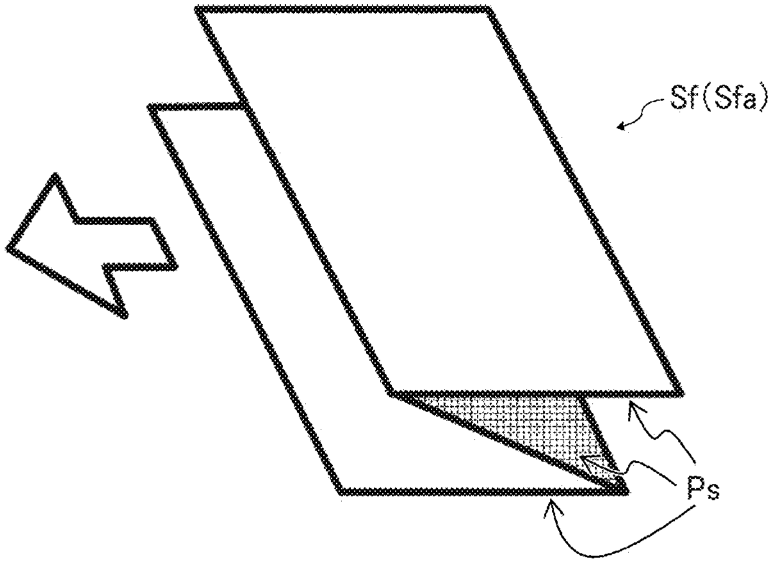
FIGS. 36A and 36B are diagrams illustrating the relation between the fold type of a sheet and an image formation surface, according to an embodiment of the present disclosure.
Figure 36B:
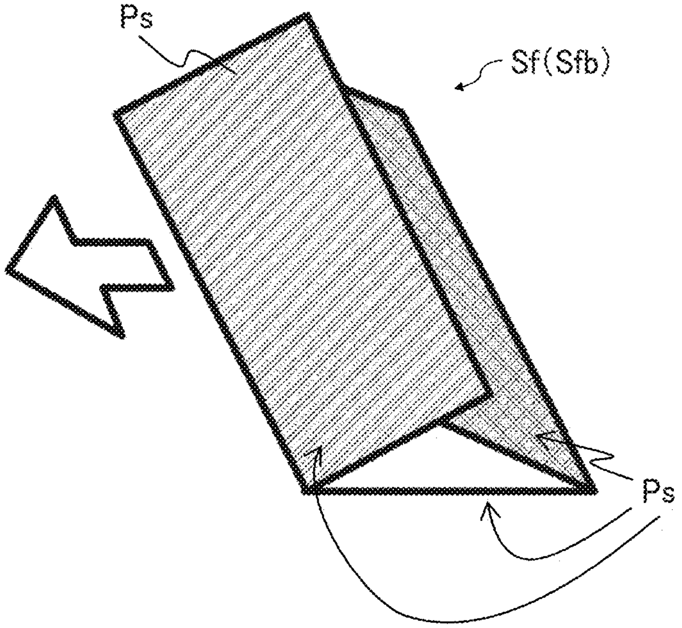

Here, an example of the relation between the folding type of a folded sheet Sf and the position of the printing surface is described with reference to FIG. 36. FIG. 36A illustrates an outer-three-folded sheet Sa in a case where the folding type is "outer three fold". FIG. 36B illustrates an inner-three-folded sheet Sb when the folding type is "inner three fold".

As illustrated in FIG. 36A, in the case of the outer-three-folded sheet Sa, an image forming surface Ps as an image forming surface is positioned on the outer side of the lowermost surface in the conveyance direction. On the other hand, as illustrated in FIG. 36B, in the case of the inner-three-folded sheet Sb, the image forming surface Ps is located on the outer surface of the folded sheet.

In the two examples illustrated in FIGS. 36A and 36B, the "outer three fold" and the "inner three fold" are performed. However, the positions of the image forming surfaces Ps in the outer three fold and the inner three fold are opposite to each other due to the difference in configuration (difference in type) of the sheet folder 310. That is, the position of the image forming surface Ps in the folded sheet Sf varies depending on the folding type, and the position of the image forming surface Ps in the folded sheet Sf also varies depending on the type of the sheet folder 310.

A description is given below of the relation between image Forming surface Ps and envelope E.

Figure 37:
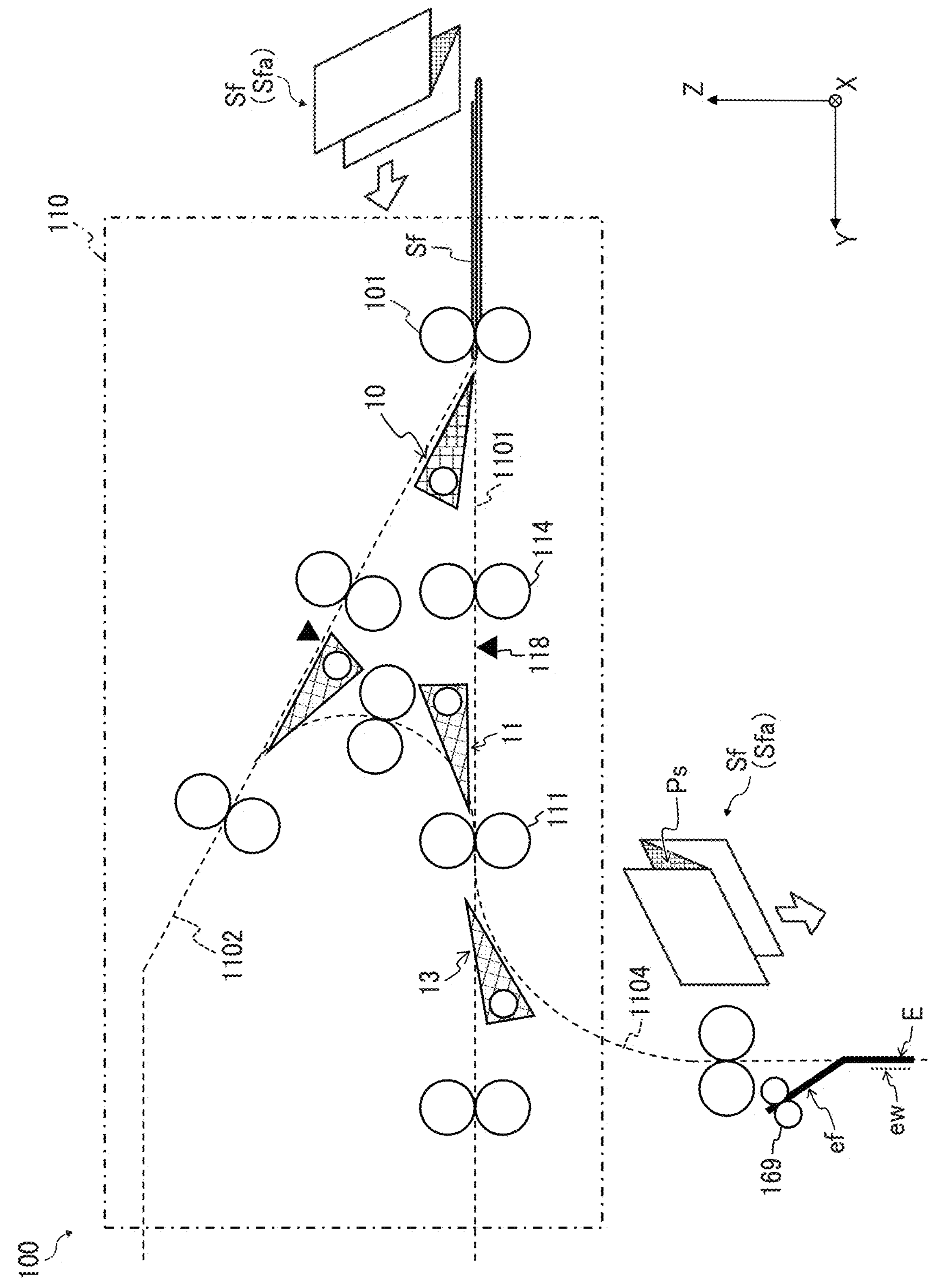
FIG. 37 is a diagram illustrating the relation between the fold type of a sheet and the image formation surface in an enclosing direction, according to an embodiment of the present disclosure.

Relative positions between the image forming surface Ps of the folded sheet Sf and the transparent window ew formed in advance in the envelope E are described with reference to FIG. 37. As illustrated in FIG. 37, this example assumes that an outer-three-folded sheet Sa passes through the first conveyance path 1101 as it is and is enclosed in the envelope E waiting in a state where the flap portion ef is open, via the enclosing conveyance path 1104.

In this case, since the image forming surface Ps is not located facing the transparent window ew, the image forming surface Ps after the enclosing is not visually recognized from the outside of the envelope E. In general, since the destination information indicating the delivery destination of the envelope E is printed on the image forming surface Ps, the envelope E cannot be delivered in a state in which the destination is not visually recognized.

As described above, the positions of the image forming surface Ps and the transparent window ew may not match depending on the folding type of the folded sheet Sf. Further, as described above, when the type of the sheet folder 310 is different even if the folding type is the same, the position of the image forming surface Ps may be the reverse position. For this reason, the sheet reverse device 110 according to the embodiment described below reverses the folded sheet Sf such that the position of the image forming surface Ps after enclosing matches the position of the transparent window ew, based on the "enclosing target data" that is a factor for determining the position of the image forming surface Ps in the folded sheet Sf.

A description is provided of an operation of the sheet reverse device 110.

An example of a sheet reversing operation in the enclosing-sealing apparatus 100 according to the present embodiment is described with reference to FIGS. 38 to 42. The folded sheet Sf conveyed into the sheet reverse device 110 may be folded in various ways. Data on the folding method is received by the enclosing-sealing controller 150 in advance, and the following control is performed based on the data. Similarly, there are various print data indicating a position at which an image is formed on the folded sheet Sf. In the following description, an example of conveyance control performed in order of different paths according to different folding methods are described.

Figure 38:
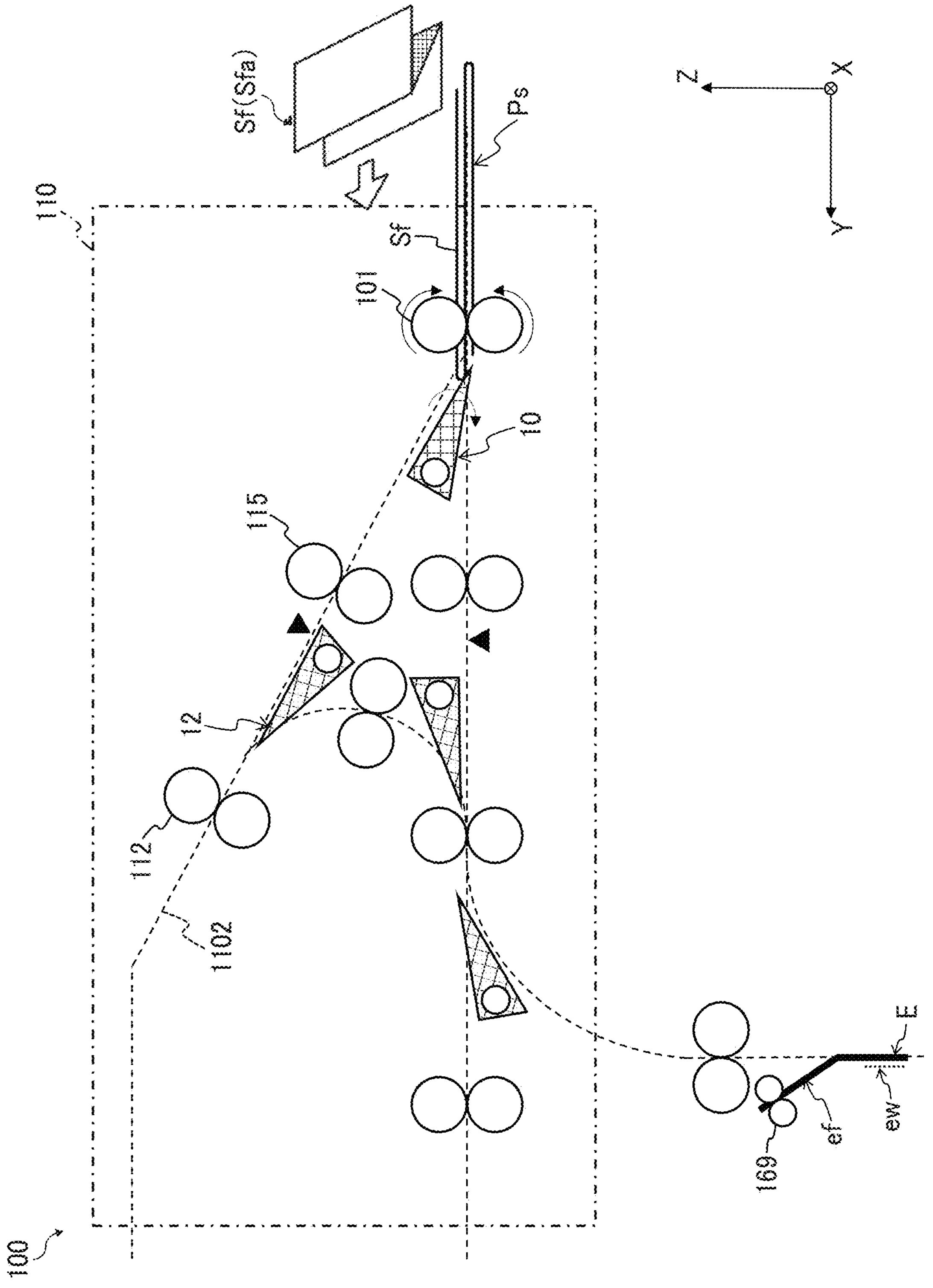
FIG. 38 is a diagram illustrating one step of an enclosing operation of a folded sheet, according to an embodiment of the present disclosure.

As illustrated in FIG. 38, in the case where the folded sheet Sf carried from the folding apparatus 300 is outwardly folded and the image forming surface Ps (printing surface) on which an image is formed is exposed, the folded sheet Sf is carried in in a state where the printing surface faces downward with respect to the conveyance direction.

In this case, if the branching pawl 10 is at a position to block conveyance of the folded sheet Sf to the second conveyance path 1102 when the folded sheet Sf reaches the entry roller pair 101, the branching pawl 10 is rotated to bring the folded sheet Sf into a state in which the folded sheet Sf can be conveyed to the second conveyance path 1102.

Figure 39:
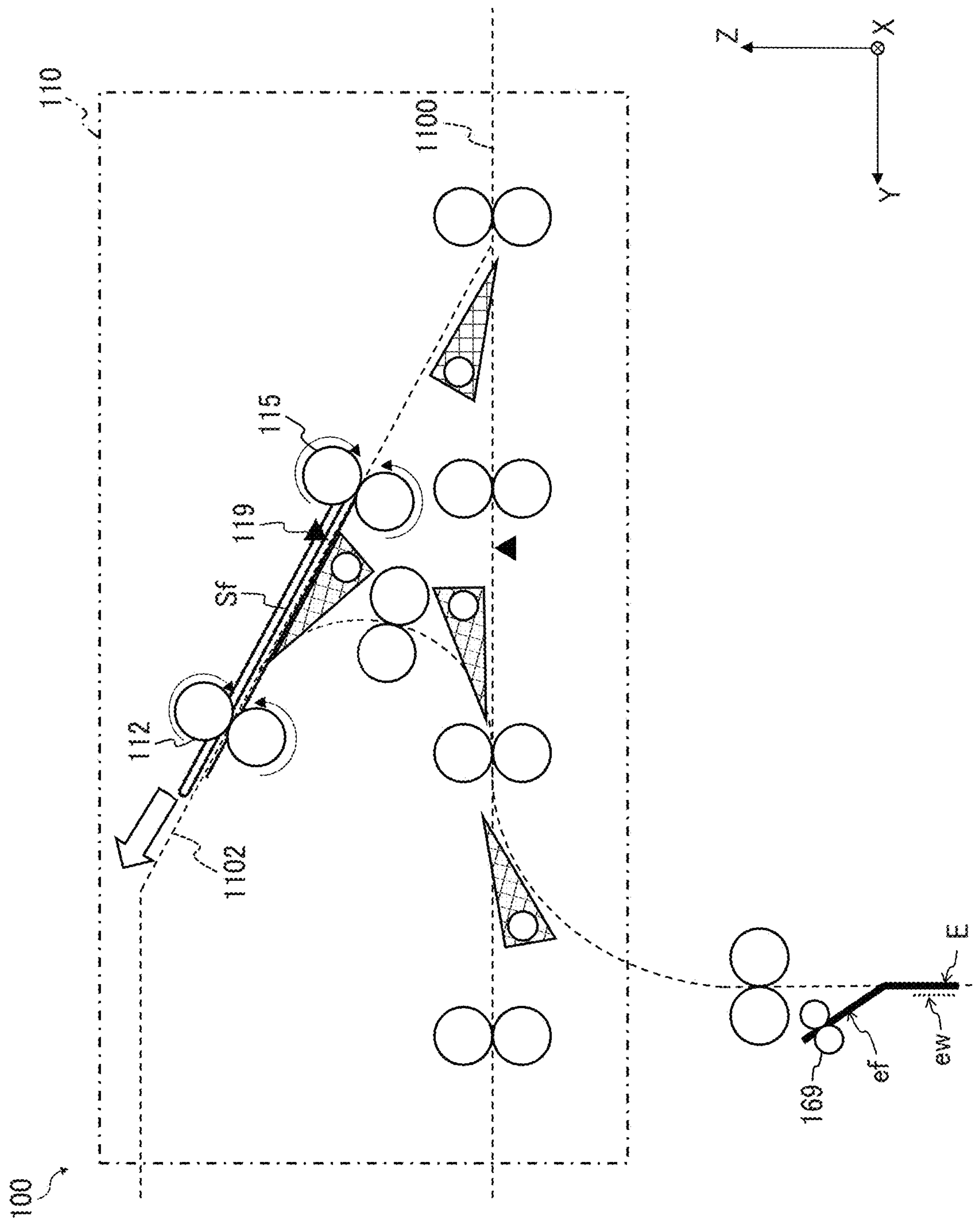
FIG. 39 is a diagram illustrating one step of the enclosing operation.

Subsequently, as illustrated in FIG. 39, the folded sheet Sf is guided to the second conveyance path 1102 by the branching pawl 10 and is conveyed to the second conveyance roller pair 112 by the second intermediate conveyance roller 115. The folded sheet Sf is further conveyed in the downstream direction by the second conveyance roller pair 112.

Figure 40:
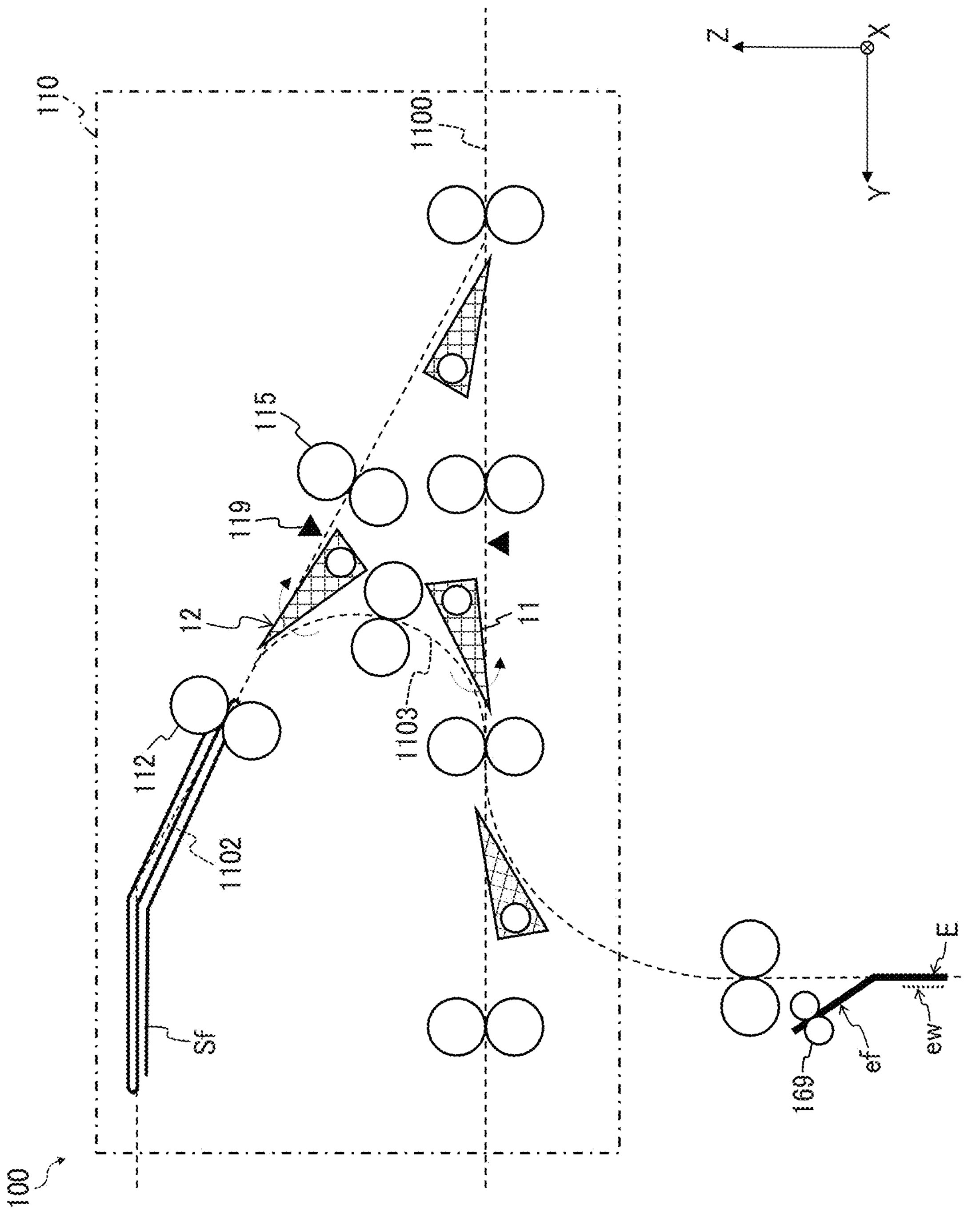
FIG. 40 is a diagram illustrating one step of the enclosing operation.

Subsequently, as illustrated in FIG. 40, when the folded sheet Sf is conveyed downstream by a predetermined distance after the trailing end of the folded sheet Sf is detected by the second sheet detection sensor 119, the second conveyance roller pair 112 stops. In other words, when the folded sheet Sf is conveyed by a distance that allows the trailing end of the folded sheet Sf to pass through the second switching pawl 12, the second conveyance roller pair 112 stops. The second switching pawl 12 is also rotated into a state allowing the folded sheet Sf to be conveyed to the switchback conveyance path 1103 serving as the third conveyance path. If the first switching pawl 11 is not in a state allowing the folded sheet Sf to be conveyed from the switchback conveyance path 1103 to the first conveyance path 1101, the first switching pawl 11 is also rotated and switched to such a state.

Figure 41:
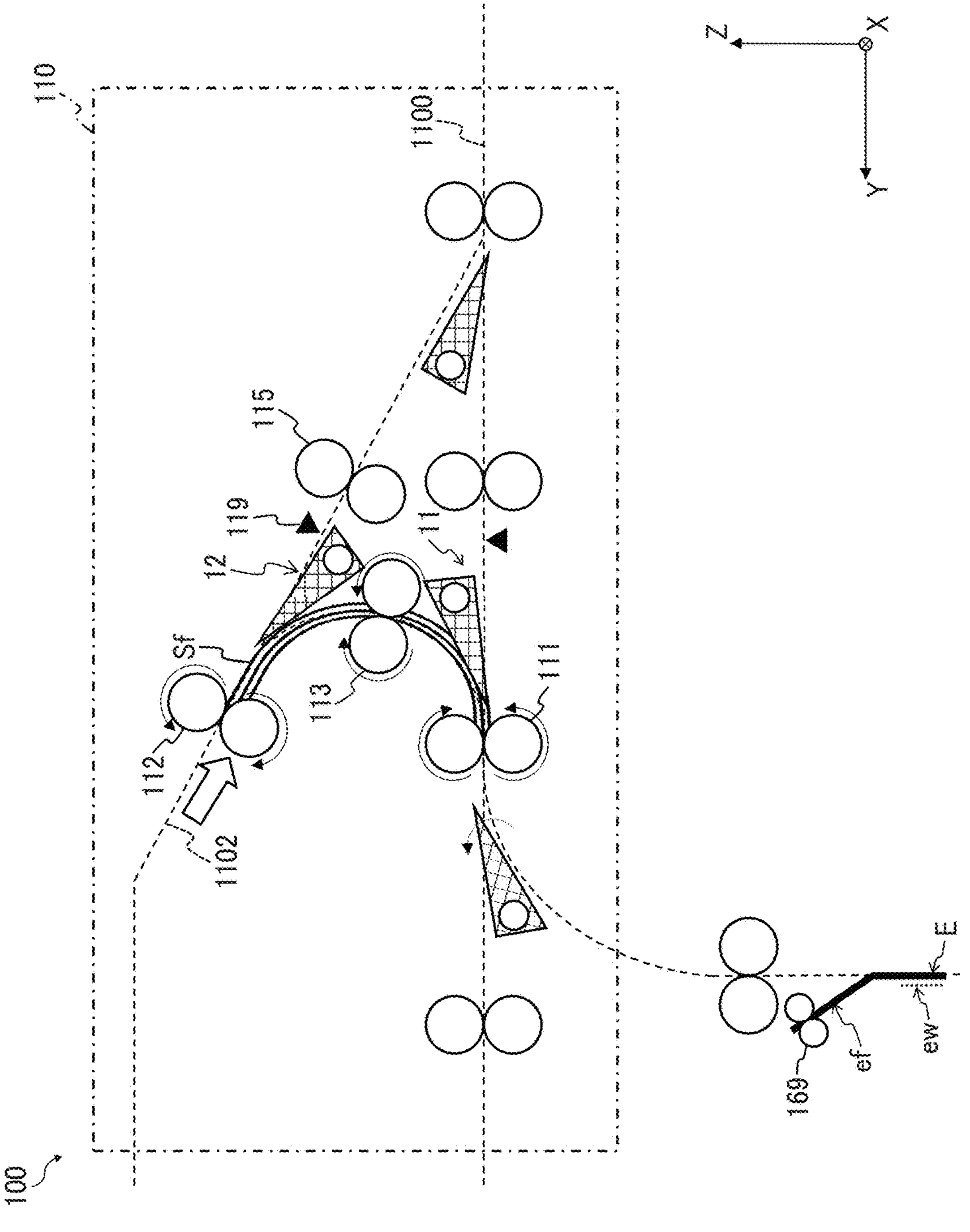
FIG. 41 is a diagram illustrating one step of the enclosing operation.

Subsequently, as illustrated in FIG. 41, the second conveyance roller pair 112 is reversely rotated to convey the folded sheet Sf to the switchback conveyance path 1103. The folded sheet Sf is conveyed downstream by the switchback conveyance roller pair 113 and the first conveyance roller 111. If the third switching pawl 13 is not in a state allowing the folded sheet Sf to be conveyed from the first conveyance path 1101 to the enclosing conveyance path 1104, the third switching pawl 13 is also rotated and switched to such a state.

Figure 42:
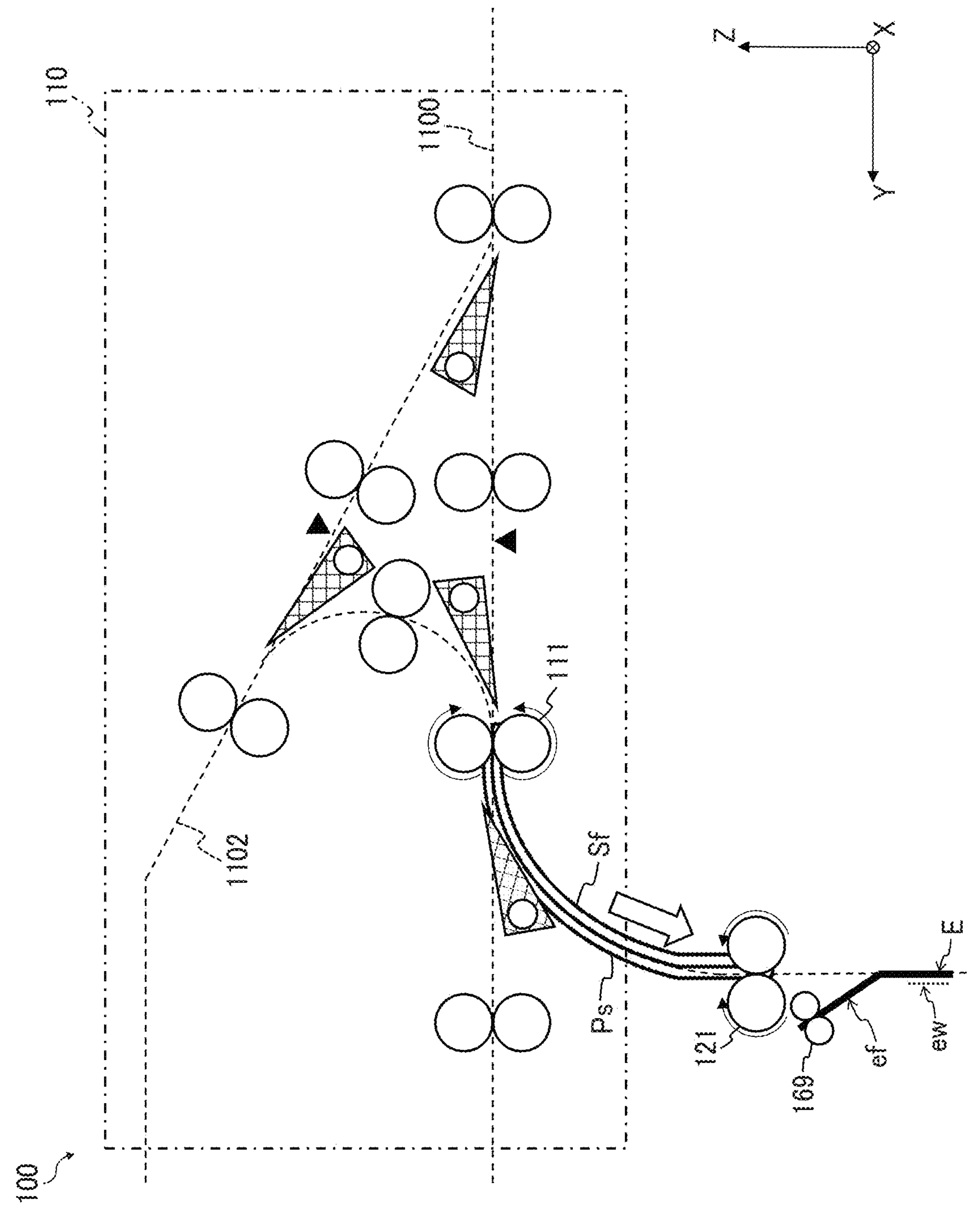
FIG. 42 is a diagram illustrating one step of the enclosing operation.

As a result, as illustrated in FIG. 42, the folded sheet Sf is conveyed toward the enclosing conveyance path 1104.

As a result of the above-described operation, the folded sheet Sf is enclosed in the envelope E. Thereafter, as described with reference to FIGS. 30 to 34, the envelope E in which the enclosure is enclosed is ejected to the envelope ejection tray 144.

As described above, when the image forming surface Ps of the folded sheet Sf as an object to be enclosed in one envelope E is a lower surface in the conveyance direction in the enclosing-sealing apparatus 100, the position of the image forming surface Ps with respect to the conveyance direction can be reversed, before enclosing, using the switchback path such that the orientation of the image forming surface Ps be the same as the orientation of the transparent window ew of the envelope E.

In the enclosing-sealing apparatus 100 according to the present embodiment, as described above, the orientation of the enclosure can be adjusted by the conveyors so as to be a predetermined enclosing direction based on, for example, the folding type of the folded sheet Sf as the enclosure or the type of the folding apparatus 300 that has performed the folding processing.

According to the above-described embodiment, the enclosing processing is performed by the vertical conveyance path extending in the vertical direction with respect to the installation surface of the enclosing-sealing apparatus 100. Accordingly, the configuration of supplying the envelope E and the configuration of placing the envelope can be arranged along the vertical conveyance path. As a result, the stacking direction can be arranged in the vertical direction while securing a conveyance path that does not apply excessive stress to the envelope or the enclosure during conveyance. Such a configuration can provide a mechanism that can reduce the installation space regardless of the size of the loading capacity of the enclosing-sealing apparatus 100.

As in the related art, an apparatus may allow an operator to access a sheet only from the upper surface side of the sheet in a horizontal conveyance path. In such a configuration, when an abnormality such as a jam occurs in the horizontal conveyance path, the operator needs to access the corresponding point while avoiding functional devices. Accordingly, in the related art, there is a situation in which it is necessary to select whether operability is impaired or operability is improved by enlarging a mechanism. In this regard, the enclosing-sealing apparatus 100 according to the present embodiment allows access to the vertical conveyance path from both side surfaces, and facilitates access to the conveyance path from the facing surface side in each functional device such as the supplier of the envelope E with respect to an abnormality such as a jam. In other words, both operability and space saving can be achieved.

In addition, according to the enclosing-sealing apparatus 100, the switchback conveyance path is provided with the vertical conveyance path. Thus, the mechanism of supplying the envelope E and the mechanism of stacking the envelope E can be arranged in the vertical direction. Since the degree of freedom of the arrangement of these mechanisms is increased, the structural arrangement can be made smaller and more efficient.

According to the enclosing-sealing apparatus 100, at least two pairs of conveyance rollers that rotate forward and backward are disposed in the vertical conveyance path serving as the switchback conveyance path. Thus, the switchback conveyance can be reliably performed even when the length of the envelope E in the conveyance direction is short.

Further, according to the enclosing-sealing apparatus 100, the envelope E supplied to the vertical conveyance path is conveyed upward in the switchback conveyance for predetermined processing and is conveyed to any place where the predetermined processing can be efficiently performed. As a result, space can be efficiently saved. In the case where the sheet is ejected by vertical conveyance, the sheet can be ejected after additional processing is performed below the branch point. Accordingly, it is very effective to secure a wide conveyance range in which switchback is performed.

According to the present embodiment, the enclosing-sealing apparatus 100 includes the enclosure reversing conveyor to reverse and convey the leading end of the enclosure. Thus, the additional configuration separate from the vertical conveyance path allows matching of the orientations of an enclosure and an envelope while maintaining the installation area of the apparatus. Such a configuration allows characters, such as an address, and a pattern, such as a logo described on an enclosure, to be visible through a window of a windowed envelope.

The enclosing-sealing apparatus 100 includes the sealing device 140 that seals the envelope E. Such a configuration can close and seal the flap portion ef within the vertical conveyance path while maintaining the installation area of the apparatus, and eject the folded flap portion ef in a direction in which the leading end of the folded flap portion ef is not caught and turned during conveyance. Thus, a sealing failure can be prevented.

Next, a description is given of the configuration of an enclosing-sealing apparatus 100 serving as an enclosing-sealing apparatus according to another embodiment of the present disclosure. In the enclosing-sealing apparatus 100, an envelope load tray 127 and an envelope ejection tray 134 are disposed inside the apparatus. Accordingly, a user operates the inside of the apparatus when an envelope E is replenished or when an envelope E in which an enclosure is enclosed is taken out. For the safety, for example, the operating user temporarily stops the entire operation of the enclosing-sealing apparatus 100. In such a case, the operations of a folding apparatus 300 and an image forming apparatus 200 arranged upstream from enclosing-sealing apparatus 100 in a sheet conveyance direction in the printing system 1 may be stopped due to the temporary stop of the operation of the enclosing-sealing apparatus 100.

The enclosing-sealing apparatus 100 has a configuration of discharging a sheet S or a folded sheet Sf that is not related to an enclosing operation to a downstream apparatus only by the operation of a sheet conveying device 110 that is also referred to as the sheet reverse device. That is, when a through conveyance operation as the conveyance operation not accompanied by the enclosing operation is performed, the operation of the entire enclosing-sealing apparatus 100 is not stopped even when the operation of replenishing or taking out the envelope E is performed. In this case, even if the operation of the printing system 1 is continued and the enclosing-sealing apparatus 100 executes the through conveyance operation, there is no concern about the safety of the user.

That is, when performing the through conveyance operation, the enclosing-sealing apparatus 100 according to the present embodiment does not stop the operation of the entire apparatus even if the inside of the apparatus is in a state in which a user can operate, and continues the operation of discharging the sheet S or the folded sheet Sf, which is carried in from the upstream apparatus, to the downstream side. Accordingly, the downtime of the enclosing-sealing apparatus 100 can be reduced.

When the image forming apparatus 200 is operating as a printer, the execution timing of a print job requested to the image forming apparatus 200 may not be clear. In this case, it may be difficult for the user to clearly determine whether the printing system 1 is operating. If the user erroneously recognizes that the apparatus is not operating and attempts to operate the inside of the enclosing-sealing apparatus 100, the operation of the apparatus is stopped in order to ensure safety.

In this case, there is a possibility that the image forming process or the like is stopped at a halfway timing, which may cause a conveyance failure of a sheet S and force a user to perform maintenance such as taking out the sheet S due to the conveyance failure.

In order to reduce the conveyance failure and the downtime caused by the maintenance as described above, the enclosing-sealing apparatus 100 does not request the operation stop of the printing system 1 when performing a replenishment operation of the envelope E that does not require the stop of the upstream apparatus. Such a configuration can reduce the downtime of the entire system and also reduce the frequency of maintenance due to conveyance failure.

Figure 43A:
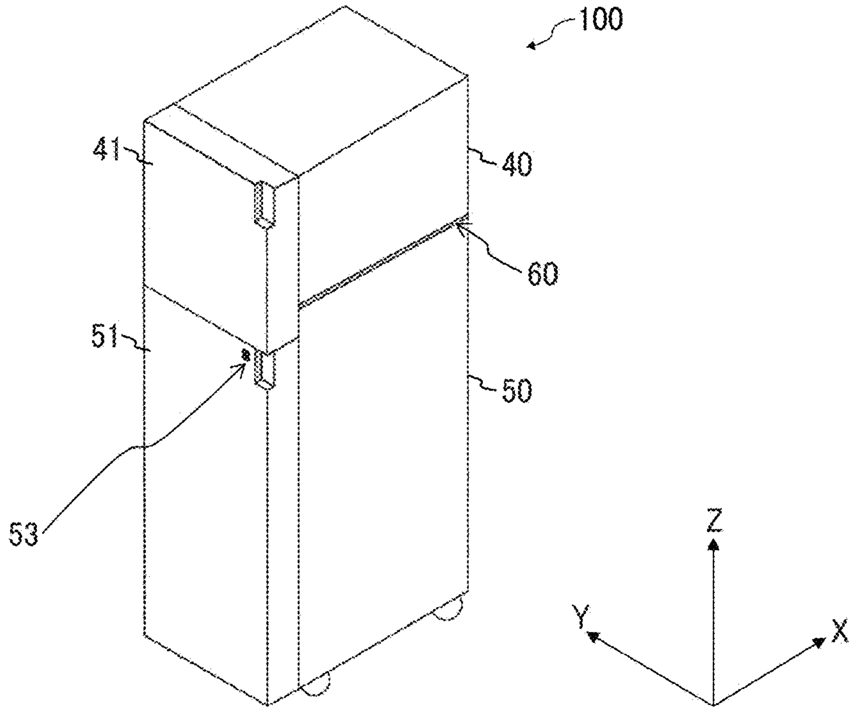
FIGS. 43A and 43B are perspective views of a housing structure of an enclosing-sealing apparatus according to an embodiment of the present disclosure.
Figure 43B:
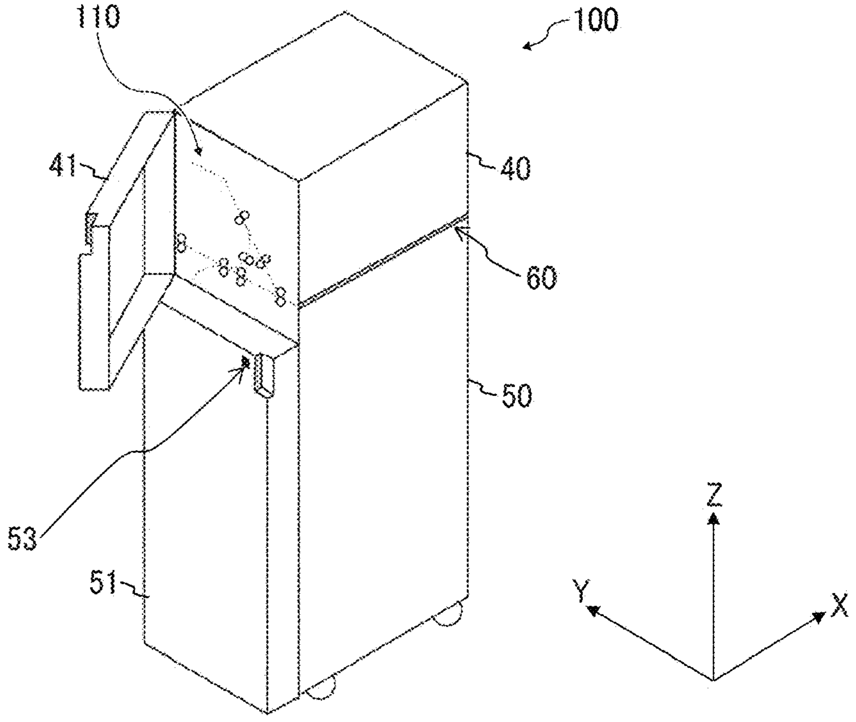

FIGS. 43A and 43B are external perspective views of the enclosing-sealing apparatus 100 according to the present embodiment. As illustrated in FIG. 43A, the enclosing-sealing apparatus 100 has a configuration of stacking a sheet conveying unit 40 and an enclosing-sealing unit 50 in a vertical direction. The sheet conveying unit 40 includes a sheet conveying device 110. The enclosing-sealing unit 50 includes an enclosing device 120 and a sealing device 140.

A sheet insertion slit 60 corresponding to an entry port of the sheet S or the folded sheet Sf ejected from the upstream apparatus is disposed at a boundary between the sheet conveying unit 40 and the enclosing-sealing unit 50. The sheet conveying device 110 performs, on the conveyed sheet S, a predetermined conveyance processing such as a “through conveyance operation” in which the sheet S is conveyed to a downstream apparatus as it is, an “enclosing conveyance operation” in which the sheet S is conveyed to the enclosing device 120, and a “reverse conveyance operation” in which an end of the sheet S in the conveyance direction is reversed.

As illustrated in FIG. 43A, the sheet conveying unit 40 includes a first cover 41 as a unit cover. The enclosing-sealing unit 50 includes a second cover 51 serving as a unit cover.

The first cover 41 is a door constituting a conveyor cover to cover the sheet conveying device 110 in the sheet conveying unit 40. When the first cover 41 is open, the user can access conveyance roller pairs and branching pawls included in the sheet conveying device 110. For example, when a sheet S is jammed on a conveyance path due to a conveyance failure, the first cover 41 is opened when the user performs a maintenance operation of taking out the jammed sheet. For this reason, in response to a detection that the first cover 41 is open (a determination that the first cover 41 is in an open state), an enclosing-sealing controller 190 performs control to stop the operation of the sheet conveying device 110.

The second cover 51 is a door constituting an enclosing-sealing unit cover to cover a configuration including an enclosing-sealing unit 501 that is a unit including the enclosing device 120 and the sealing device 140. When the second cover 51 is open, the user can access the enclosing-sealing unit 501 including the enclosing device 120 and the sealing device 140. For example, the second cover 51 is opened when the user performs a maintenance operation of taking out the envelope E, such as when the envelope E is replenished, when the envelope E after enclosing is taken out, or when the envelope E is jammed on the conveyance path due to a conveyance failure. For this reason, in response to a detection that the second cover 51 is open (a determination that the second cover 51 is in an open state), the enclosing-sealing controller 190 performs control to stop the operation of the enclosing-sealing unit 501.

Figure 47:
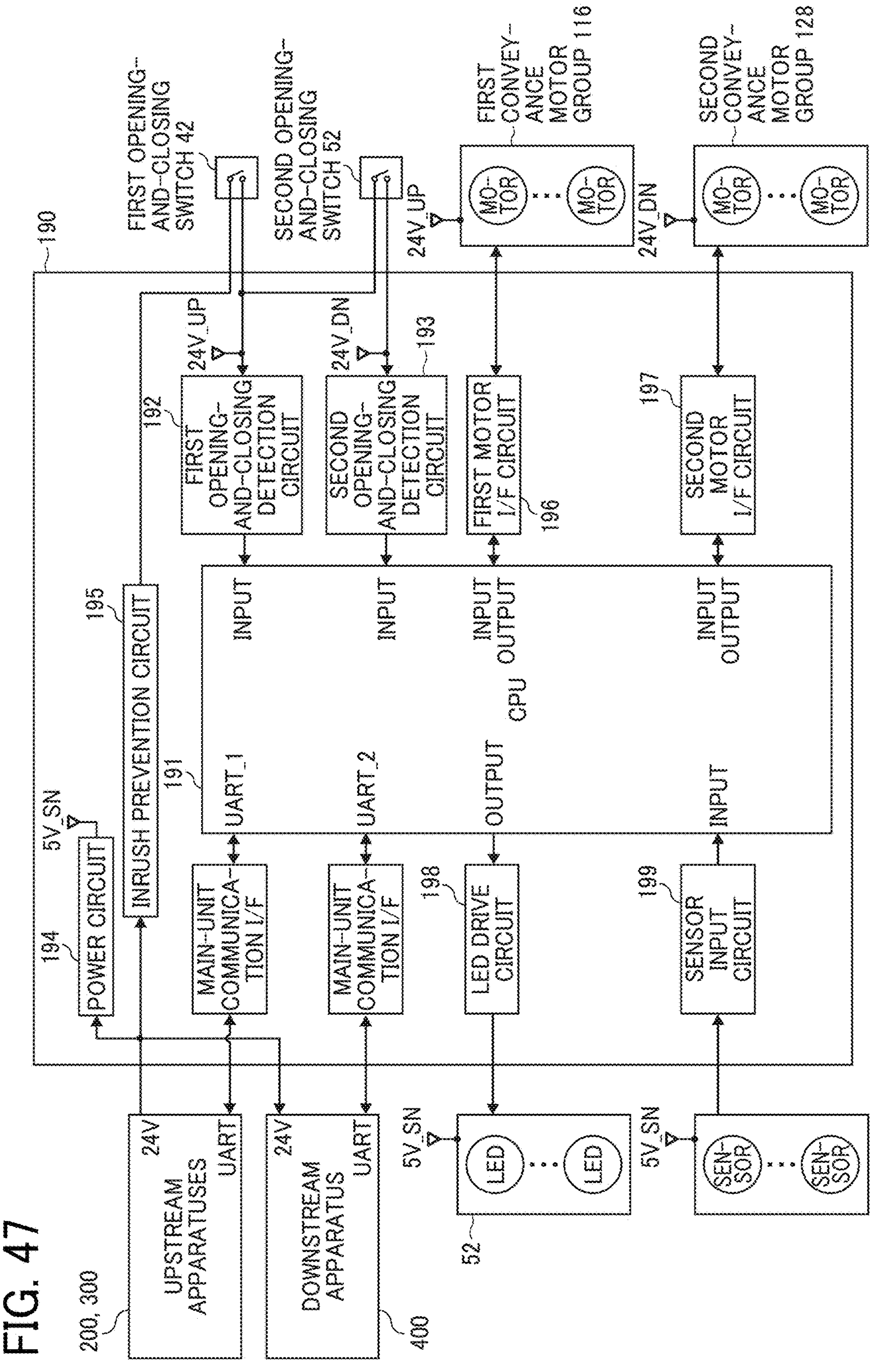
FIG. 47 is a diagram illustrating a configuration of a controller of the enclosing-sealing apparatus, according to an embodiment of the present disclosure.

The first cover 41 and the second cover 51 can be opened and closed independently of each other. The detection of the open states of the first cover 41 and the second cover 51 is performed by a first opening-and-closing detection switch 42 and a second opening-and-closing detection switch 52 installed in the first cover 41 and the second cover 51, respectively. The first opening-and-closing detection switch 42 and the second opening-and-closing detection switch 52 are illustrated in FIG. 47 described below. The first opening-and-closing detection switch 42 and the second opening-and-closing detection switch 52 are arranged at any positions where the open and closed states can be detected individually. The configuration of each of the first opening-and-closing detection switch 42 and the second opening-and-closing detection switch 52 may be any configuration that can notify the enclosing-sealing controller 190 of a signal indicating the open state of the corresponding door when each switch detects the open state. Note that the configuration of each of the first opening-and-closing detection switch 42 and the second opening-and-closing detection switch 52 may be a configuration of notifying the enclosing-sealing controller 190 of a signal indicating that each door is closed (in a closed state).

The enclosing-sealing controller 190 determines the open and closed states of the first cover 41 and the second cover 51 based on the signals notified from the first opening-and-closing detection switch 42 and the second opening-and-closing detection switch 52. That is, the first opening-and-closing detection switch 42, the second opening-and-closing detection switch 52, and the enclosing-sealing controller 190 constitute a door opening-closing state detector.

As illustrated in FIG. 43, a lighting unit 53 as an indicator is disposed on the front side of the second cover 51, to indicate whether opening of the second cover 51 is permitted. Note that a configuration acting as an indicator may be similarly disposed on the front side of the first cover 41. The user can easily determine whether opening of the second cover 51 is permitted based on the lighting state of the lighting unit 53. Alternatively, for example, the lighting state of the lighting unit 53 may be devised to notify the user that the first cover 41 is prohibited from being opened since the sheet conveying unit 40 is in operation, but opening of the second cover 51 is permitted since the enclosing-sealing unit 501 is not in operation. That is, the state of permission or prohibition of the conveyance operation of the sheet S or the like in the sheet conveying unit 40 is displayed by the lighting state of the lighting unit 53.

For example, when the enclosing-sealing unit 50 is conveying the folded sheet Sf or the envelope E for the enclosing processing, the lighting unit 53 is lit on to notify that opening of the second cover 51 is prohibited. At this time, the notification indicates that a job (envelope job) accompanied by the enclosing processing of the sheet S and the folded sheet Sf cannot be executed and the conveyance of the enclosure to the envelope conveyance path 1105 is in an unexecutable state.

When the lighting unit 53 is turned on, the folded sheet Sf or the envelope E is being conveyed for the enclosing processing. Accordingly, if the user opens the second cover 51, the user can undesirably access the enclosing-sealing unit 501 in operation. In such a state, when the user performs some operation on the enclosing-sealing unit 501, a conveyance failure of the envelope E or a conveyance failure of the folded sheet Sf occurs.

For this reason, in order to prevent the user of the enclosing-sealing apparatus 100 from erroneously accessing the enclosing-sealing unit 501 in operation, the enclosing-sealing apparatus 100 notifies the user that the second cover 51 is in an unopenable state in a visually recognizable form. Thus, the occurrence of an operation failure such as a conveyance failure can be prevented.

The lighting unit 53 is, for example, a light emitting element such as a light emitting diode (LED) and can display the state of the apparatus by lighting or blinking. The enclosing-sealing controller 190 controls the lighting operation of the lighting unit 53.

When the lighting unit 53 is turned off, this indicates that opening of the second cover 51 is permitted. At this time, it doesn't matter whether the sheet conveying unit 40 is operating. When the lighting unit 53 is turned off during execution of the conveyance operation of the sheet conveying unit 40, the conveyance failure or the like does not occur even if the second cover 51 is opened. Thus, the safety of the user is ensured.

Figure 44A:
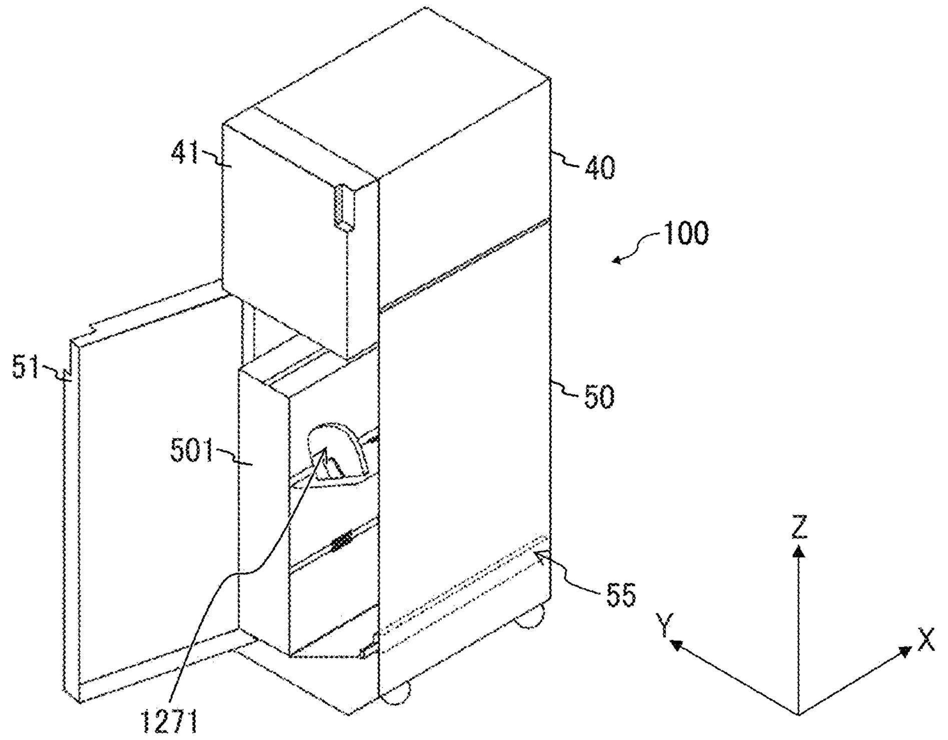
FIGS. 44A and 44B are perspective views of the enclosing-sealing apparatus, illustrating states in which a front cover according to an embodiment of the present disclosure is open.
Figure 44B:
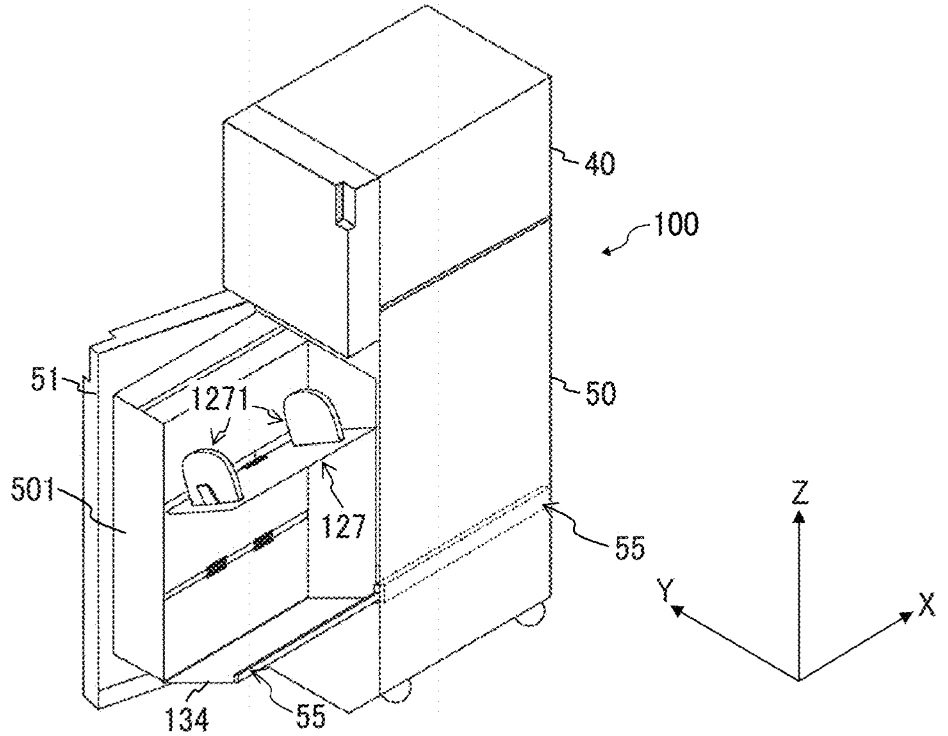

As illustrated in FIGS. 44A and 44B, the enclosing-sealing unit 50 includes the envelope load tray 127 and the envelope ejection tray 134. The envelope load tray 127 serving as an envelope hold tray is provided with side fences 1271 that align envelopes E in the width direction of the envelopes E and maintain a stacked state of the envelopes E.

As illustrated in FIG. 44A, when the second cover 51 is opened to replenish envelopes E, the side fences 1271 may hamper the envelopes E from being newly placed on the envelope load tray 127. That is, it may be difficult to replenish the envelope load tray 127 with the envelopes E only by opening the second cover 51. Hence, as illustrated in FIG. 44B, the entire enclosing-sealing unit 501 is pulled out from a housing of the enclosing-sealing unit 50.

The enclosing-sealing unit 50 includes a slide rail 55 that holds the enclosing-sealing unit 501 such that the enclosing-sealing unit 501 can be pulled out. The slide rail 55 allows the enclosing-sealing unit 501 to slide in the X-direction, and includes a mechanism that holds the enclosing-sealing unit 501 at a predetermined position in the enclosing-sealing unit 50. The slide rail 55 is also provided with a stopper so that the enclosing-sealing unit 501 does not fall off due to excessive movement in the negative X-direction.

Figure 45A:
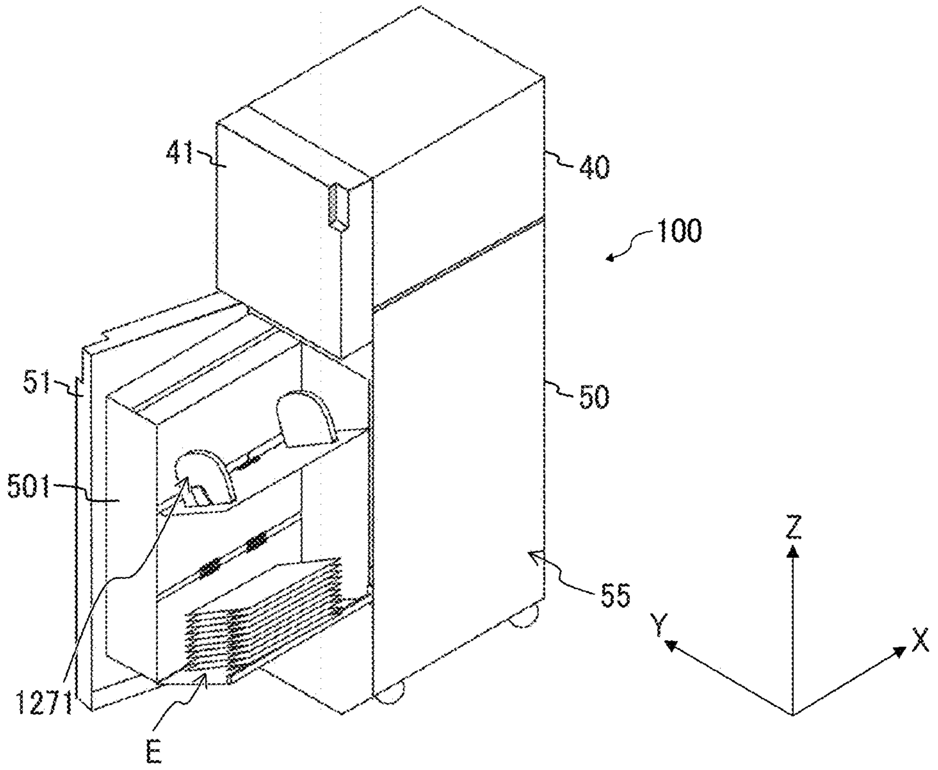
FIGS. 45A and 45B are perspective views of the enclosing-sealing apparatus, illustrating states in a maintenance operation according to an embodiment of the present disclosure.
Figure 45B:
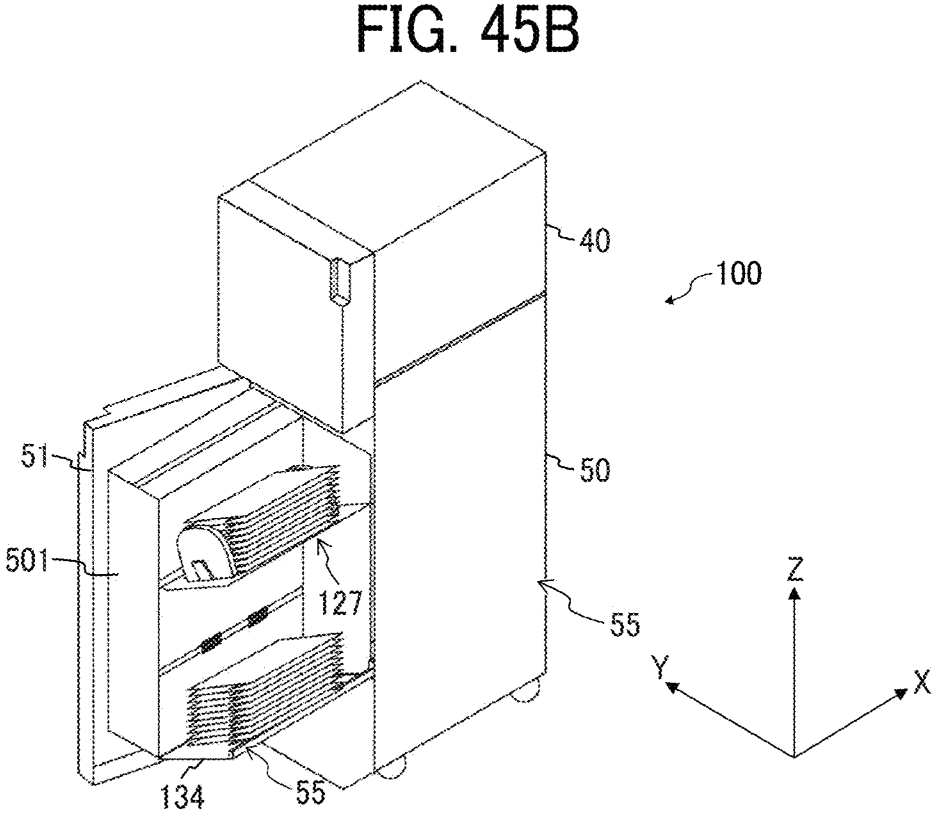

FIGS. 45A and 45B, respectively, illustrate a state in which envelopes E are replenished and stacked and a state in which enclosed and sealed envelopes E are taken out. As illustrated in FIG. 45A, since the sealed envelopes E are stacked on the envelope ejection tray 134, the envelopes E can be taken out when the second cover 51 is opened. However, the state where the operability is higher is the state where the enclosing-sealing unit 501 is pulled out. For this reason, after the enclosing-sealing unit 501 is pulled out as illustrated in FIG. 45A, the envelopes E are replenished (see FIG. 45B).

When the sealed envelopes E ejected to the envelope ejection tray 134 are taken out, the operability is higher in the state where the enclosing-sealing unit 501 is pulled out as illustrated in FIG. 45B.

Figure 46A:
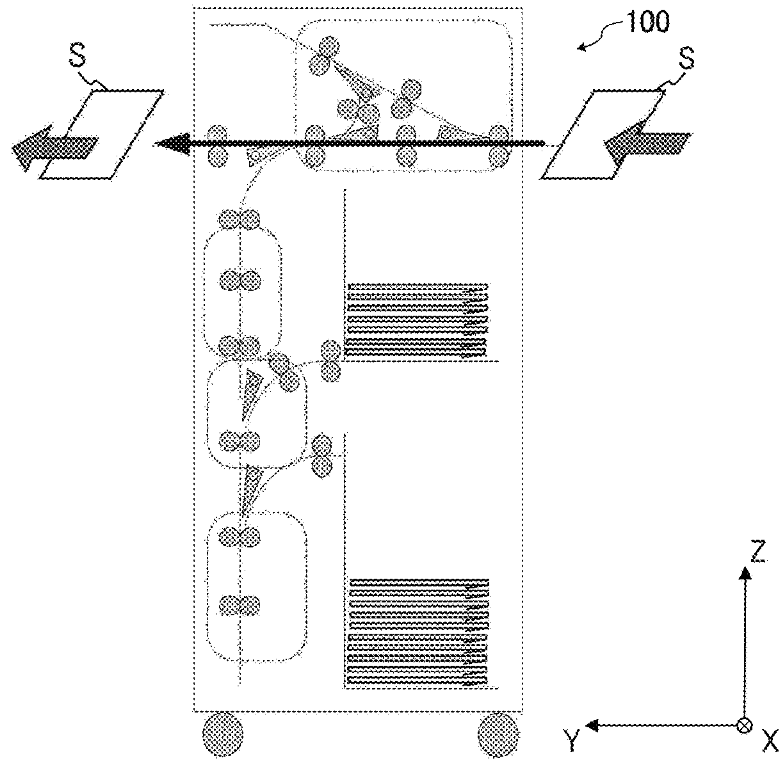
FIG. 46A is a cross-sectional view of the enclosing-sealing apparatus, illustrating a through conveyance operation in maintenance according to an embodiment of the present disclosure.
Figure 46B:
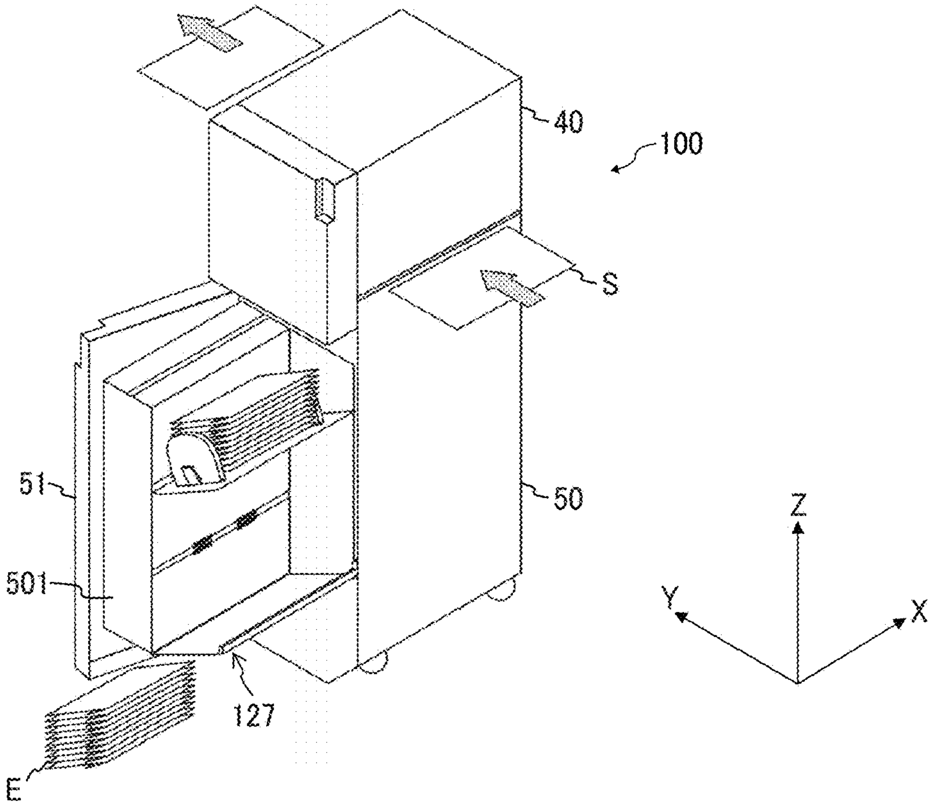
FIG. 46B is a perspective view of the enclosing-sealing apparatus, illustrating a replenishment operation in the maintenance.

FIGS. 46A and 46B illustrate an operation of the sheet conveying device 110 in a state where the second cover 51 is opened as illustrated in FIGS. 45A and 45B. FIG. 46A illustrates a "through conveyance operation" in which a sheet S conveyed from an upstream apparatus (e.g., the image forming apparatus 200) is conveyed to a downstream apparatus (e.g., the post-processing apparatus 400) as it is. As is clear from FIG. 46A, the through conveyance operation can be executed regardless of the state of the enclosing-sealing unit 50.

For example, as illustrated in FIG. 46B, the second cover 51 is opened so that the enclosing-sealing unit 501 is pulled out and the envelope E is replenished or the enclosed and sealed envelope E is taken out. However, when the first cover 41 is in the closed state, the user is prevented from accessing the sheet conveying device 110. Accordingly, even if the through conveyance operation is performed, there is no problem in ensuring the safety of the user. Therefore, in the through conveyance operation, the user can safely perform a necessary operation if only the operation of the enclosing-sealing unit 501 is stopped.

That is, if the print job is a through conveyance operation in which the sheet S or the folded sheet Sf ejected from the folding apparatus 300 is ejected to the post-processing apparatus 400, the job does not require the enclosing and sealing processing. Therefore, in this case, even if the second cover 51 is opened, it is not necessary to stop the operation of the apparatus.

Such a configuration can prevent the occurrence of downtime of the printing system 1 due to replenishment and loading of envelopes E or taking out of envelopes E. Such a configuration can also prevent the occurrence of a conveyance jam due to opening and closing of the second cover 51 during a print job.

A description is further given below of the enclosing-sealing controller 190.

In the enclosing-sealing apparatus 100 described above, the opening and closing switches of the first cover 41 and the second cover 51 may be interlocked to control the operation of the driving source of the conveyance roller pairs. In particular, an operation safety unit interlocking with the first cover 41 may be configured to stop the functions of all the drive systems of the enclosing-sealing apparatus 100, and an operation safety unit interlocking with the second cover 51 may be configured to stop the functions of only the drive systems necessary for the enclosing and sealing processing covered by the second cover 51. With this configuration, even when the conveyance operation is performed by the units covered by the first cover 41, the safety of the user who opens the second cover 51 and stacks or takes out envelopes E can be ensured.

FIG. 47 is a block diagram of the enclosing-sealing controller 190 constituting a safety control circuit that executes the above-described safety control. The enclosing-sealing controller 190 includes a first opening-and-closing signal detection circuit 192 and a second opening-and-closing signal detection circuit 193. The first opening-and-closing signal detection circuit 192 inputs a detection signal of the first opening-and-closing detection switch 42 to a CPU 191. The second opening-and-closing signal detection circuit 193 inputs a detection signal of the second opening and closing detection switch 52.

The enclosing-sealing controller 190 includes a power supply circuit 194 and supplies operating power (5 V) to the CPU 191. The enclosing-sealing controller 190 includes an inrush prevention circuit 195 that prevents an inrush current of a power source (24 V) supplied to a control board from the image forming apparatus 200 and the folding apparatus 300 that are upstream machines.

The enclosing-sealing controller 190 includes a first motor interface (I/F) circuit 196 as a control interface of each motor as a first driving source that is a driving source of the plurality of conveyance roller pairs included in the sheet conveying device 110. The enclosing-sealing controller 190 includes a second motor I/F circuit 197 as a control interface of each motor as the first driving source that is a driving source of the plurality of conveyance roller pairs included in the enclosing device 120 and the sealing device 140.

The enclosing-sealing controller 190 includes an LED drive 198 that controls lighting of the lighting unit 53 and the like disposed on the second cover 51 of the enclosing-sealing unit 50. The enclosing-sealing controller 190 also includes a sensor input circuit 199 that inputs detection signals of various sensors included in the enclosing-sealing apparatus 100 to the CPU 191.

As illustrated in FIG. 47, the power source (24V) supplied from the upstream device passes through the inrush prevention circuit 195 and then is connected to the first opening-and-closing signal detection circuit 192 and the second opening-and-closing signal detection circuit 193 that are in a series relationship. Accordingly, when the first opening-and-closing detection switch 42 is ON (i.e., the first cover 41 is closed), power is supplied by 24V_UP to a first conveyance motor group 116 serving as a driving source of the conveyance roller pairs of the sheet conveying device 110 via the first motor I/F circuit 196.

If the second opening-and-closing detection switch 52 is also ON (i.e., the second cover 51 is closed), power is supplied by 24V_DN to a second conveyance motor group 128 serving as a driving source of the conveyance roller pairs of the enclosing device 120 and the sealing device 140 via the second motor I/F circuit 197.

That is, when the first cover 41 and the second cover 51 are closed, power is supplied to both the first conveyance motor group 116 and the second conveyance motor group 128, and thus the conveyance roller pairs included in both the sheet conveying unit 40 and the enclosing-sealing unit 50 operate.

On the other hand, when the first opening-and-closing detection switch 42 is OFF (i.e., the first cover 41 is open), power is not supplied to the first conveyance motor group 116 and the second conveyance motor group 128 regardless of the state of the second opening-and-closing detection switch 52 (i.e., regardless of whether the second cover 51 is open or closed). That is, when the first opening-and-closing detection switch 42 is OFF (i.e., the first cover 41 is open), both the sheet conveying unit 40 and the enclosing-sealing unit 50 stop operating.

When the first opening-and-closing detection switch 42 is ON (i.e., the first cover 41 is closed) and the second opening-and-closing detection switch 52 is OFF (i.e., the second cover 51 is open), power is supplied to the first conveyance motor group 116. In this case, power is not supplied to the second conveyance motor group 128. That is, when the first cover 41 is closed and the second cover 51 is open, power is also supplied to the first conveyance motor group 116. Thus, the conveyance roller pairs included in the sheet conveying unit 40 operates to perform the through conveyance operation. Since power is not supplied to the second conveyance motor group 128, the conveyance roller pairs included in the enclosing-sealing unit 50 do not operate, thus allowing a user to perform a maintenance operation.

The safety circuit in the enclosing-sealing controller 190 is configured as described above. Thus, even if the second cover 51 is opened during the conveyance operation of a sheet S or a folded sheet Sf by the printing system 1, the state in which power is not supplied to the drive system for executing the enclosing-sealing processing can be achieved. As a result, envelopes E can be safely loaded and unloaded.

Figure 48:
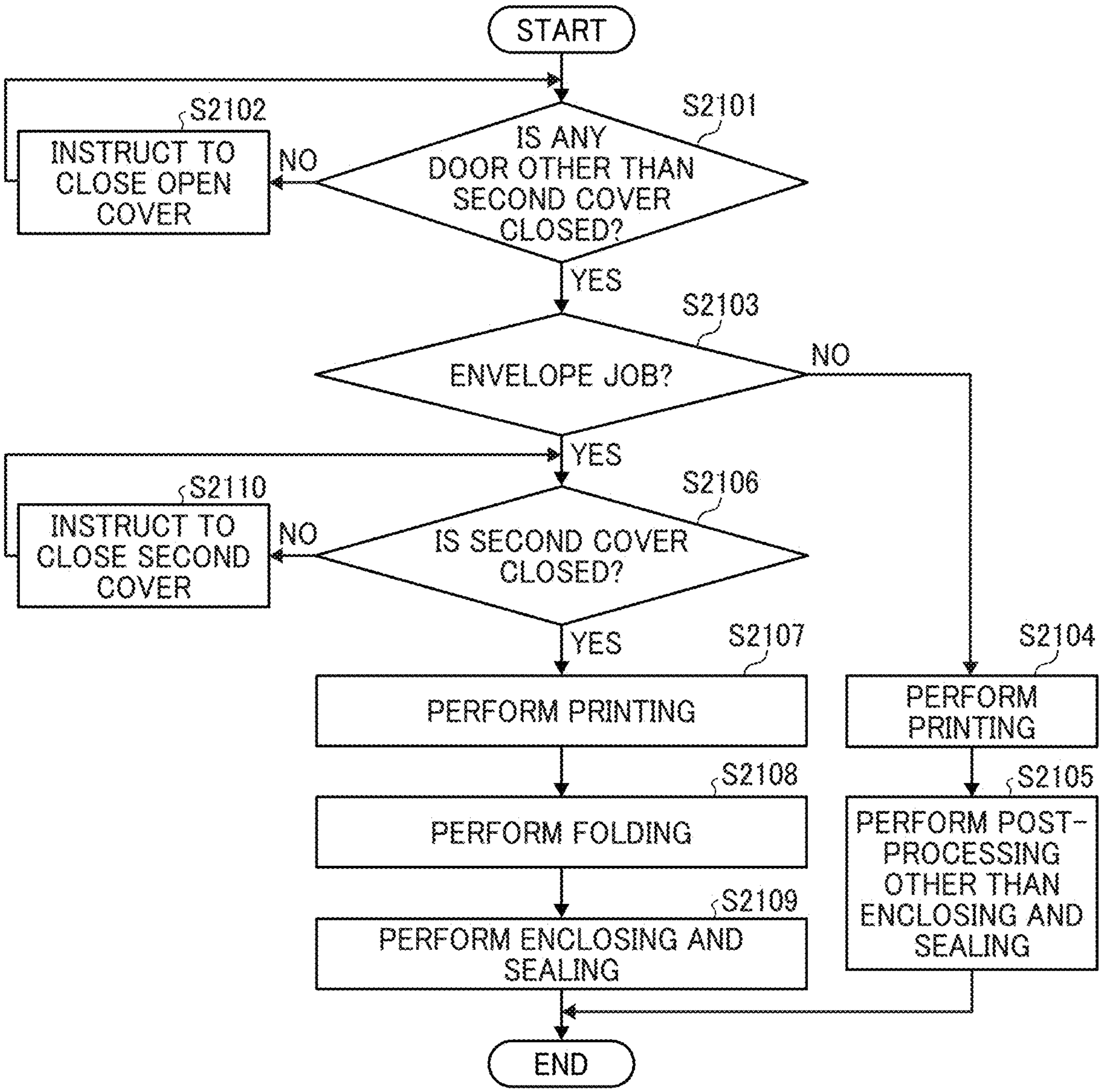
FIG. 48 is a flowchart illustrating a control process of the enclosing-sealing apparatus, according to an embodiment of the present disclosure.

Next, a procedure of processing of a control program executed by a controller included in the printing system 1 is described with reference to a flowchart of FIG. 48. When a print job is started in the printing system 1, a controller (e.g., the printer controller 260) first determines whether a door other than the second cover 51 is open via the enclosing-sealing controller 190 (step S2101). When the cover other than the second cover 51 is open (NO in step S2101), that is, when the first cover 41 is open, for example, information instructing to close the open cover is displayed on the display 210 included in the image forming apparatus 200 (step S2102).

When the cover other than the second cover 51 is closed (YES in step S2101), the controller determines whether the executed print job is an "envelope job" requesting an enclosing operation (step S2103). If the job is not an envelope job (NO in step S2103), printing processing (step S2104) and post-processing (step S2105) other the enclosing-sealing processing are executed.

If it is an envelope job (YES in step S2103), the controller determines whether the second cover 51 is closed (step S2106). Here, if the second cover 51 is not closed (NO in step S2106), for example, information instructing to close the second cover 51 is displayed on the display 210 included in the image forming apparatus 200 (step S2110).

If the second cover 51 is closed (YES in step S2106), the printing processing (step S2107), the folding processing (step S2108), and the enclosing-sealing processing (step S2109) are executed.

As described above, when a print job is executed, normally the job cannot be executed unless all the doors are closed. However, in a case where the enclosing-sealing apparatus 100 is included in the printing system 1, if the executed print job is not an envelope job, the job can be executed even when the second cover 51 of the enclosing-sealing apparatus 100 is open. In the case of an envelope job, the job cannot be executed unless the second cover 51 of the enclosing-sealing apparatus 100 is also closed.

The technology of the present disclosure is not limited to the embodiments described above. The embodiments of the present disclosure may be modified variously within the scope of the present disclosure. The technology of the present disclosure includes technical matters encompassed by a technological concept within the scope of the present disclosure. Although the embodiments described above disclose preferable examples, the embodiments may be modified into modification examples by those skilled in the art based on the present disclosure. Such embodiments and variations thereof are included in the scope and gist of the embodiments of the present disclosure and are included in the embodiments described in claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2021-080478, filed on May 11, 2021, Japanese Patent Application No. 2021-098141 filed on Jun. 11, 2021, and Japanese Patent Application No. 2022-030084 filed on Feb. 28, 2022, in the Japan Patent Office, the entire disclosure of which is hereby incorporated by reference herein.

REFERENCE SIGNS LIST

1: Printing system
10: Branching pawl
11: First switching pawl
12: Second switching pawl
13: Third switching pawl
21: Envelope switchback switching pawl
31: Envelope ejecting switching pawl
40: Sheet conveying unit
41: First cover
42: First opening-and-closing detection switch
50: Enclosing-sealing unit
51: Second cover
52: Second opening-and-closing detection switch
53: Lighting unit
55: Slide rail
60: Sheet insertion portion
100: Enclosing-sealing apparatus
101: Entry roller pair
102: Exit roller pair
110: Sheet reverse device
111: First conveyance roller pair
112: Second conveyance roller pair
113: Switchback conveyance roller pair
114: First intermediate conveyance roller pair
115: Second intermediate conveyance roller pair
118: First sheet detection sensor
119: Second sheet detection sensor
120: Enclosing device
121: Enclosing roller pair
122: First vertical conveyance roller pair
123: Second vertical conveyance roller pair
125: Separation roller pair
127: Envelope load tray
128: Second conveyance motor group
130: Flap opening unit
131: Sheet feeding roller pair (third vertical conveyance roller pair)
132: Envelope switchback roller pair (fourth vertical conveyance roller pair)
134: Envelope ejection tray
135: Sealing mechanism
140: Sealing device
141: Third vertical conveyance roller pair
142: Fourth vertical conveyance roller pair
143: Envelope ejecting roller pair
144: Envelope ejection tray
145: Sealing mechanism
150: Enclosing-sealing controller
160: Enclosure pusher
161: Pushing pawl
180: Flap opener
181: Flap scooping pawl
182: Spring
190: Enclosing-sealing controller
191: CPU
192: First opening-and-closing signal detection circuit
193: Second opening-and-closing signal detection circuit
194: Power supply circuit
195: Inrush prevention circuit
196: First motor I/F circuit
197: Second motor I/F circuit
198: LED drive
199: Sensor input circuit
200: Image forming apparatus
260: Printer controller
300: Folding apparatus
310: Sheet folder
320: Folding controller
400: Post-processing apparatus
410: Post-processing device
420: Post-processing controller
501: Enclosing-sealing unit
1100: Entry path
1101: First conveyance path
1102: Second conveyance path
1103: Switchback conveyance path
1104: Enclosing conveyance path
1105: Envelope conveyance path
1106: Sealing path
1107: Envelope entry path
1108: Envelope ejection path
1109: Sheet ejecting path
1271: Side fence

The invention claimed is:

1. An envelope processing apparatus for enclosing an enclosure in an envelope, the apparatus comprising:

an envelope conveyance path extending in a vertical direction, the envelope conveyance path configured to convey an envelope;

an enclosure supplier configured to supply an enclosure to the envelope via the envelope conveyance path;

an envelope supplier configured to supply the envelope to the envelope conveyance path;

a flap opener configured to open a flap portion of the envelope between the envelope supplier and the envelope conveyance path;

an envelope stacker configured to stack the envelope ejected from the envelope conveyance path; and an envelope supply path branching from the envelope conveyance path at a first branch position lower than a position of the enclosure supplier in the envelope conveyance path.

2. The envelope processing apparatus according to claim 1, further comprising:

an envelope ejection path branching from the envelope conveyance path at a second branching position different from the first branch position, the envelope ejection path configured to eject the envelope to the envelope stacker.

3. The envelope processing apparatus according to claim 2, wherein the first branch position is a position above the second branch position in a conveyance direction of the envelope.

4. The envelope processing apparatus according to claim 2, wherein the envelope conveyance path includes:

a switchback conveyor configured to switch a conveyance direction of the envelope in the envelope conveyance path.

5. The envelope processing apparatus according to claim 4, wherein the switchback conveyor includes at least two pairs of conveyance rollers; and the at least two pairs of conveyance rollers are configured to rotate forward and backward.

6. The envelope processing apparatus according to claim 5, wherein the at least two pairs of conveyance rollers include:

a first conveyance roller pair at a position above the first branch position and a position below the first branch position in the envelope conveyance path; and a second conveyance roller pair below the second branch position in the envelope conveyance path.

7. The envelope processing apparatus according to claim 2, further comprising:

a sealer at a position below the second branch position in the envelope conveyance path, the sealer configured to seal the envelope in which the enclosure is enclosed.

8. The envelope processing apparatus according to claim 7, wherein the envelope ejection path further includes:

an envelope ejecting roller pair configured to eject the sealed envelope to the envelope stacker.

9. The envelope processing apparatus according to claim 1, further comprising:

an enclosure reversing conveyor at a position above the enclosure supplier in the envelope conveyance path, the enclosure reversing conveyor configured to reverse a direction of an end of the enclosure in a conveyance direction of the enclosure and convey the enclosure.

10. An image forming system, comprising:

an image forming apparatus configured to form an image on a sheet medium;

a folding apparatus configured to fold the sheet medium on which the image is formed; and the envelope processing apparatus according to claim 1 configured to enclose, in the envelope, the sheet medium fed from the image forming apparatus or the folding apparatus.

11. The envelope processing apparatus according to claim 1, further comprising:

an envelope holding mechanism configured to convey the envelope to a sealing position and hold the envelope such that the enclosure of the envelope is enclosed.

12. The envelope processing apparatus according to claim 1, wherein the envelope supply path further includes:

a feed roller configured to convey the envelope from an envelope hold tray to a first branch position; and the flap opener configured to open the flap portion of the envelope conveyed from the envelope hold tray;

a flap opener configured to open a flap portion of the envelope between the envelope supplier and the envelope conveyance path.

13. An envelope processing apparatus for enclosing an enclosure in an envelope, the apparatus comprising:

an enclosing conveyance path configured to convey an enclosure;

a first cover configured to cover the enclosing conveyance path;

an envelope conveyance path extending from the enclosing conveyance path in a vertical direction, the envelope conveyance path configured to convey an envelope;

a second cover configured to cover at least the envelope conveyance path; and a controller configured to continue conveying the enclosure in the enclosing conveyance path in response to the second cover being open.

14. The envelope processing apparatus according to claim 13, wherein the enclosing conveyance path includes an enclosure conveyor configured to convey the enclosure; and the envelope conveyance path includes, an envelope hold tray configured to stack and hold the envelope;

an envelope conveyor configured to supply the envelope from the envelope hold tray to the envelope conveyance path and eject the envelope in which the enclosure has been enclosed, from the envelope conveyance path;

an enclosing device configured to convey the enclosure from the enclosing conveyance path to the envelope through the envelope conveyance path and enclose the enclosure in the envelope; and an envelope stacker configured to stack the envelope ejected by the envelope conveyor; and wherein the second cover is further configured to cover at least one of the envelope hold tray, the envelope stacker, the envelope conveyor, and the enclosing device.

15. The envelope processing apparatus according to claim 13, further comprising:

a first opening-and-closing detection switch configured to detect an opening or closing of the first cover;

a second opening-and-closing detection switch configured to detect an opening or closing of the second cover; and an operation safety device configured to, stop a conveyance operation through the enclosing conveyance path in response to the first opening-and-closing detection switch detecting the opening of the first cover, and stop a conveyance operation through the envelope conveyance path in response to the second opening-and-closing detection switch detecting the opening of the second cover.

16. The envelope processing apparatus according to claim 13, further comprising:

an indicator configured to indicate open and closed states of the first cover or the second cover.

17. The envelope processing apparatus according to claim 16, wherein the indicator is a light emitting element on a front side of the first cover or the second cover; and the light emitting element is configured to, turn off in response to the enclosure being conveyable from the enclosing conveyance path to the envelope conveyance path, and turn on in response to the enclosure being conveyable in the enclosing conveyance path but not being conveyable in the envelope conveyance path.

18. An enclosing-sealing apparatus, comprising:

the envelope processing apparatus according to claim 13; and a sealer configured to seal the envelope in which the enclosure has been enclosed in the envelope conveyance path.

19. The envelope processing apparatus according to claim 13, wherein the envelope conveyance path further includes:

an envelope holding mechanism configured to convey the envelope to a sealing position and hold the envelope such that the enclosure of the envelope is enclosed.

20. The envelope processing apparatus according to claim 13, wherein the envelope conveyance path further includes:

a first conveyance roller pair at a position above a first branch position and a position below the first branch position, the first branch position branching between the envelope conveyance path and an envelope hold tray; and a second conveyance roller pair below a second branch position, the second branch position branching between the envelope conveyance path and an envelope stacker.

* * * * *